United States Patent
Iwasa et al.

(10) Patent No.: US 12,146,978 B2
(45) Date of Patent: Nov. 19, 2024

(54) RADAR DEVICE AND TRANSMITTING/RECEIVING ARRAY ANTENNA

(71) Applicant: Panasonic Intellectual Property Management Co., Ltd., Osaka (JP)

(72) Inventors: Kenta Iwasa, Tokyo (JP); Takaaki Kishigami, Tokyo (JP); Hidekuni Yomo, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 543 days.

(21) Appl. No.: 17/476,098

(22) Filed: Sep. 15, 2021

(65) Prior Publication Data
US 2022/0003834 A1 Jan. 6, 2022

Related U.S. Application Data

(63) Continuation of application No. PCT/JP2020/010659, filed on Mar. 11, 2020.

(30) Foreign Application Priority Data

Mar. 20, 2019 (JP) .................. 2019-053737

(51) Int. Cl.
*G01S 7/282* (2006.01)
*G01S 7/285* (2006.01)
(Continued)

(52) U.S. Cl.
CPC .............. *G01S 7/282* (2013.01); *G01S 7/285* (2013.01); *G01S 13/428* (2013.01); *H01Q 21/293* (2013.01)

(58) Field of Classification Search
CPC ........ G01S 7/282; G01S 7/285; G01S 13/428; H01Q 21/06; H01Q 21/293
See application file for complete search history.

(56) References Cited

U.S. PATENT DOCUMENTS

2008/0100499 A1    5/2008  Nishimura
2016/0285172 A1*   9/2016  Kishigami ............ G01S 13/284
(Continued)

FOREIGN PATENT DOCUMENTS

JP    2008-134223    6/2008
JP    2017-058359    3/2017
(Continued)

OTHER PUBLICATIONS

International Search Report (ISR) from International Searching Authority (Japan Patent Office) in International Pat. Appl. No. PCT/JP2020/010659, dated Jun. 16, 2020, together with an English language translation.
(Continued)

*Primary Examiner* — Bernarr E Gregory
*Assistant Examiner* — Fred H Mull
(74) *Attorney, Agent, or Firm* — Greenblum and Bernstein, P.L.C.

(57) ABSTRACT

This receiving array antenna includes multiple receiving antenna rows, and each of the receiving antenna rows contains a first number of antennas; of the first number of antennas contained in the receiving antenna rows, mutually adjacent antennas are arranged separated by a first interval in a first axis direction and by a second interval in a second axis direction. The transmitting array antenna includes multiple transmitting antenna rows arranged in the second axis direction at an interval that is the first number times the second interval, each of the transmitting antenna rows contains multiple antennas, and the multiple antennas contained in the transmitting antenna rows are arranged in the same position in the second axis direction and in different positions in the first axis direction. The antennas contained in the transmitting antenna rows adjacent in the second axis direction are arranged in different positions in the first axis direction.

15 Claims, 49 Drawing Sheets

(51) Int. Cl.
   *G01S 13/42*   (2006.01)
   *H01Q 21/29*   (2006.01)

(56) References Cited

U.S. PATENT DOCUMENTS

| | | | |
|---|---|---|---|
| 2017/0139042 A1 | 5/2017 | Alenljung et al. | |
| 2017/0307744 A1 | 10/2017 | Loesch et al. | |
| 2018/0149736 A1* | 5/2018 | Alland | H01Q 21/08 |
| 2018/0156891 A1* | 6/2018 | Brune | H01Q 21/065 |
| 2020/0103515 A1* | 4/2020 | Kishigami | G01S 13/343 |

FOREIGN PATENT DOCUMENTS

| | | |
|---|---|---|
| JP | 2017-521683 | 8/2017 |
| JP | 2017-534881 | 11/2017 |
| JP | 2018-170571 | 11/2018 |

OTHER PUBLICATIONS

Cadzow, "Direction-of-Arrival Estimation Using Signal Subspace Modeling", IEEE Transactions on Aerospace and Electronic Systems, vol. 28, No. 1, Jan. 1992, pp. 64-79.

Vaidyanathan et al., "MIMO Radar with Broadband waveforms: Smearing Filter Banks and 2D Virtual Arrays", IEEE Asilomar Conference on Signals, Systems and Computers, 2008, pp. 188-192.

English language translation of Reconsideration Report by Examiner before Appeal from Japan Patent Office (JPO) in Japanese Patent Appl. No. 2019-053737, dated Jul. 25, 2023.

English language translation of Office Action from Japan Patent Office (JPO) in Japanese Patent Appl. No. 2019-053737, dated Nov. 22, 2022.

English language translation of Office Action from Japan Patent Office (JPO) in Japanese Patent Appl. No. 2019-053737, dated Apr. 4, 2023.

English language translation of Office Action from Japan Patent Office (JPO) in Japanese Patent Appl. No. 2019-053737, dated Jun. 11, 2024.

* cited by examiner

TRANSMISSION ARRAY ARRANGEMENT

RECEPTION ARRAY ARRANGEMENT

RADAR DEVICE AND TRANSMITTING/RECEIVING ARRAY ANTENNA

TECHNICAL FIELD

The present disclosure relates to a radar apparatus and a transmission and reception array antenna.

BACKGROUND ART

Radar apparatuses that use radar transmitter signals with short wavelengths, including microwaves or millimeter waves that provide high resolution, have recently been under study. To improve safety outdoors, a demand has arisen for the development of radar apparatuses (hereinafter referred to as wide-angle radar apparatuses) that detect vehicles, as well as objects (targets) including pedestrians, in a wide-angle range.

An example configuration of radar apparatuses has been proposed which includes a plurality of antenna elements (an array antenna) in a receiving branch and also in a transmitting branch to perform beam scanning by signal processing using the transmission and reception array antenna (also referred to as a "multiple input multiple output (MIMO) radar") (for example, see NPL 1).

The MIMO radar can constitute a virtual reception array antenna (hereinafter referred to as a virtual reception array) including antenna elements the number of which is equal to the product of the number of transmission antenna elements and the number of reception antenna elements at the maximum by devising the arrangement of the antenna elements of the transmission and reception array antenna. This allows the effective opening length of the array antenna to be increased with a small number of elements, improving the angular resolution.

The MIMO radar is applicable also to two-dimensional beam scanning in the vertical direction and the horizontal direction, in addition to one-dimensional scanning in the vertical direction or the horizontal direction (for example, see PTL 1 and NPL 1).

CITATION LIST

Patent Literature

PTL 1
  Japanese Unexamined Patent Application Publication (Translation of PCT Application) No. 2017-534881

Non-Patent Literature

NPL 1
  P. P. Vaidyanathan, P. Pal, Chun-Yang Chen, "MIMO radar with broadband waveforms: Smearing filter banks and 2D virtual arrays,"
  IEEE Asilomar Conference on Signals, Systems and Computers, pp. 188-192, 2008.
NPL 2
  Direction-of-arrival estimation using signal subspace modeling, Cadzow. J. A., Aerospace and Electronic Systems, IEEE Transactions on Volume: 28, Issue: 1 Publication Year: 1992, Page(s): 64-79

SUMMARY OF INVENTION

Technical Problem

The detection performance of radar apparatuses may be decreased, depending on the antenna arrangement of the transmitting and receiving branches.

Solution to Problem

Non-limiting exemplary embodiments of the present disclosure provide a radar apparatus with improved detection performance.

A radar apparatus according to one embodiment of the present disclosure includes: a radar transmission circuit that transmits a radar signal using a transmission array antenna; and a radar reception circuit that receives a reflected wave signal using a reception array antenna, the reflected wave signal being the radar signal reflected by a target, in which: the transmission array antenna and the reception array antenna are arranged on a two-dimensional plane formed by a first axis and a second axis, the reception array antenna includes a plurality of reception antenna arrays, each of the plurality of reception antenna arrays includes a first number of antennas, wherein adjacent antennas of the first number of antennas are spaced apart at a first interval in the first axis direction and at a second interval in the second axis direction, the transmission array antenna includes a plurality of transmission antenna arrays, the plurality of transmission antenna arrays are arranged at intervals of the first number multiple of the second interval in the second axis direction, each of the plurality of transmission antenna arrays includes a plurality of antennas, the plurality of antennas are individually arranged at a same position in the second axis direction and at different positions in the first axis direction, and of the plurality of transmission antenna arrays, two transmission antenna arrays arranged continuously in the second axis direction include at least one of the antennas arranged at different positions in the first axis direction.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

Advantageous Effects of Invention

According to an exemplary embodiment of the present disclosure, the detection performance of the radar apparatus can be improved.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1A:
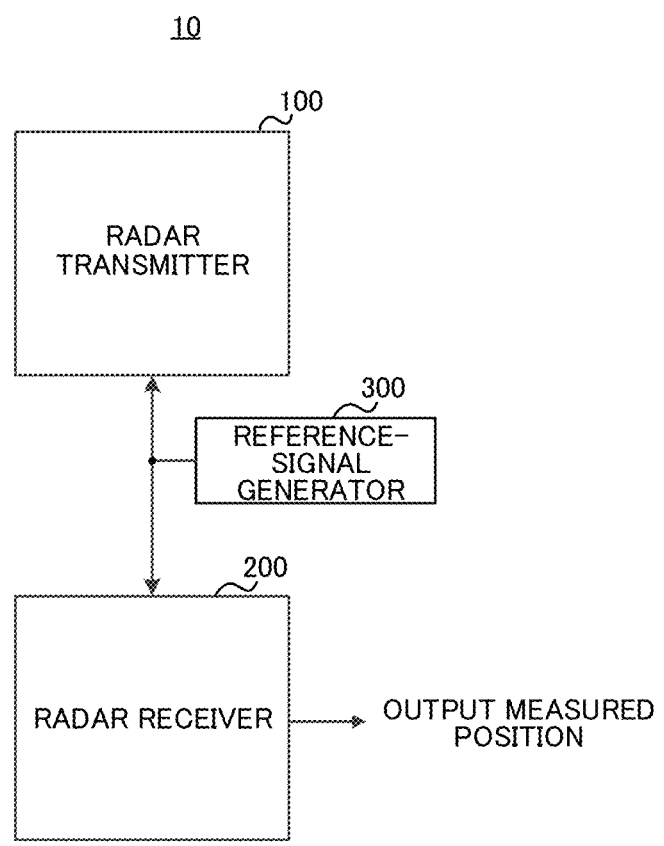
FIG. 1A is a block diagram illustrating an example configuration of a radar apparatus according to Embodiment 1.

A known example of radar apparatuses is a pulse radar apparatus that transmits pulse waves repeatedly. The received signal of a wide-angle pulse radar apparatus that detects vehicles or pedestrians in a wide range is likely to be a signal in which a plurality of reflected waves from a short-distance target (for example, a vehicle) and a long-distance target (for example, a pedestrian) are mixed. For that reason, (1) the radar transmitter needs a configuration for transmitting pulse waves or pulse modulated waves having autocorrelation characteristics with low-range sidelobes, (hereinafter referred to as low-range sidelobe characteristics) and (2) the radar receiver needs a configuration having a wide reception dynamic range.

Examples of the configuration of the wide-angle radar apparatus include the following two configurations.

The first is a configuration for transmitting radar waves by mechanically or electronically scanning pulse waves or modulated waves using a narrow-angle directional beam (for example, with a beam width of several degrees) and for receiving reflected waves using a narrow-angle directional beam. This configuration requires many times of scanning to obtain high resolution, which may decrease following performance, for example, for a target moving at higher speed.

The second is a configuration that uses a technique of receiving reflected waves using an array antenna constituted by a plurality of antennas (antenna elements) and estimating the angle of arrival of the reflected waves according to a signal processing algorism based on a reception phase difference with respect to the element spacing (antenna spacing) (direction of arrival (DOA) estimation). With this configuration, even if transmission-beam scanning intervals in the transmitting branch are thinned out, the angle of arrival can be estimated in the receiving branch, which reduces the scanning time, improving the following performance as compared with the first configuration. Examples of the direction-of-arrival estimating method include Fourier transformation based on matrix operation, Capon method and linear prediction (LP) method based on inverse matrix operation, multiple signal classification (MUSIC), and estimation of signal parameters via rotational invariance techniques (ESPRIT) based on eigenvalue operation.

The MIMO radar transmits signals multiplexed by time division, frequency division, or code division from a plurality of transmission antennas, receives signals reflected from nearby objects with a plurality of reception antennas, and separates and receives the multiplexed signals from the respective received signals.

The configuration of the antenna elements in the MIMO radar are roughly divided into a configuration using a single antenna element (hereinafter referred to as "simple antenna") and a configuration in which a plurality of antenna elements (or "sub-array elements") are sub-arrayed (hereinafter referred to as "sub-array).

The use of the simple antenna provides wide directional characteristics but low antenna gain as compared with the use of the sub-array. For that reason, to improve the signal to noise ratio (SNR) of the received signals relative to the radar-reflected waves, more addition processing operations are performed in receive signal processing or more antenna elements are used in receiving radar reflected waves.

The use of the sub-array increases the physical size of the antennas as compared with the use of the simple antenna, improving the antenna gain in the main beam direction. An example of the physical size of the sub-array is about the wavelength or more of the radio frequency (carrier frequency) of the transmitted signal.

The MIMO radar is applicable also to two-dimensional beam scanning in the vertical direction and the horizontal direction, in addition to one-dimensional scanning (angle measurement) in the vertical direction or the horizontal direction, as described above.

For example, MIMO radars capable of scanning a two-dimensional beam for long distance mounted in vehicles require horizontal resolution equal to that for MIMO radars that perform one-dimensional beam scanning in the horizontal direction, as well as vertical angle estimation capability.

However, in the case where transmission antenna elements and reception antenna elements are arranged at equal intervals of about half wavelength in the horizontal direction and the vertical direction, in which the antenna elements are next to each other, it is difficult to sub-array the antenna elements to obtain high antenna gain because of the physical limitation. In other words, in the case where the transmission antenna elements or the reception antenna elements are to be sub-arrayed, it is difficult to arrange each antenna element in a space narrower than the size of the sub-array (for example, one wavelength or more).

Arranging the antennas at irregular intervals and increasing the antenna element interval to one wavelength or more allows sub-arraying the antenna elements (for example, see PTL 1). However, when the interval between the antenna elements of the virtual reception array is increased to one wavelength or more, grating lobe or sidelobe components in the angular direction are like to occur. This increases the probability of detecting a false peak due to the grating lobes as a target (object) in the detection angular range, decreasing the detection performance of the radar apparatus.

An exemplary embodiment of the present disclosure is capable of providing a desired directional pattern by reducing the probability of false detection by increasing the opening length of the virtual reception array to reduce the generation of unwanted grating lobes. Another exemplary embodiment of the present disclosure is capable of improving the directional gain of antenna elements by constituting at least one of transmission antenna elements and reception antenna elements using a sub-array.

Embodiments according to an exemplary embodiment of the present disclosure will be described in detail hereinbelow with reference to the drawings. In the embodiments, the same components are given the same reference signs, and descriptions thereof will be omitted because of redundancy.

An example configuration of a radar apparatus will be described hereinbelow before the arrangement of a plurality of transmission antennas (for example, a transmission sub-array) and a plurality of reception antennas (for example, a reception sub-array) is described.

The following describes an example configuration of an MIMO radar apparatus in which a plurality of transmission antennas are switched in time division, and time-division multiplexed different radar transmitter signals are transmitted in the transmitting branch, and the transmitted signals are separated and received in the receiving branch. The configuration of the radar apparatus is not limited to the above configuration. Another configuration is applicable in which frequency-division multiplexed different transmitter signals are transmitted from a plurality of transmission antennas in the transmitting branch, and the transmitted signals are separated and received in the receiving branch. Still another configuration of the radar apparatus is applicable in which code-division multiplexed transmitter signals are transmitted from a plurality of transmission antennas in the transmitting branch, and the signals are received in the receiving branch.

The following embodiments are given for mere illustrative purposes, and the present disclosure is not limited to the embodiments.

Embodiment 1

(Configuration of Radar Apparatus)

FIG. 1A is a block diagram illustrating an example configuration of radar apparatus 10 according to this embodiment.

Radar apparatus 10 includes, for example, radar transmitter (transmitting branch) 100, radar receiver (receiving branch) 200, and reference-signal generator 300.

Radar transmitter 100 generates radar signals (radar transmitter signals) of a high frequency (radio frequency) based on a reference signal output from reference-signal generator 300. Radar transmitter 100 transmits radar transmitter signals at predetermined transmission intervals using a transmission array antenna constituted by a plurality of transmission antennas 108-1 to 108-Nt (for example, see FIG. 1B described later).

Radar receiver 200 receives reflected wave signals, which are radar transmitter signals reflected by a target object (target, not shown), using a reception array antenna including a plurality of reception antennas 202-1 to 202-Na (see FIG. 1B, described later). Radar receiver 200 performs a process synchronized with radar transmitter 100 by performing the following processing operation using the reference signal output from reference-signal generator 300. Radar receiver 200 processes reflected wave signals received by reception antennas 202 to detect whether a target object is present or estimate the direction of arrival of the reflected wave signals. The target object is an object to be detected by radar apparatus 10. Examples of the target object include vehicles (including four-wheel and two-wheel vehicles), a person, and a block or a curb, for example.

Reference signal generator 300 is connected to each of radar transmitter 100 and radar receiver 200. Reference signal generator 300 supplies the reference signal (the standard signal) to radar transmitter 100 and radar receiver 200 to synchronize the processing performed by radar transmitter 100 with the processing performed by radar receiver 200.

Figure 1B:
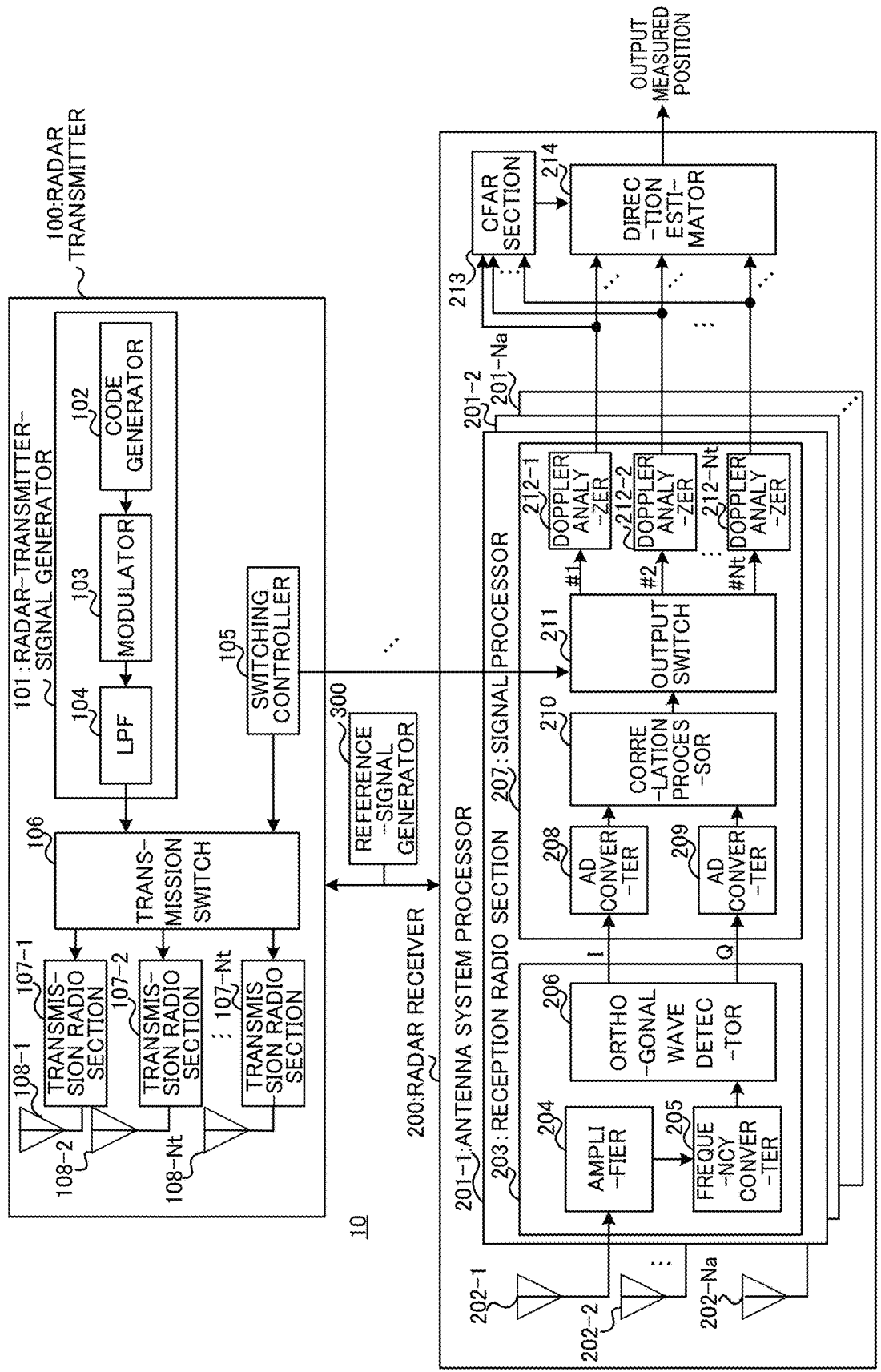
FIG. 1B is a block diagram illustrating an example configuration of the radar apparatus according to Embodiment 1.

FIG. 1B is a block diagram illustrating a more detailed example configuration of radar apparatus 10 shown in FIG. 1A. The details of the components will be described with reference to FIG. 1B.

[Configuration of Radar Transmitter 100]

Radar transmitter 100 includes radar transmission signal generator 101, switching controller 105, transmission switch 106, a transmission radio unit 107-1 to 107-Nt, and transmission antennas 108-1 to 108-Nt. That is, radar transmitter 100 has Nt transmission antennas 108, and each of transmission antennas 108 is connected to an individual transmission radio unit 107.

Radar-transmitter-signal generator 101 generates a timing clock obtained by multiplying the reference signal output from reference-signal generator 300 by a predetermined number and generates radar transmitter signals based on the generated timing clock. Radar-transmitter-signal generator 101 outputs the radar transmitter signals repeatedly in predetermined radar transmission periods (Tr). The radar transmitter signals are expressed as $y(k, M) = I(k, M) + j Q(k, M)$, for example, where j is an imaginary unit, k is a discrete time, M is the ordinal number of the radar transmission period, and $I(k, M)$ and $Q(k, M)$ are the in-phase component and the quadrature component of a radar transmitter signal (k, M) at a discrete time k in the M-th radar transmission period, respectively.

Radar transmission signal generator 101 includes code generator 102, modulator 103, and an LPF (Low Pass Filter) 104. Each of the constituent elements of radar transmission signal generator 101 is described below.

Code generator 102 generates a code an (M) (n=1, ..., L) (a pulse code) of a code sequence with a code length L every radar transmission period Tr. An example of the code an (M) generated by code generator 102 is a code that provides low-range sidelobe characteristics. Examples of the code sequence include Barker code, M-sequence code, and Gold code.

Modulator 103 performs pulse modulation (for example, amplitude modulation, amplitude shift keying (ASK), or pulse shift keying) or phase modulation (phase shift keying) on a pulse code sequence (for example, code an (M)) output from code generator 102 and outputs the modulated signal to low-pass filter (LPF) 104.

LPF 104 outputs signal components in a predetermined limited band or lower, of the modulated signals output from modulator 103, to transmission switch 106 as radar transmitter signals.

Figure 2:
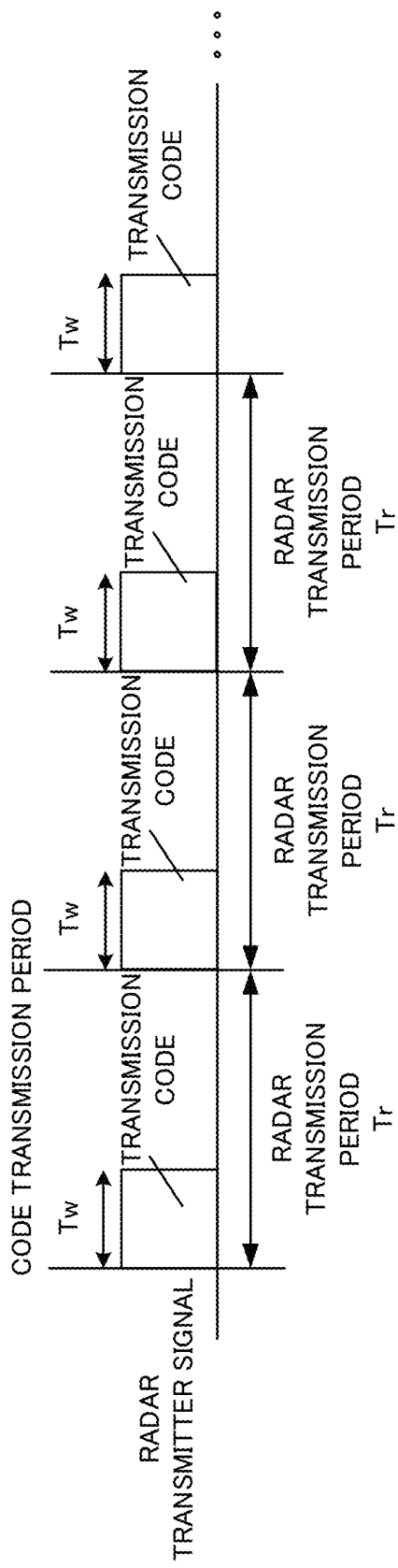
FIG. 2 is a diagram illustrating an example of a radar transmitter signal according to Embodiment 1.

FIG. 2 illustrates an example of a radar transmission signal generated by radar transmission signal generator 101. As illustrated in FIG. 2, a pulse code sequence of a code length L is included in code transmission interval Tw in the radar transmission period Tr. The pulse code sequence is transmitted in code transmission interval Tw in each of the radar transmission period Tr, and the remaining interval (Tr−Tw) is non-signal interval. A single code includes L sub-pulses. In addition, pulse modulation using No samples is performed on each of the sub-pulses and, thus, Nr (=No× L) sample signals are included in each code transmission interval Tw. Furthermore, Nu samples are included in the non-signal interval (Tr−Tw) in the radar transmission period Tr.

Switching controller 105 controls transmission switch 106 in radar transmitter 100 and output switch 211 in radar receiver 200. Note that the control operation performed on output switch 211 of radar receiver 200 by switching controller 105 is described below in the description of the operation performed by radar receiver 200. The control operation performed on transmission switch 106 of radar transmitter 100 by switching controller 105 is described below.

For example, switching controller 105 outputs, to transmission switch 106, a control signal (hereinafter referred to as a "switching control signal") to switch between transmission antennas 108 (that is, transmission radio units 107) in each radar transmission period Tr.

Transmission switch 106 performs a switching operation of outputting the radar transmitter signals output from radar-transmitter-signal generator 101 to transmission radio section 107 indicated by a switching control signal output from switching controller 105. For example, transmission switch 106 selects one of a plurality of transmission radio sections 107-1 to 107-Nt based on the switching control signal and outputs the radar transmitter signal to the selected transmission radio section 107.

The z-th (z=1, . . . , Nt) transmission radio section 107 performs frequency conversion on the radar transmitter signal in a base band output from transmission switch 106 to generate a radar transmitter signal in a carrier frequency (radio frequency (RF)) band and amplifies the signal to predetermined transmission power P [dB] with a transmission amplifier, and outputs the signal to z-th transmission antenna 108.

Zth (z=1, . . . , Nt) transmission antenna 108 radiates the radar transmission signal output from zth transmission radio unit 107 into the air.

Figure 3:
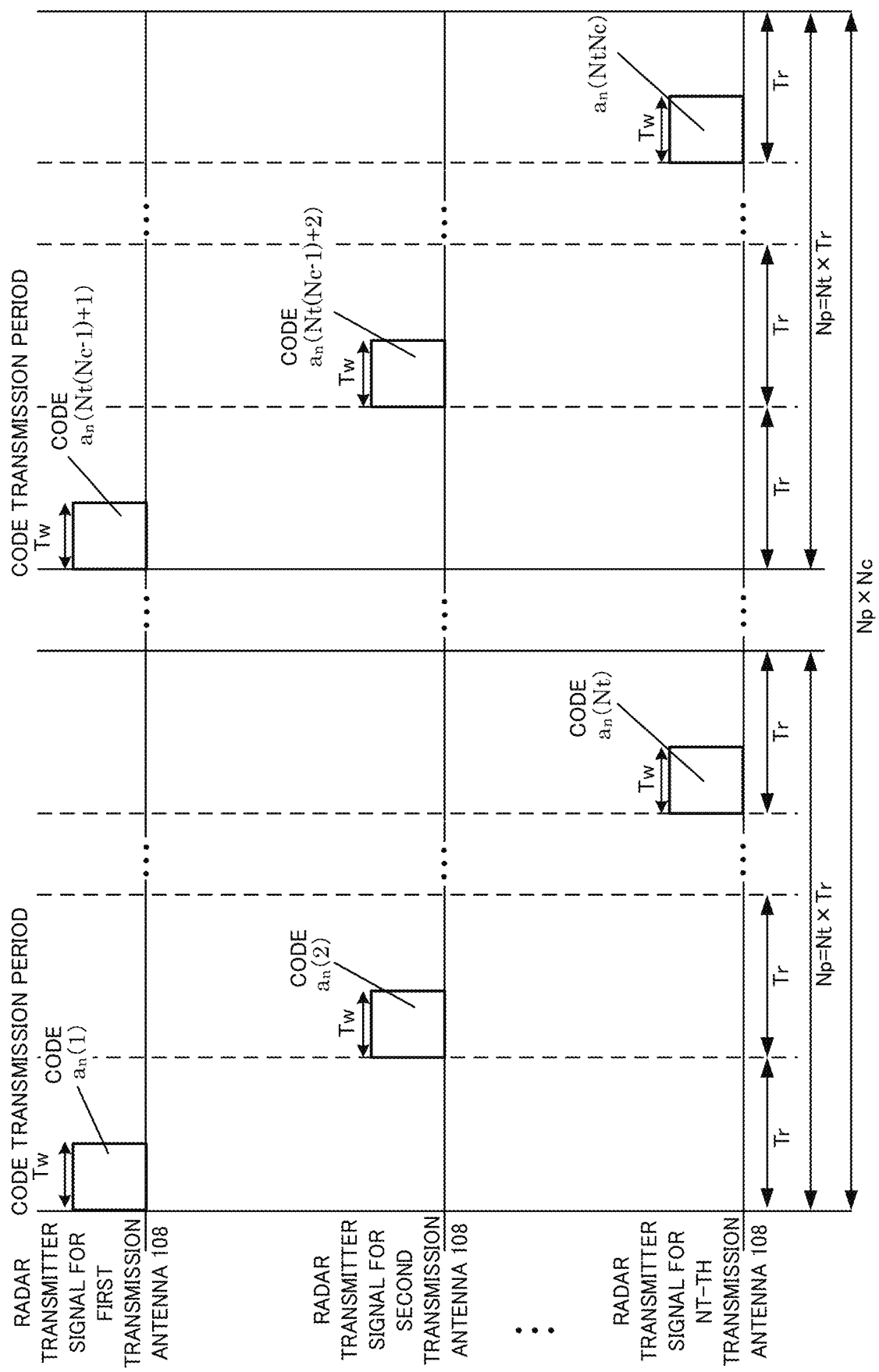
FIG. 3 is a diagram illustrating an example of transmission antenna switching control according to Embodiment 1.

FIG. 3 illustrates an example of the switching operation of transmission antenna 108 according to the present embodiment. Note that the switching operation of transmission antenna 108 according to the present embodiment is not limited to the example illustrated in FIG. 3.

In FIG. 3, switching controller 105 outputs, to transmission switch 106, a switching control signal representing an instruction to sequentially switch through transmission antennas from 1st transmission antenna 108 (or transmission radio unit 107-1) to Ntth transmission antenna 108 (or transmission radio unit 107-Nt) in each radar transmission period Tr. Thus, in each of first to Ntth transmission antennas 108, the radar transmission signal is transmitted with a transmission period of Np (=Nt×Tr).

Switching controller 105 performs control so that the switching operations performed by transmission radio unit 107 in antenna switching period Np are repeated Nc times.

Transmitter-signal transmission start time in each transmission radio section 107 need not be synchronized with period Tr. For example, each transmission radio section 107 may start transmission of the radar transmitter signal at transmission start time with different transmission delays $\Delta_1$, $\Delta_2$, . . . , $\Delta$Nt. With such transmission delays $\Delta_1$, $\Delta_2$, . . . , $\Delta$Nt, adopting a transmission-phase correction coefficient that takes transmission delays $\Delta_1$, $\Delta_2$, . . . , $\Delta$Nt into account in the process performed by radar receiver 200 reduces the influence in which different phase rotations are applied to the received signals because of Doppler frequency. Varying such transmission delays $\Delta_1$, $\Delta_2$, . . . , $\Delta$Nt every measurement provides the effect of mutually randomizing the influence of interference from another radar apparatus (not shown) when there is interference from the other radar apparatus or when the radar apparatus interferes with the other radar apparatus.

Figure 4:
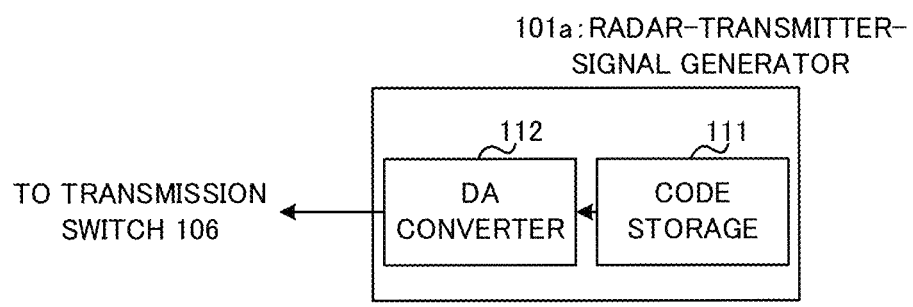
FIG. 4 is a block diagram illustrating another example configuration of a radar-transmitter-signal generator according to Embodiment 1.

Radar transmitter 100 may include radar-transmitter-signal generator 101a shown in FIG. 4 instead of radar-transmitter-signal generator 101. Radar-transmitter-signal generator 101a does not include code generator 102, modulator 103, and LPF 104 shown in FIG. 1B but includes code storage 111 and DA converter 112 in place. Code storage 111 stores a code sequence generated by code generator 102 (FIG. 1B) in advance and reads the stored code sequence cyclically in sequence. DA converter 112 converts the code sequence (digital signals) output from code storage 111 to analog signals (baseband signals).

(Configuration of Radar Receiver 200)

In FIG. 1B, radar receiver 200 includes Na reception antennas 202, which constitute an array antenna. Radar receiver 200 further includes Na antenna system processors 201-1 to 201-Na, constant false alarm rate (CFAR) section 213, and direction estimator 214.

Each reception antenna 202 receives a reflected wave signal, which is a radar transmitter signal reflected from a target object (target), and outputs the received reflected wave signal to corresponding antenna system processor 201 as a receiver signal.

Each antenna system processor 201 includes reception radio section 203 and signal processor 207.

Reception radio section 203 includes amplifier 204, frequency converter 205, and orthogonal wave detector 206. Reception radio section 203 generates a timing clock obtained by multiplying the reference signal output from reference-signal generator 300 by a predetermined number and operates on the basis of the generated timing clock. Specifically, amplifier 204 amplifies the receiver signal output from reception antenna 202 to a predetermined level. Frequency converter 205 converts the frequency of the receiver signal in a high frequency band to a baseband frequency. Orthogonal wave detector 206 converts the receiver signal in the baseband to a receiver signal in a baseband, including an I signal and a Q signal, by orthogonal detection.

Signal processor 207 of each of antenna system processors 201-z (z: any one of 1 to Na) includes AD converters 208 and 209, correlation calculator 210, output switch 211, and Doppler analyzer 212-1 to 212-Nt.

AD converter 208 receives the I signal from quadrature detector 206, while AD converter 209 receives the Q signal from quadrature detector 206. AD converter 208 performs sampling at discrete times so as to convert the I signal into digital data. AD converter 209 performs sampling on the baseband signal containing the Q signal so as to convert the Q signal into digital data.

Note that in the sampling performed by AD converters 208 and 209, Ns discrete sampling operations, for example, are performed per sub-pulse time Tp (=Tw/L) of a radar transmission signal. That is, the number of oversamples per sub-pulse is Ns.

In the following description, by using the I signal Iz(k, M) and the Q signal Qz(k, M) (where z is any one of 1 to Na), the baseband received signals at discrete time k in Mth radar transmission period Tr[M], which are the outputs from AD converters 208 and 209, are expressed as a complex number signal xz(k, M)=Iz(k, M)+j Qz(k, M). In addition, in the following description, discrete time k is based on a time at which radar transmission period (Tr) starts (k=1), and signal processor 207 periodically operates up to k=(Nr+Nu)Ns/No that is a sample point up to the end of radar transmission period Tr. That is, k=1, . . . , (Nr+Nu)Ns/No. Note that j is an imaginary number unit.

Correlation calculator 210 of zth (where z=1, . . . , Na) signal processor 207 performs correlation calculation between discrete sample value xz(k, M) including discrete sample values Iz(k, M) and Qz(k, M) received from AD converters 208 and 209 and pulse code an(M) of code length L (where z=1, . . . , Na, and n=1, . . . , L) transmitted from radar transmitter 100 in each radar transmission period Tr. For example, correlation calculator 210 performs sliding correlation calculation between discrete sample value xz(k, M) and pulse code an(M) in each radar transmission period Tr. For example, correlation calculation value ACz(k, M)

obtained through the sliding correlation calculation at discrete time k in Mth radar transmission period Tr[M] is calculated as follows:

[1]

$$AC_z(k, M) = \sum_{n=1}^{L} x_z(k + N_s(n-1), M)a_n(M)^* \quad \text{(Equation 1)}$$

In equation 1, asterisk (*) denotes a complex conjugate operator.

Correlation processor 210 performs correlation calculation over the period of k=1, ..., (Nr+Nu)Ns/No according to equation 1, for example.

Figure 5:
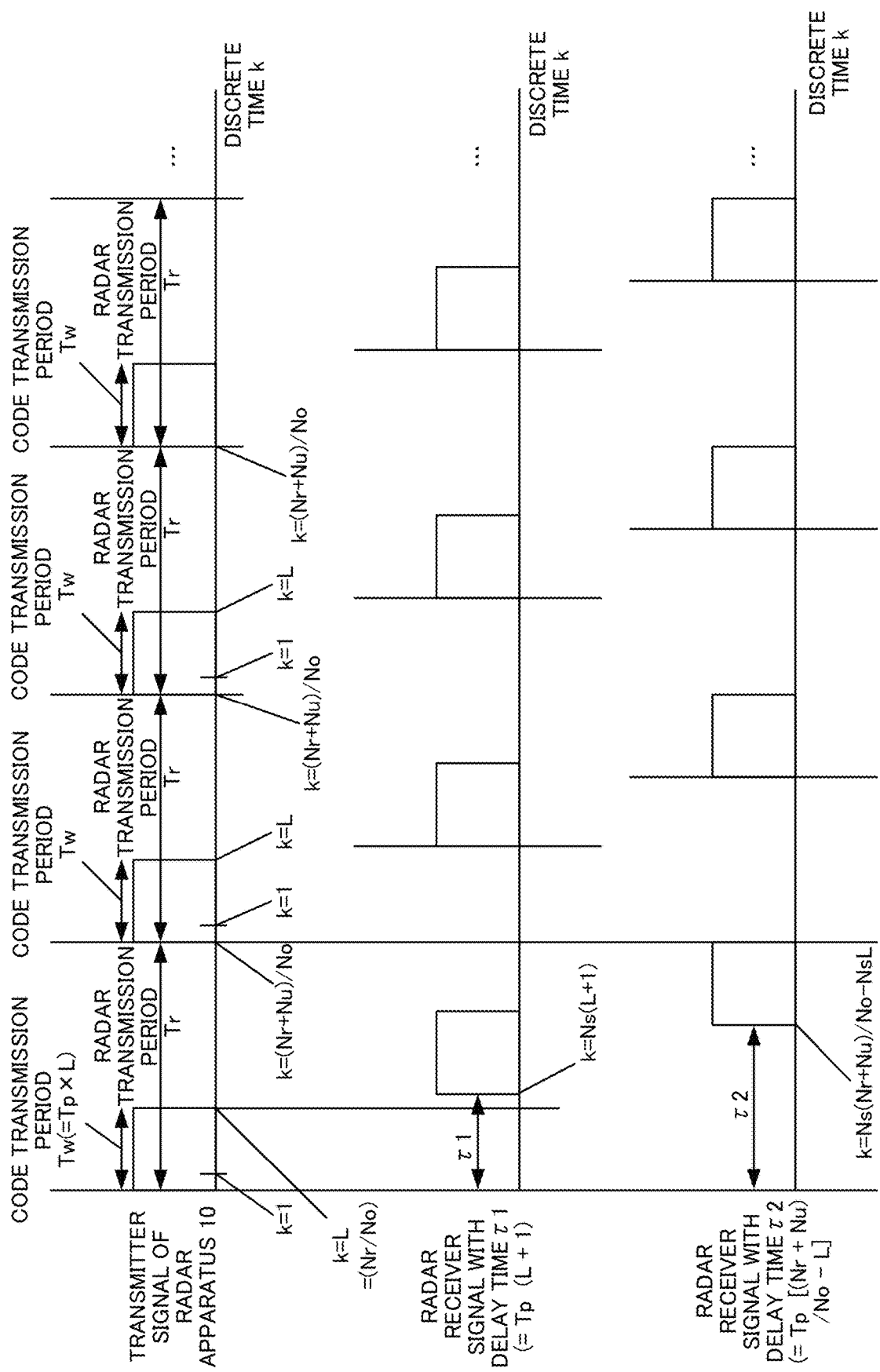
FIG. 5 is a diagram illustrating an example of transmission timing and the measurement range of radar transmitter signals according to Embodiment 1.

Correlation processor 210 may perform the correlation calculation not only on k=1, ..., (Nr+Nu)Ns/No but on a limited measurement range (the range of k) according to the range of the target to be measured by radar apparatus 10. This allows radar apparatus 10 to reduce the throughput of the correlation processor 210. For example, correlation processor 210 may limit the measurement range to k=Ns (L+1), ..., (Nr+Nu)Ns/No−NsL. In this case, radar apparatus 10 need not perform measurement in a time interval corresponding to code transmission period Tw, as shown in FIG. 5.

Thus, even if radar transmitter signals are directly wrapped around radar receiver 200, radar apparatus 10 does not perform the process performed by correlation processor 210 in the period in which radar transmitter signals are wrapped around (the period of at least less than τ1), which allows measurement in which the influence of wraparound is removed. In the case where the measurement range (the range of k) is limited, processes in which the measurement range (the range of k) is limited are applied also to the processes performed by output switch 211, doppler analyzer 212, CFAR section 213, and direction estimator 214, described later. This reduces the throughput of each component, thereby reducing the power consumed by radar receiver 200.

Output switch 211 selectively switches over to one of Nt Doppler analyzers 212 on the basis of a switching control signal input from switching controller 105 and outputs an output from correlation calculator 210 to Doppler analyzer 212 in each radar transmission period Tr. Hereinafter, as an example, a switching control signal in Mth radar transmission period Tr[M] is represented by Nt-bit information [bit1(M), bit2(M), ..., bitNt(M)]. For example, in the case where an NDth bit of the switching control signal in Mth radar transmission period Tr[M] (where ND is any one of 1 to Nt) is "1", output switch 211 selects NDth Doppler analyzer 212 (that is, switches on Doppler analyzer 212). In contrast, in the case where the NDth bit of the switching control signal in Mth radar transmission period Tr[M] is "0", output switch 211 does not select NDth Doppler analyzer 212 (that is, switches off Doppler analyzer 212). Output switch 211 outputs, to selected Doppler analyzer 212, the correlation calculation value ACz(k, M) that is input from correlation calculator 210.

Examples of an Nt-bit switching control signal corresponding to the switching operation for transmission radio section 107 (or transmission antenna 108) shown in FIG. 3 are as follows:

[bit1(1),bit2(1), ... ,bitNt(1)]=[1,0, ... ,0]

[bit1(2),bit2(2), ... ,bitNt(2)]=[0,1, ... ,0]

[bit1(Nt),bit2(Nt), ... ,bitNt(Nt)]=[0,0, ... ,1]

Thus, each doppler analyzer 212 is selected (in other words, turned ON) in sequence at intervals of Np(=Nt×Tr). For example, the switching control signal repeats the above sequence Nc times.

Zth (z=1, ..., Na) signal processor 207 includes Nt Doppler analyzers 212.

Doppler analyzer 212 performs Doppler analysis on the output from output switch 211 (for example, the correlation calculation value ACz(k, M)) at each discrete time k. For example, if Nc is a power of 2, the Fast Fourier Transform (FFT) process can be employed in the Doppler analysis.

The w-th output of ND-th doppler analyzer 212 of z-th signal processor 207 exhibits Doppler frequency response $FT\_CI_z^{(ND)}(k, f_s, w)$ of Doppler frequency index $f_s$ at discrete time k, as expressed in the following equation, where ND=1 to Nt, k=1, ..., (Nr+Nu)Ns/No, w is an integer equal to or greater than 1, j is an imaginary unit, and z=1 to Na.

(Equation 2)

[2]

$$FT\_CI_z^{(ND)}(k, f_s, w) = \sum_{q=0}^{N_tN_c-1} bit_{ND}(q+1)AC_z(k, N_tN_c(w-1)+q+1)\exp\left[-j\frac{2\pi\left\lfloor\frac{q}{N_t}\right\rfloor f_s}{N_c}\right]$$

In fast Fourier transformation (FFT) processing, doppler analyzer 212 may perform multiplication by a window function coefficient, such as Han window or Hamming window. The use of the window function coefficient reduces a beat frequency and sidelobes generated around peaks.

The foregoing is given processes performed by the components of signal processor 207.

CFAR section 213 performs CFAR processing (in other words, adaptive threshold determination) using the outputs of doppler analyzers 212 to extract index k_cfar of discrete time and index fs_cfar of Doppler frequency, and outputs the indices to direction estimator 214.

Radar apparatus 10 may perform direction estimation processing with direction estimator 214 without performing CFAR processing. In other words, CFAR section 213 may be omitted in radar receiver 200.

Direction estimator 214 performs target direction estimation processing using the outputs from the doppler analyzers 212 based on the information output from CFAR section 213 (for example, time index k_cfar and Doppler frequency index fs_cfar).

For example, direction estimator 214 generates virtual reception array correlation vector h(k, $f_s$, w), as given by equation 3, to perform direction estimation processing.

The w-th outputs from doppler analyzers 212-1 to 212-Nt, which are obtained by similar processing performed by signal processors 207 in antenna system processors 201-1 to 201-Na, are expressed as virtual reception array correlation vector h(k, $f_s$, w) including Nt×Na elements, which is the product of the number Nt of transmission antennas and the number Na of reception antennas, as expressed in equation 3 and equation 4. Virtual reception array correlation vector h(k, $f_s$, w) is used for processing for direction estimation based on the phase difference between reception antennas 202 on the reflected wave signals from the target.

(Equation 3)

$$h(k, f_s, w) = \begin{bmatrix} FT\_CI_1^{(1)}(k, f_s, w)TxCAL^{(1)}(f_s) \\ FT\_CI_1^{(2)}(k, f_s, w)TxCAL^{(2)}(f_s) \\ \vdots \\ FT\_CI_1^{(N_t)}(k, f_s, w)TxCAL^{(N_t)}(f_s) \\ FT\_CI_2^{(1)}(k, f_s, w)TxCAL^{(1)}(f_s) \\ FT\_CI_2^{(2)}(k, f_s, w)TxCAL^{(2)}(f_s) \\ \vdots \\ FT\_CI_2^{(N_t)}(k, f_s, w)TxCAL^{(N_t)}(f_s) \\ \vdots \\ FT\_CI_{N_a}^{(1)}(k, f_s, w)TxCAL^{(1)}(f_s) \\ FT\_CI_{N_a}^{(2)}(k, f_s, w)TxCAL^{(2)}(f_s) \\ \vdots \\ FT\_CI_{N_a}^{(N_t)}(k, f_s, w)TxCAL^{(N_t)}(f_s) \end{bmatrix} \quad [3]$$

$$= \begin{bmatrix} h_1(k, f_s, w) \\ h_2(k, f_s, w) \\ \vdots \\ h_{Na}(k, f_s, w) \end{bmatrix}$$

(Equation 4)

$$h_z(k, fs, w) = \begin{bmatrix} FT\_CI_z^{(1)}(k, f_s, w)TxCAL^{(1)}(f_s) \\ FT\_CI_z^{(2)}(k, f_s, w)TxCAL^{(2)}(f_s) \\ \vdots \\ FT\_CI_z^{(N_t)}(k, f_s, w)TxCAL^{(3)}(f_s) \end{bmatrix} \quad [4]$$

where z=1, . . . , Na, and ND=1, . . . , Nt.

For CFAR processing, virtual reception array correlation vector $h(k, f_s, w)$ is $h(k\_cfar, fs\_cfar, w)$ using the index of the peak signal extracted by CFAR processing. Virtual reception array correlation vector $h(k\_cfar, fs\_cfar, w)$ is a column vector including Na×Nt elements.

In radar apparatus 10, transmission antennas 108 are switched using time division. This causes different phase rotations at different Doppler frequencies $f_s$. In equation 3 and equation 4, $TxCAL^{(1)}(f_s), \ldots, TxCAL^{(N_t)}(f_s)$ is a transmission-phase correction coefficient for correcting the phase rotations to match the phase of the reference transmission antenna.

For example, if first transmission antenna 108 (ND=1) corresponding to the switching operation of transmission radio section 107 (or transmission antenna 108) shown in FIG. 3 is the reference transmission antenna, the transmission-phase correction coefficient is given by the following equation.

(Equation 5)

$$TxCAL^{(1)}(f_s) = 1, \ TxCAL^{(2)}(f_s) = \exp\left(-j\frac{2\pi f_s}{Nc}\frac{1}{2}\right),$$

$$TxCAL^{(N_t)}(f_s) = \exp\left(-j\frac{2\pi f_s}{N_c}\frac{N_t-1}{N_t}\right) \quad [5]$$

In the case where the transmitter signal transmission start times of transmission radio sections 107 are given different transmission delays $\Delta_1, \Delta_2, \ldots, \Delta_{N_t}$, the transmission-phase correction coefficient $TxCAL^{(ND)}(f_s)$ expressed in equation 5 may be multiplied by the correction coefficient $\Delta_{TxCAL}^{(ND)}(f)$ of equation 6 to obtain a new transmission-phase correction coefficient $TxCAL^{(ND)}(f_s)$. This allows the influence of the different phase rotations to be removed using Doppler frequencies.

(Equation 6)

$$\Delta_{TxCAL}^{(ND)}(f_s) = \exp\left(-j\frac{2\pi f_s}{Nc}\frac{\Delta_{ND}-\Delta_{ref}}{N_p}\right) \quad [6]$$

where ND in $\Delta_{TxCAL}^{(ND)}(f_s)$ is a reference transmission antenna number used as phase reference.

In FIG. 1B, direction estimator 214 calculates virtual reception array correlation vector h_after_cal(k, $f_s$, w) in which the deviation between antennas is corrected by multiplying the virtual reception array correlation vector h(k, $f_s$, w) of w-th doppler analyzer 212, output from first signal processor 207 to Na-th signal processor 207 by array correction value $h_{cal[b]}$ for correcting the phase shift deviation and the amplitude difference between the transmission antennas and between the reception array antennas. Virtual reception array correlation vector h_after_cal(k, $f_s$, w) is given by equation 7.

(Equation 7)

$$h\_{after\_cal}(k, fs, w) = CA\, h(k, fs, w) = \begin{bmatrix} h_1(k, fs, w) \\ h_2(k, fs, w) \\ \vdots \\ h_{Na \times Nr}(k, fs, w) \end{bmatrix} \quad [7]$$

$$CA = \begin{bmatrix} h\_cal_{[1]} & 0 & \cdots & 0 \\ 0 & h\_cal_{[2]} & \cdots & 0 \\ \vdots & \ddots & \ddots & \vdots \\ 0 & \cdots & 0 & h\_cal_{[Nt \times Na]} \end{bmatrix}$$

where b=1, . . . , (Nt×Na).

Virtual reception array correlation vector h_after_cal(k, $f_s$, w) in which the deviation between the antennas is corrected is a column vector including Na×Nt elements. The following is a description of direction estimation processing in which the elements of virtual reception array correlation vector h_after_cal(k, $f_s$, w) are expressed as $h_1(k, f_s, w), \ldots, h_{Na \times Nt}(k, f_s, w)$.

Direction estimator 214 performs direction estimation processing based on the phase difference between the reflected wave signals of reception antennas 202 using virtual reception array correlation vector h_after_cal(k, $f_s$, w).

Direction estimator 214 calculates a spatial profile, with the azimuth direction θ in a direction estimation evaluation function $P_H(\theta, k, f_s, w)$ varied in a predetermined angular range, extracts a predetermined number of maximum peaks of the calculated spatial profile in descending order, and takes the azimuth direction of the maximum peaks as direction-of-arrival estimate values.

The evaluation function value $P_H(\theta, k, f_s, w)$ depends on the direction-of-arrival estimation algorithm. For example, an estimation method using an array antenna disclosed in NPL 2 may be used. For example, a beamformer method can be expressed as equation 8 and equation 9. Other applicable methods include Capon and MUSIC methods.

(Equation 8)

$$P_H(\theta_u, k, fs, w) = |a_H(\theta_u)^H h\_{after\_cal}(k, fs, w)|^2 \quad [8]$$

-continued (Equation 9)

$$a_H(\theta_u) = \begin{bmatrix} 1 \\ \exp\{-j2\pi d_H \sin\theta_u / \lambda\} \\ \exp\{-j2\pi(N_{VAH}-1)d_H \sin\theta_u / \lambda\} \end{bmatrix} \quad [9]$$

Where superscript H is an Hermitian transpose operator, $a_H(\theta_u)$ is the directional vector of the virtual reception array with respect to incoming waves in azimuth direction $\theta_u$, $\theta_u$ is the azimuth range of direction-of-arrival estimation varied for a predetermined azimuth interval $\beta_1$. For example, $\theta_u$ is set as follows:

$$\theta_u = \theta \min + u\beta_1, u=0, \ldots, NU$$

$$NU = \text{floor}[\theta \max - \theta \min)/\beta_1] + 1$$

where floor(x) is a function that returns a maximum integer value that does not exceed real number x.

A case where the process performed by direction estimator 214 is applied to the three-dimensional coordinate system shown in FIG. 6, and two-dimensional estimation process is performed will be described.

Figure 6:
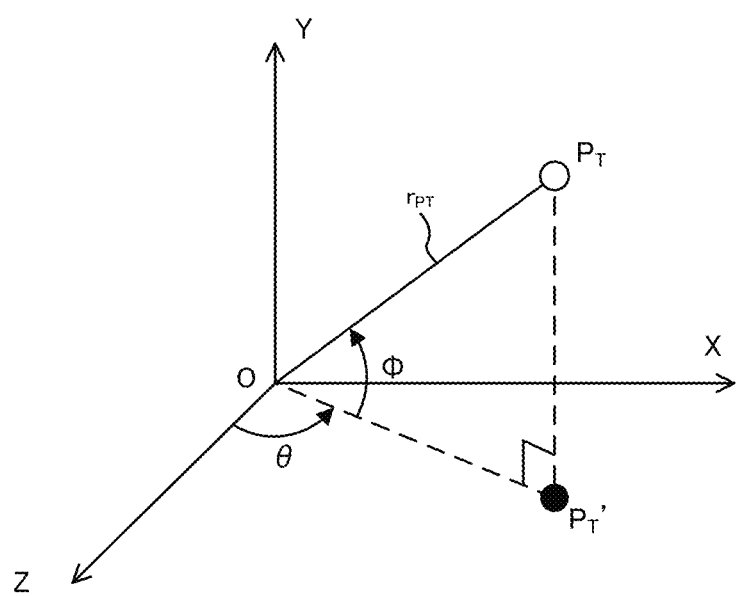
FIG. 6 is a diagram illustrating a three-dimensional coordinate system for use in describing the operation of a direction estimator according to Embodiment 1.

In FIG. 6, the position vector of target object (target) $P_T$ with respect to orgin O is defined as $r_{PT}$. In FIG. 6, $P_T'$ is the projective point of the position vector rpT of target object $P_T$ projected to an X-Z plane. In this case, azimuth angle $\theta$ is defined as the angle between line O-$P_T'$ and the Z-axis (if the X-coordinate of target object $P_T$ is positive, $\theta>0$). Elevation angle $\varphi$ is defined as the angle of a line connecting target object $P_T$, orgin O, and projective point $P_T'$ in a plane including target object $P_T$, orgin O, and projective point $P_T$ (if the Y-coordinate of target object $P_T$ is positive, $\varphi>0$). The following is an example in which transmission antennas 108 and reception antennas 202 are arranged in an X-Y plane.

The position vector of the $n_{va}$-th antenna element in the virtual reception array with reference to orgin O is expressed as $Sn_{va}$, where $n_{va}=1, \ldots, Nt \times Na$.

The position vector $S_1$ of the first ($n_{va}=1$) antenna element in the virtual reception array is determined on the basis of the positional relationship between the physical position of first reception antenna 202 and orgin O. The position vectors $S_2, \ldots, Sn_{va}$ of the other antenna elements in the virtual reception array are determined with reference to position vector $S_1$ of the first antenna element, with the relative arrangement of the virtual reception array determined from the element spacing of transmission antennas 109 and reception antennas 202 in an X-Y plane kept. Origin O may be aligned with the physical position of first reception antenna 202.

In the case where radar receiver 200 receives reflected waves from target object $P_T$ present in a far field, the phase difference d($r_{PT}$, 2, 1) of the receiver signal of the second antenna element based on the receiver signal of the first antenna element in the virtual reception array is expressed by equation 10.

(Equation 10)

$$d(r_{PT}, 2, 1) = -\frac{2\pi}{\lambda} \frac{\langle -r_{PT}, (S_2-S_1) \rangle}{|r_{PT}|} = \frac{2\pi}{\lambda} \left\langle \frac{r_{PT}}{|r_{PT}|}, (S_2-S_1) \right\rangle = \frac{2\pi}{\lambda} \left\langle \frac{r_{PT}}{|r_{PT}|}, D(2,1) \right\rangle \quad [10]$$

where <x, y> is the inner product operator of vector x and vector y.

The position vector of the second antenna element with respect to the position vector of the first antenna element in the virtual reception array is expressed as inter-element vector D(2, 1) in equation 11.

$$D(2,1) = S_2 - S_1 \quad \text{(Equation 11)}$$

Likewise, in the case where radar receiver 200 receives reflected waves from target object $P_T$ present in a far field, the phase difference d($r_{PT}$, $n_{va}^{(t)}$, $n_{va}^{(r)}$) of the receiver signal of the $n_{va}^{(t)}$-th antenna element with reference to the receiver signal of the $n_{va}^{(r)}$-th antenna element in the virtual reception array is expressed by equation 12.

(Equation 12)

$$d(r_{PT}, n_{va}^{(t)}, n_{va}^{(r)}) = \frac{2\pi}{\lambda} \left\langle \frac{r_{PT}}{|r_{PT}|}, D(n_{va}^{(t)}, n_{va}^{(r)}) \right\rangle \quad [12]$$

where $n_{va}^{(r)}=1, \ldots, Nt \times Na$, $n_{va}^{(t)}=1, \ldots, Nt \times Na$.

The position vector of the $n_{va}^{(t)}$-th antenna element with reference to the position vector of the $n_{va}^{(r)}$-th antenna element in the virtual reception array is expressed as inter-element vector D($n_{va}^{(t)}$, $n_{va}^{(r)}$) in equation 13.

$$D(n_{va}^{(t)}, n_{va}^{(r)}) = S_{n_{va}^{(t)}} - S_{n_{va}^{(r)}} \quad \text{(Equation 13)}$$

As expressed by equation 12 and equation 13, the phase difference d($r_{PT}$, $n_{va}^{(t)}$, nva$^{(r)}$) of the receiver signal of the $n_{va}^{(t)}$-th antenna element based on the receiver signal of the nva$^{(r)}$-th antenna element in the virtual reception array depends on the unit vector ($r_{PT}/|r_{PT}|$) indicating the direction of target object $P_T$ present in a far field and inter-element vector D($n_{va}^{(t)}$, nva$^{(r)}$).

In the case where the virtual reception array is present in the same plane, inter-element vector D($n_{va}^{(t)}$, nva$^{(r)}$) is present in the same plane. Direction estimator 214 assumes that antenna elements are virtually present at positions indicated by the inter-element vector to constitute a virtual plane array antenna using all or some of such inter-element vectors and performs a two-dimensional direction estimation process. In other words, direction estimator 214 performs a direction-of-arrival estimation process using a plurality of virtual antenna elements interpolated by means of an interpolation process on the antenna elements constituting the virtual reception array.

If the virtual antenna elements overlap, direction estimator 214 may select one of the overlapped antenna elements in advance in a fixed manner. Alternatively, direction estimator 214 may perform an averaging process using the receiver signals of all of the overlapped virtual antenna elements.

The following is a two-dimensional direction estimation process using a beamformer method in the case where a virtual plane array antenna is formed of $N_q$ inter-element vectors.

Let D($n_{va(nq)}^{(t)}$, $n_{va(nq)}^{(r)}$) be the nq-th inter-element vector of the virtual plane array antenna, where $n_q=1, \ldots, N_q$.

For example, direction estimator 214 generates virtual plane array antenna correlation vector $h_{VA}(k, f_s, w)$ expressed in equation 14 using $h_1(k, f_s, w), \ldots, h_{Na \times N}(k, f_s, w)$ which are the elements of virtual reception array correlation vector h_after_cal(k, $f_s$, w).

(Equation 14)

$$h_{VA}(k, fs, w) = CA\, h(k, fs, w) = \begin{bmatrix} h_{n_{va(1)}^{(t)}}(k, fs, w) h^*_{n_{va(1)}^{(r)}}(k, fs, w) / \left|h^*_{n_{va(1)}^{(r)}}(k, fs, w)\right| \\ h_{n_{va(2)}^{(t)}}(k, fs, w) h^*_{n_{va(2)}^{(r)}}(k, fs, w) / \left|h^*_{n_{va(2)}^{(r)}}(k, fs, w)\right| \\ \vdots \\ h_{n_{va(N_q)}^{(t)}}(k, fs, w) h^*_{n_{va(N_q)}^{(r)}}(k, fs, w) / \left|h^*_{n_{va(N_q)}^{(r)}}(k, fs, w)\right| \end{bmatrix}$$ [14]

Virtual plane array directional vector $a_{VA}(\theta_u, \varphi v)$ is expressed by equation 15.

(Equation 15)

$$a_{VA}(\theta_u, \Phi_v) = \begin{bmatrix} \exp\left\{j\frac{2\pi}{\lambda}\left\langle \frac{r_{PT}(\theta_u, \Phi_v)}{|r_{PT}(\theta_u, \Phi_v)|}, D\left(n_{va(1)}^{(t)}, n_{va(1)}^{(r)}\right)\right\rangle\right\} \\ \exp\left\{j\frac{2\pi}{\lambda}\left\langle \frac{r_{PT}(\theta_u, \Phi_v)}{|r_{PT}(\theta_u, \Phi_v)|}, D\left(n_{va(2)}^{(t)}, n_{va(2)}^{(r)}\right)\right\rangle\right\} \\ \vdots \\ \exp\left\{j\frac{2\pi}{\lambda}\left\langle \frac{r_{PT}(\theta_u, \Phi_v)}{|r_{PT}(\theta_u, \Phi_v)|}, D\left(n_{va(N_q)}^{(t)}, n_{va(N_q)}^{(r)}\right)\right\rangle\right\} \end{bmatrix}$$ [15]

In the case where the virtual reception array is present in an X-Y plane, the relationship among unit vector ($r_{PT}/|r_{PT}|$) indicating the direction of target object $P_T$, azimuth angle θ, and elevation angle φ is expressed by equation 16.

(Equation 16)

$$\frac{r_{PT}(\theta_u, \Phi_v)}{|r_{PT}(\theta_u, \Phi_v)|} = \begin{pmatrix} \sin\theta_u \cos\Phi_v \\ \sin\Phi_v \\ \cos\theta_u \cos\Phi_v \end{pmatrix}$$ [16]

Direction estimator 214 calculates unit vector ($r_{PT}/|r_{PT}|$) using equation 16 for each of angular directions $\theta_u$ and φv for calculating a vertical and horizontal two-dimensional spatial profile.

Further, direction estimator 214 performs a horizontal and vertical two-dimensional direction estimation process using virtual plane array antenna correlation vector $h_{VA}(k, f_s, w)$ and virtual plane array directional vector $a_{VA}(\theta_u, \varphi v)$.

In the two-dimensional direction estimation process using the beamformer method, direction estimator 214 calculates a vertical and horizontal two-dimensional spatial profile using the two-dimensional direction estimation evaluation function expressed by equation 17 using virtual plane array antenna correlation vector $h_{VA}(k, f_s, w)$ and virtual plane array directional vector $a_{VA}(\theta_u, \varphi v)$. Direction estimator 214 takes an azimuth angle and an elevation angle direction that are the maximum value or maximal value of the calculated two-dimensional spatial profile as a direction-of-arrival estimate value.

[17]

$$P_{VA}(\theta_u, \varphi_v, k, fs, w) = |a_{VA}(\theta_u, \varphi_v)^H h_{VA}(k, f_s, w)|^2 \quad \text{(Equation 17)}$$

In addition to the beamformer method, direction estimator 214 may apply a high-resolution direction-of-arrival estimation algorithm, such as a Capon method or a MUSIC method, using virtual plane array antenna correlation vector $h_{VA}(k, f_s, w)$ and virtual plane array directional vector $a_{VA}(\theta_u, \varphi v)$. This increases the amount of operation but can improve the angular resolution.

Direction estimator 214 performs a two-dimensional estimation process as shown in the three-dimensional coordinate system of FIG. 6. Alternatively, direction estimator 214 may perform a one-dimensional estimation process for a two-dimensional coordinate system.

While the foregoing description is on the direction estimation process performed by an MIMO radar that uses a plurality of antennas of radar transmitter 100 and radar receiver 200, the invention is applicable also to a case where one of radar transmitter 100 and radar receiver 200 includes a plurality of antennas.

The foregoing is a description on the operation of direction estimator 214.

Time information k described above may be converted to distance information and output. To convert time information k to distance information R(k), equation 18 is used.

(Equation 18)

$$R(k) = k\frac{T_w C_0}{2L}$$ [18]

where $T_w$ is code transmission period, L is pulse code length, and $C_0$ is light speed.

Doppler frequency information may be converted to a relative speed component and output. To convert Doppler frequency $f_s\Delta\varphi$ to relative speed component $vd(f_s)$, equation 19 may be used.

(Equation 19)

$$v_d(f_s) = \frac{\lambda}{2}f_s\Delta\Phi$$ [19]

where λ is the wavelength of the carrier frequency of a radio-frequency (RF) signal.

(Antenna Arrangement Example of Radar Apparatus 10)

The arrangement of Nt transmission antennas 108 and Na reception antennas 202 of radar apparatus 10 with the above configuration will be described.

Figure 7A:
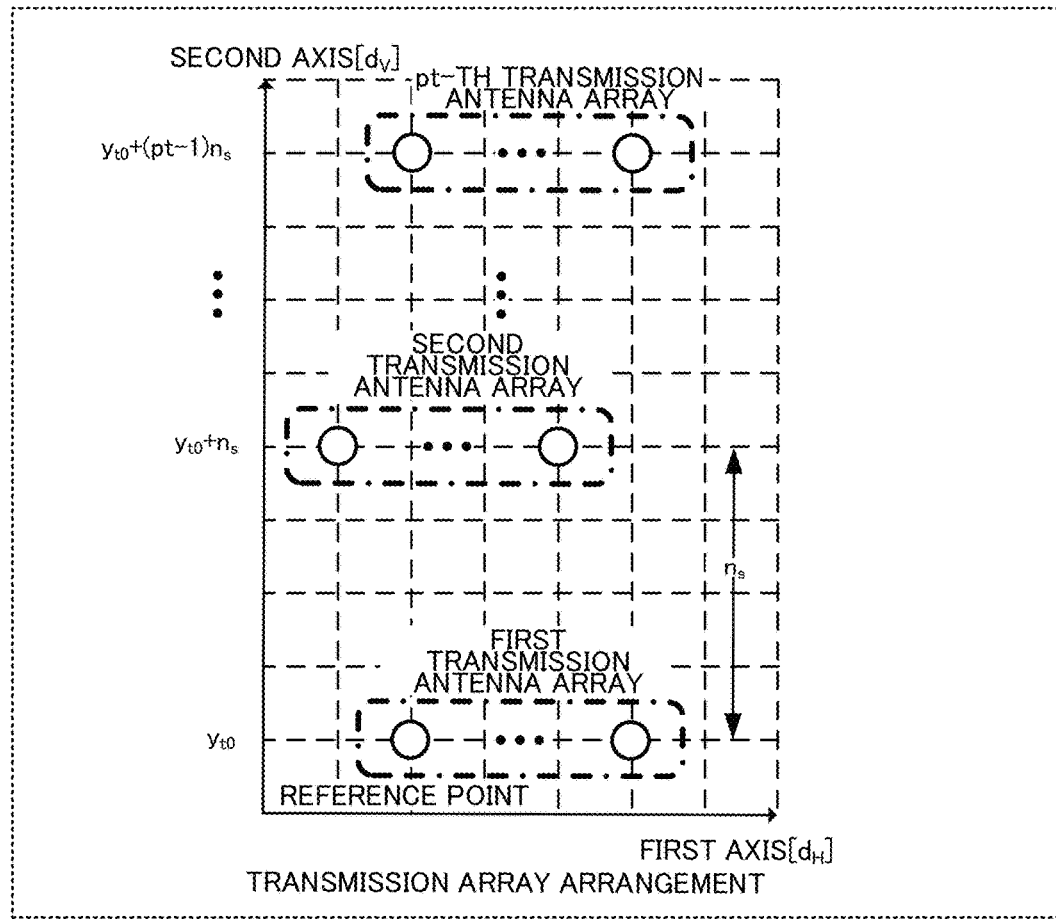
FIG. 7A is a diagram illustrating an arrangement example of transmission antennas according to Embodiment 1.
Figure 7B:
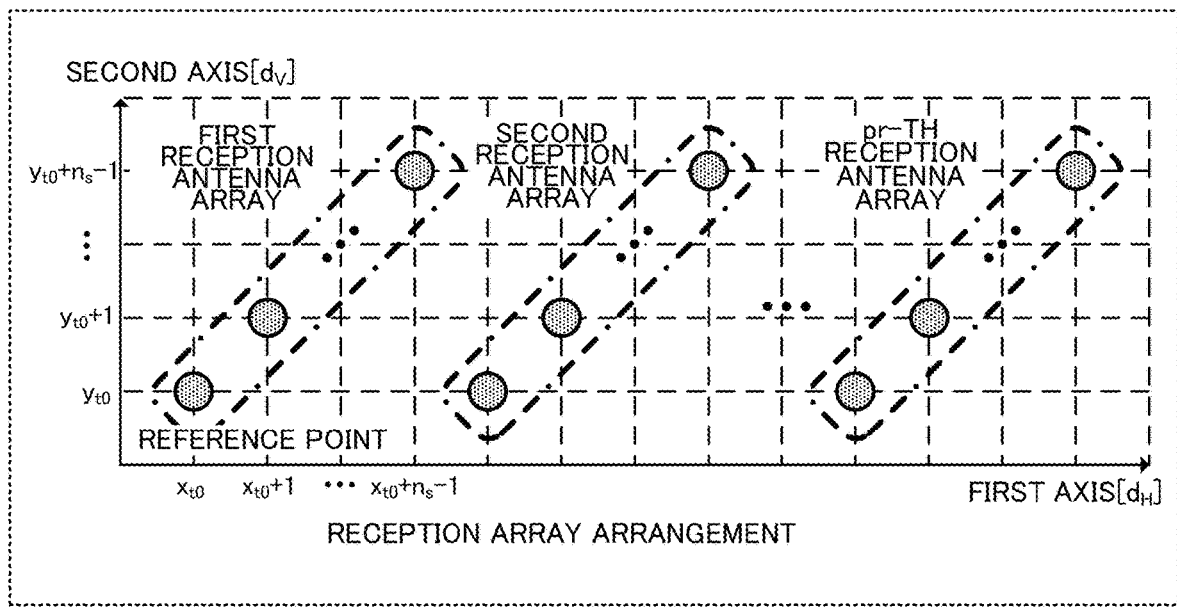
FIG. 7B is a diagram illustrating an arrangement example of reception antennas according to Embodiment 1.

FIGS. 7A and 7B are diagrams illustrating arrangement examples of transmission antennas 108 and reception antennas 202 according to this embodiment.

In FIGS. 7A and 7B, transmission antennas 108 and reception antennas 202 are arranged at positions of an integral multiple of basic interval $d_H$ along a first axis and at positions of integral multiple of basic interval $d_V$ along a second axis. In other words, transmission antennas 108 (for example, a transmission array antenna) and reception antennas 202 (for example, a reception array antenna) are arranged in a two-dimensional plane formed by the first axis and the second axis. The first axis and the second axis preferably cross at right angles, but this is not restrictive.

The arrangement of transmission antennas 108 (transmission array arrangement) and the arrangement of reception antennas 202 (reception array arrangement) may be opposite to the arrangement shown in FIGS. 7A and 7B. In other words, transmission antennas 108 may be arranged like reception antennas 202 shown in FIG. 7B, and reception antennas 202 may be arranged like transmission antennas 108 illustrated in FIG. 7A. This also applies to the other embodiments and variations described later.

With the arrangement of transmission antennas 108 shown in FIG. 7A, the transmission array antenna includes a plurality of "transmission antenna arrays" including a plurality of antennas arranged at the same position in the second axis direction and at different positions in the first axis direction.

As shown in FIG. 7A, $p_t$ ($p_t \geq 2$) transmission antenna arrays are arranged at intervals of ns×dv in the second axis direction. For example, in FIG. 7A, if the coordinate of the first transmission antenna array in the second axis direction is $y_{t0}$, the coordinate of the n(n=1 to $p_t$)-th transmission antenna array in the second axis direction is $y_{t0}+(n-1)n_s$.

As shown in FIG. 7A, the antennas in transmission antenna arrays adjacent in the second axis direction (for example, two continuing antenna arrays, a first transmission antenna array and a second transmission antenna array) are arranged at different positions in the first axis direction. In other words, the antennas included in transmission antenna arrays adjacent in the second axis direction include one or more antennas arranged at different positions in the first axis direction (in other words, the position of at least one antenna does not overlap in the first axis direction).

In the arrangement of reception antennas 202 shown in FIG. 7B, $p_r$ ($p_r \geq 2$) "reception antenna arrays" including ns antennas arranged at basic intervals of $d_H$ in the first axis direction and at basic intervals of $d_V$ in the second axis direction are repeatedly arranged in the first axis direction. In other words, adjacent antennas of ns antennas in each reception antenna array are arranged basic interval $d_H$ apart in the first axis direction, and basic interval $d_V$ apart in the second axis direction. Reception antennas 202 shown in FIG. 7B are arranged like a sawtooth.

For example, a case where the first axis direction in FIGS. 7A and 7B is the horizontal direction, and the second axis direction is the vertical direction will be described. In this case, one antenna system of each of transmission antennas 108 and reception antennas 202 can increase the antenna gain by increasing the opening length in the first axis direction (for example, in the horizontal direction) and in the second axis direction (for example, in the vertical direction), with the points (white circles and half-tone circles) shown in FIGS. 7A and 7B, respectively, as the phase center to narrow the beam width in the horizontal direction and the vertical direction. For example, one antenna system may be constituted by sub-array antennas. Sub-array antennas may be weighted to reduce sidelobes.

Figure 8:
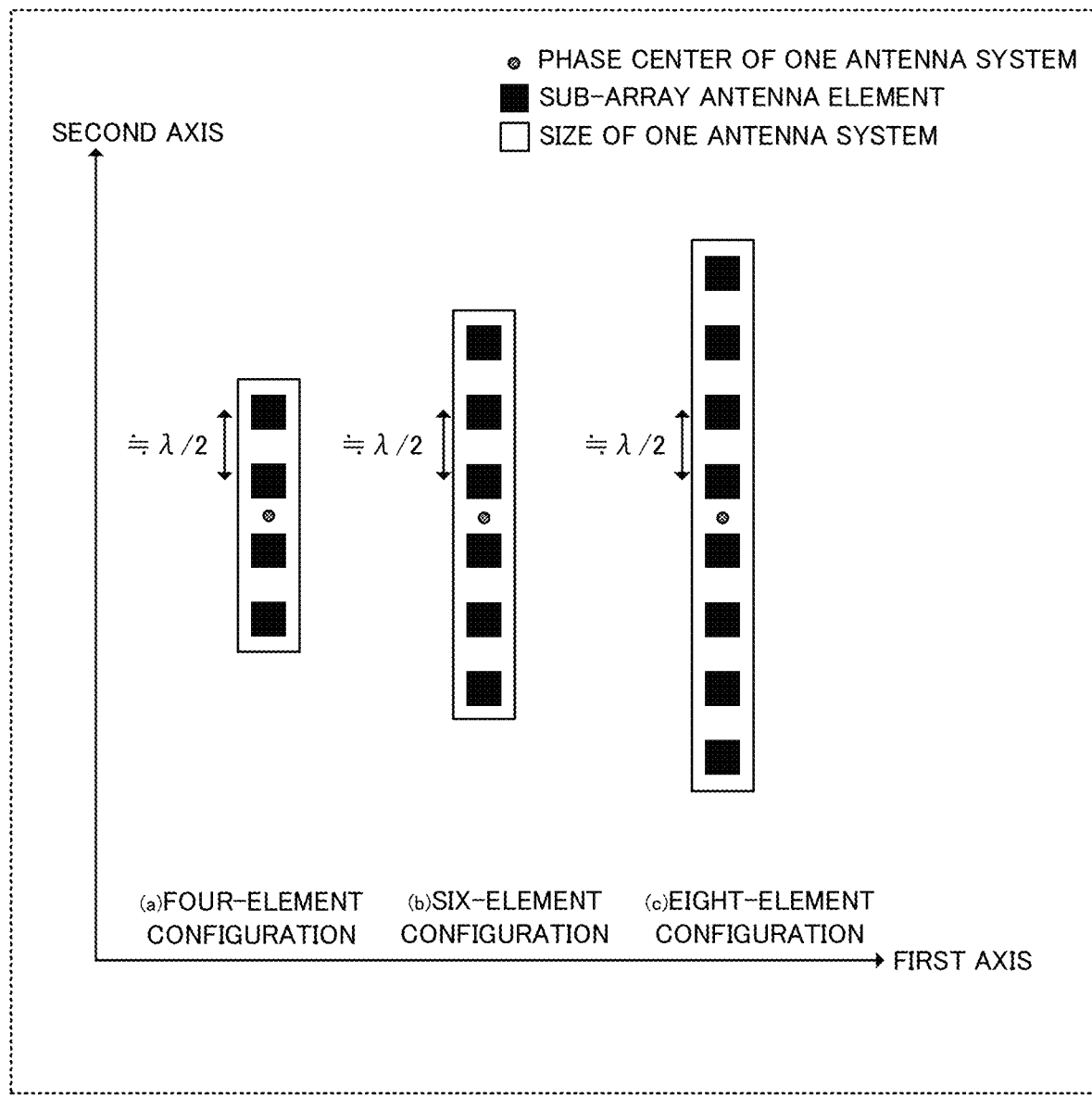
FIG. 8 is a diagram illustrating an example of a sub-array antenna configuration according to Embodiment 1.

FIG. 8 illustrates examples of the sub-array antenna.

As shown in FIG. 8, the interval between the sub-array antenna elements of the sub-array antennas is set to about half wavelength (λ/2). In FIG. 8, one antenna system is constituted by sub-array antenna elements, for example, (a) one element in the first axis direction and four elements in the second axis direction, (b) one element in the first axis direction and six elements in the second axis direction, and (c) one element in the first axis direction and eight elements in the second axis direction.

The configuration of the sub-array antenna is not limited to the configuration shown in FIG. 8. One antenna system may have any size with an increased opening length so as not to physically interfere with adjacent antenna elements. This improves the antenna gain.

One antenna system of each of transmission antennas 108 and reception antennas 202 may be constituted by sub-array antennas so as to form a beam pattern suitable for, for example, the angle of view of radar apparatus 10. For example, if the field of view (FOV) of radar apparatus 10 is narrow in the vertical direction, the beam pattern of one antenna system of each of transmission antennas 108 and reception antennas 202 may be wider in the horizontal direction and narrower in the vertical direction. For example, in FIG. 8, the antenna configuration shown in (c) has the narrowest angle, and a sub-array antenna configuration in which the sub-array antennas are arranged in the vertical direction (in other words, in the second axis direction) is preferably adopted.

Variations 1 to 7 for the antenna arrangements of Nt transmission antennas 108 and Na reception antennas 202 of radar apparatus 10 will be described hereinbelow.

(Variation 1)

Figure 9A:
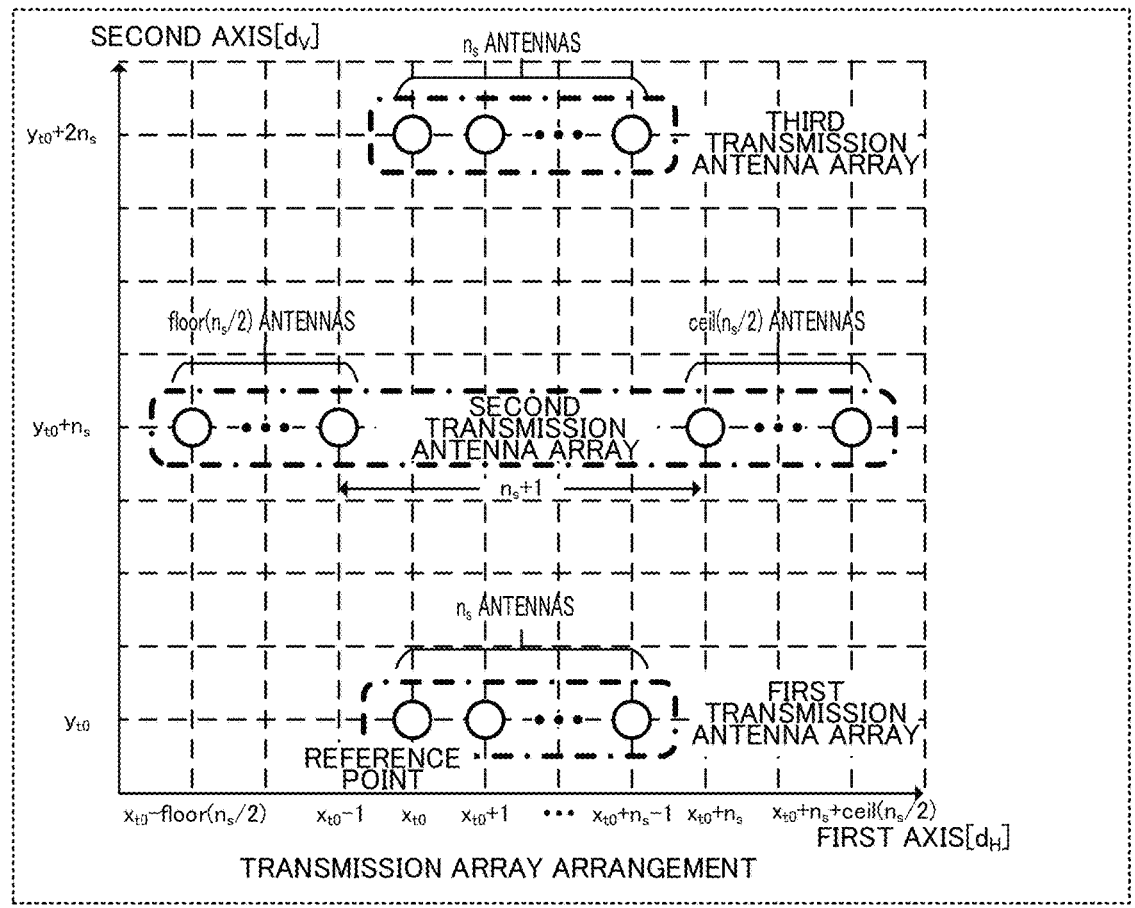
FIG. 9A is a diagram illustrating an arrangement example of transmission antennas according to Variation 1 of Embodiment 1.
Figure 9B:
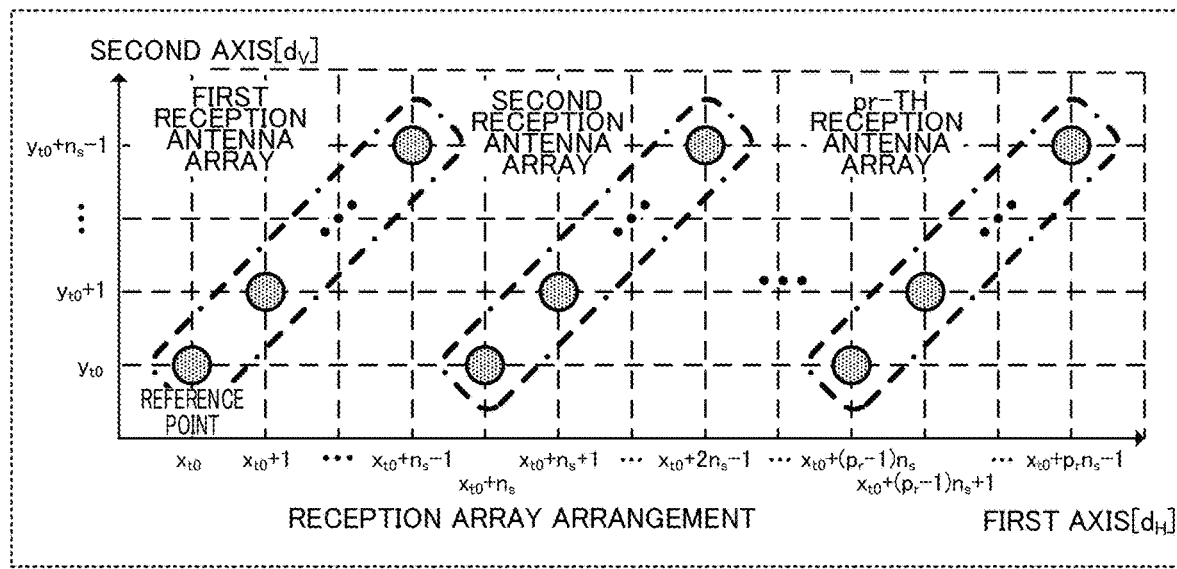
FIG. 9B is a diagram illustrating an arrangement example of reception antennas according to Variation 1 of Embodiment 1.

FIGS. 9A and 9B illustrate examples of antenna arrangement according to Variation 1.

In the arrangement of transmission antennas 108 shown in FIG. 9A, the number of transmission antenna arrays is 3($p_t$=3). Each transmission antenna array includes ns antennas (in other words, the same number of antennas) in the first axis direction. The total number of transmission antennas 108 shown in FIG. 9A is therefore 3 ns.

For example, in FIG. 9A, ns antennas in each of a first transmission antenna array and a third transmission antenna array are arranged at intervals of $d_H$ in the first axis direction. In FIG. 9A, the coordinates in the first axis direction of the antennas of the first transmission antenna array and the antennas of the third transmission antenna array are the same.

In FIG. 9A, the ns antennas included in a second transmission antenna array are arranged (ns+1)$d_H$ apart in the first axis direction. In other words, in FIG. 9A, the antennas included in the second transmission antenna array are arranged in two areas divided at an interval of (ns+1) times the basic interval $d_H$ in the first axis direction. For example, floor(ns/2) antennas are arranged at intervals of $d_H$ in one of the divided areas of the second transmission antenna array, and ceil(ns/2) antennas are arranged at intervals of $d_H$ in the other area, where function floor(x) is a floor function that returns a maximum integer value less than x, and function ceil(x) is a ceiling function that returns a smallest integer value equal to or greater than x.

Thus, in FIG. 9A, the antennas included in the two transmission antenna arrays that are not adjacent to each other in the second axis direction out of the three transmission antenna arrays are arranged at intervals of $d_H$ in the first axis direction.

Of the three transmission antenna arrays, the antennas included in the remaining second transmission antenna array are arranged in two areas divided at an interval of (ns+1) times of interval $d_H$ (for example, ns plus 1) in the first axis direction. In the second transmission antenna array, the number of antennas arranged in one of the divided two areas and the number of antennas arranged in the other of the two areas are almost the same. For example, the number of antennas (for example, floor(ns/2)) arranged in one of the divided two areas of the second transmission antenna array and the number of antennas arranged in the other of the two areas (for example, ceil(ns/2)) are the same or the difference therebetween is 1. Thus, the second transmission antenna array shown in FIG. 9A is divided at an interval of (ns+1) times of basic interval $d_H$ in the first axis direction into nearly symmetrical number of antennas.

As shown in FIG. 9A, the second transmission antenna array is arranged at a position where it does not overlap with ns first transmission antenna arrays and third transmission antenna arrays (in other words, at different positions) in the first axis direction.

In the arrangement of reception antennas 202 shown in FIG. 9B, the number of reception antenna arrays is $p_r$. Accordingly, the total number of reception antennas 202 shown in FIG. 9B is $p_r n_s$. Of the ns antennas included in each reception antenna array, adjacent antennas are arranged $d_H$ apart in the first axis direction and $d_H$ apart in the second axis direction.

An example of the antenna arrangement and an example of the arrangement of a virtual reception array constituted by transmission antennas 108 and reception antennas 202 shown in FIGS. 9A and 9B will be described hereinbelow.

Figure 10A:
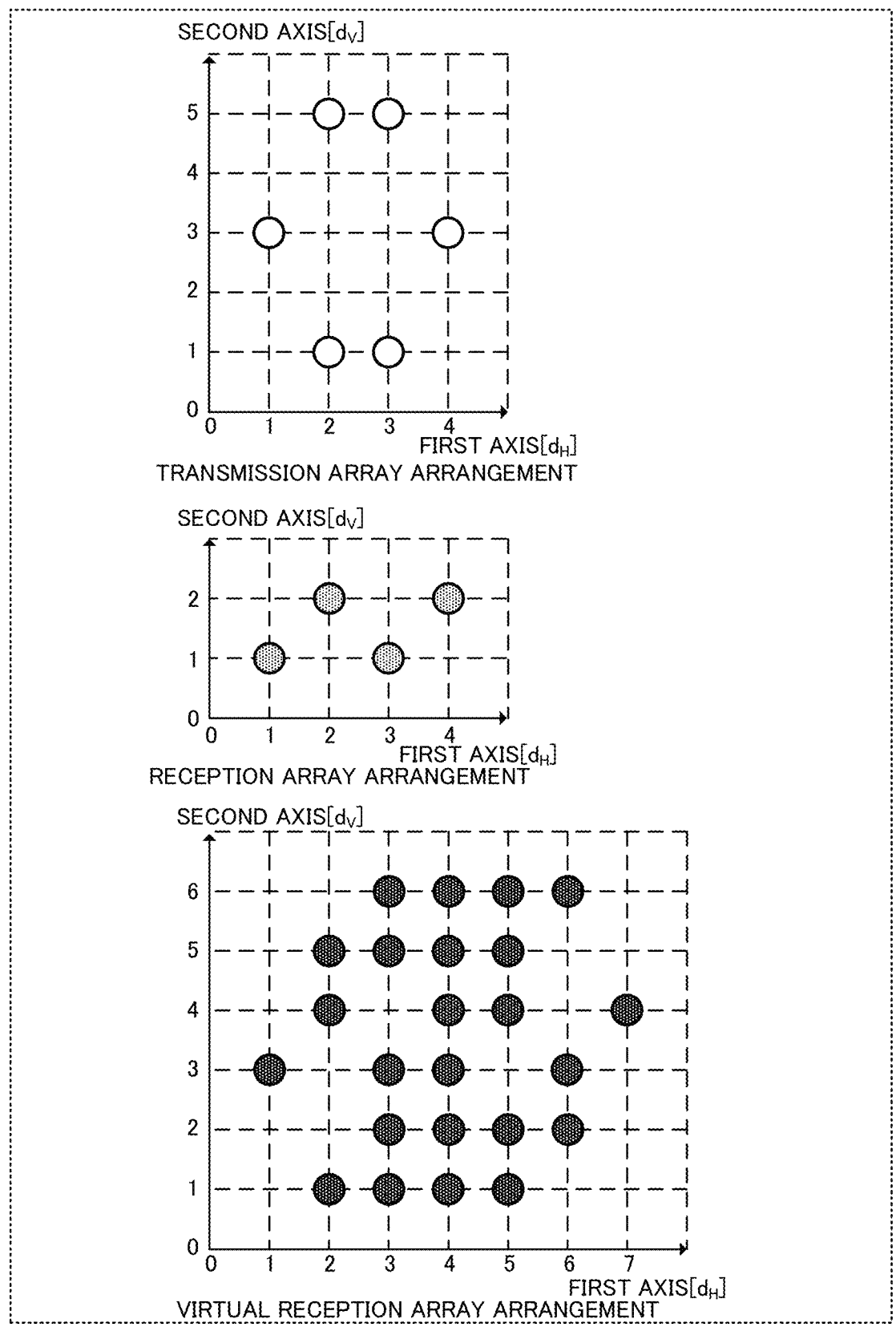
FIG. 10A is a diagram illustrating an antenna arrangement example according to Variation 1 of Embodiment 1.

FIG. 10A illustrates an example of antenna arrangement in the case of $n_s=2$ and $p_r=2$. FIG. 10A illustrates the minimum configuration of the antenna arrangement in Variation 1.

Figure 10B:
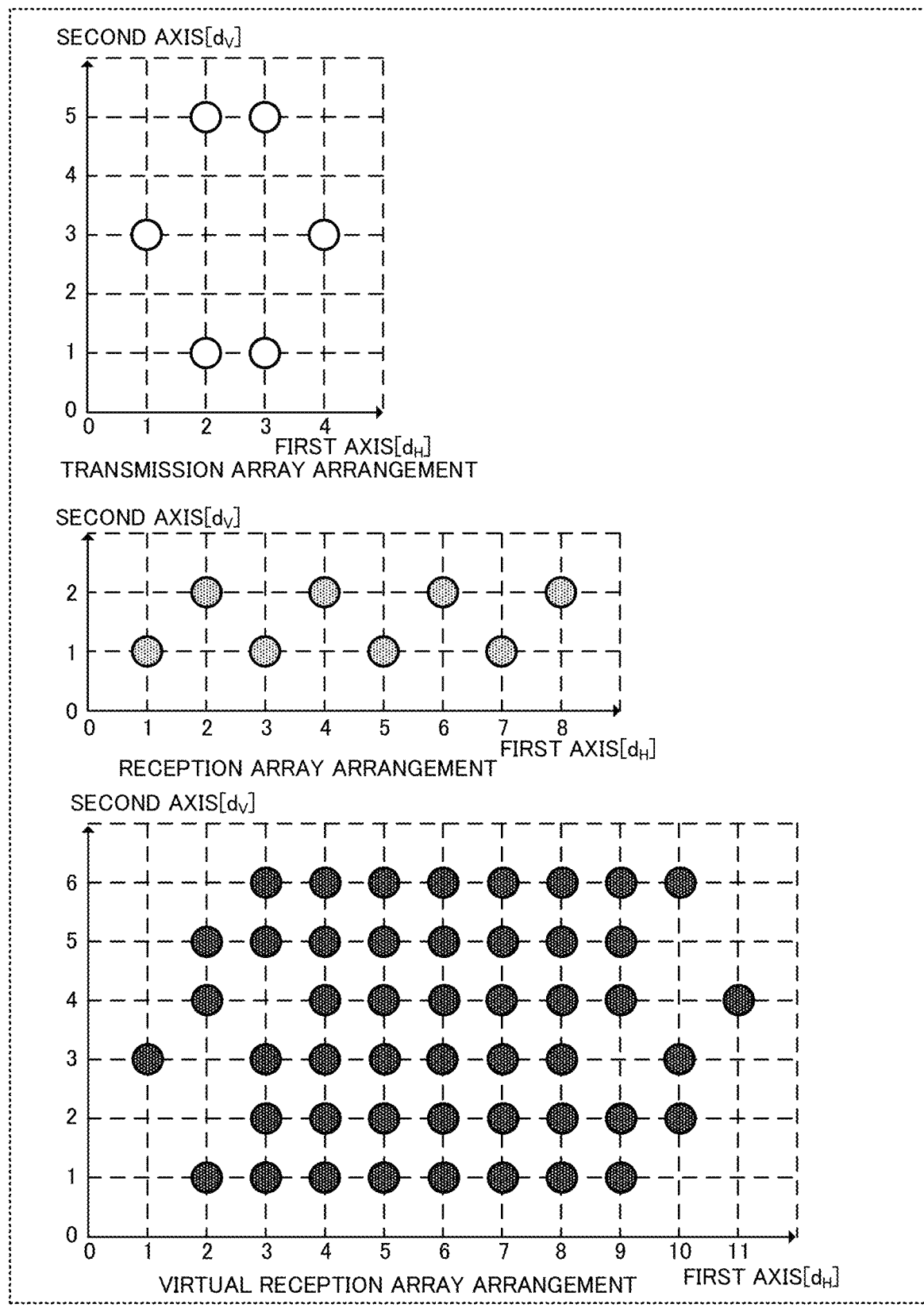
FIG. 10B is a diagram illustrating an antenna arrangement example according to Variation 1 of Embodiment 1.

FIG. 10B illustrates an example of antenna arrangement in the case of $n_s=2$ and $p_r=4$. FIG. 10B illustrates an example in which the minimum configuration of reception antennas 202 (reception antenna array) in FIG. 10A is expanded in the first axis direction.

Figure 10C:
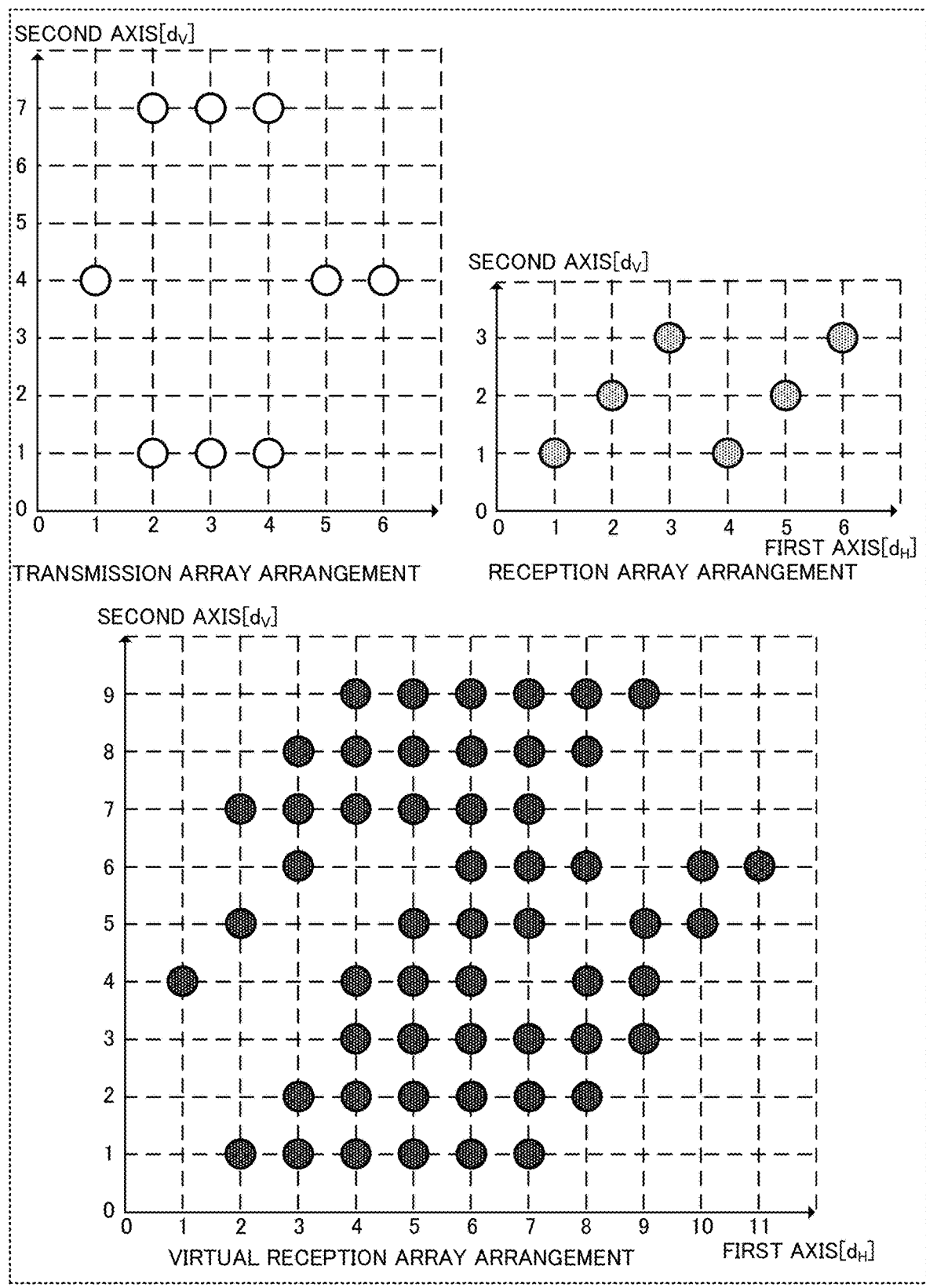
FIG. 10C is a diagram illustrating an antenna arrangement example according to Variation 1 of Embodiment 1.

FIG. 10C illustrates an example of antenna arrangement in the case of $n_s=3$ and $p_r=2$. FIG. 10C illustrates an example in which the value of $n_s$ is an odd number, and the second transmission antenna array is divided into an area in which odd-numbered (one) antenna is arranged and an area in which even-numbered (two) antennas are arranged. In other words, in the case where the value of $n_s$ is an even number, as in FIGS. 10A, 10B and 10D, the antennas of the second transmission antenna array are divided into the same number and arranged symmetrically.

Figure 10D:
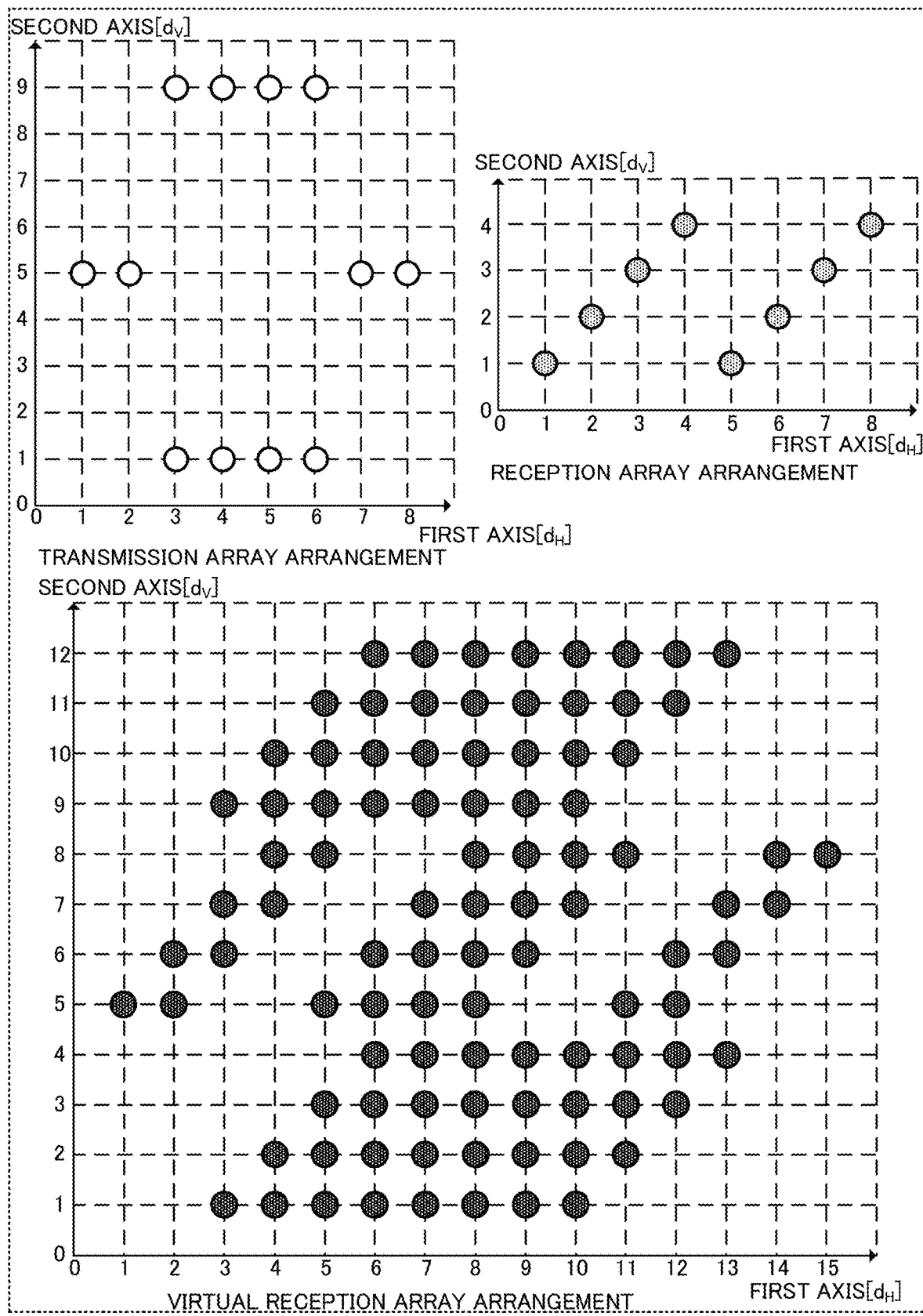
FIG. 10D is a diagram illustrating an antenna arrangement example according to Variation 1 of Embodiment 1.

FIG. 10D illustrates an example of antenna arrangement in the case of $n_s=4$ and $p_r=2$. FIG. 10D illustrates an example in which the number of antennas included in the reception antenna array is increased from the minimum configuration of FIG. 10A.

The values of $n_s$ and $p_r$ are not limited to those of the examples in FIGS. 10A to 10D and may be any other values.

In FIGS. 10A to 10D, for example, in a first transmission antenna array and a third transmission antenna array, $n_s$ antennas are closely arranged at intervals of $d_H$ in the first axis direction, and $p_r$ reception antenna arrays are arranged at intervals of $n_s \times d_H$ in the first axis direction. Thus, with the antenna arrangements shown in FIGS. 10A to 10D, virtual antenna elements can be closely arranged at intervals of $d_H$ in the first axis direction in the virtual reception array arrangements.

In FIGS. 10A to 10D, for example the transmission antenna arrays are arranged at intervals of $n_s \times d_V$ in the second axis direction, and $n_s$ antennas included in each reception antenna array are arranged at intervals of $d_V$ in the second axis direction. Thus, with the antenna arrangements shown in FIGS. 10A to 10D, virtual antenna elements can be closely arranged at intervals of $d_V$ in the second axis direction in the virtual reception array arrangement.

In FIGS. 10A to 10D, the first transmission antenna array and the third transmission antenna array of transmission antennas 108 are arranged at intervals of $2n_s \times dv$ in the second axis direction. Between the first transmission antenna array and the third transmission antenna array in the second axis direction, no other antennas (for example, the antennas of the second transmission antenna array) are arranged. This allows the antenna systems of the first transmission antenna array and the third transmission antenna array to be formed in an opening length equal to or less than $d_H$ in the first axis direction and equal to or less than $2n_s \times dv$ in the second axis direction.

In FIGS. 10A to 10D, a second antenna array of transmission antennas 108 is arranged at a different position in the first axis direction from the positions of the other transmission antenna arrays. In other words, in the second axis direction, no other antennas (for example, the first transmission antenna array and the third transmission antenna array) are arranged at the first axis coordinate at which the second transmission antenna array is arranged. This allows the antenna system of the second antenna array of transmission antennas 108 to be formed in an opening length equal to or less than $d_H$ in the first axis direction and in any size in the second axis direction.

In FIGS. 10A to 10D, $n_s \times p_r$ antennas included in the reception antenna array of reception antennas 202 are arranged at different positions at intervals of $d_H$ in the first axis direction. In other words, in the second axis direction, no other antennas are arranged at the first axis coordinate at which the antennas included in one reception antenna array are arranged. This allows each of the antenna systems of the reception antenna arrays to be formed in an opening length equal to or less than $d_H$ in the first axis direction and in any size in the second axis direction.

For example, one antenna system may be constituted by sub-array antennas, and the sub-array antenna may be weighted to reduce sidelobes.

Figure 11A:
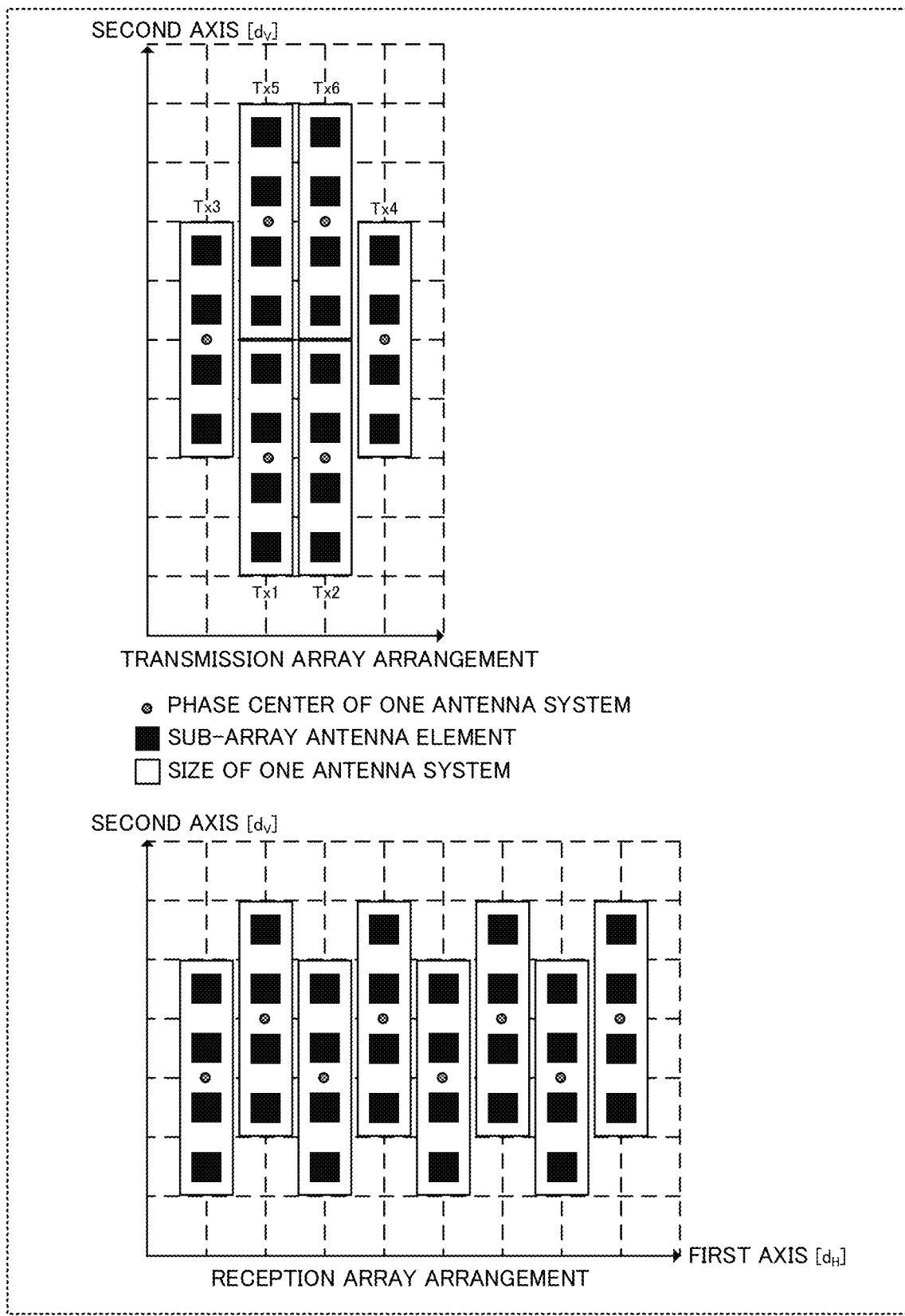
FIG. 11A is a diagram illustrating an arrangement example of sub-array antennas according to Variation 1 of Embodiment 1.

FIG. 11A illustrates an example configuration using sub-array antennas (for example, the configuration shown in (a) of FIG. 8), with each of the placement positions in the examples of antenna arrangement of transmission antennas 108 and reception antennas 202 shown in FIG. 10B (in other words, each white circle and each half-tone circle) as the phase center of one antenna system.

In FIG. 11A, transmission antennas 108 can be arranged in a size so that they do not physically interfere with each other. For example, Tx1, Tx2, Tx5, and Tx6 may be formed in a size of $d_H$ or less in the first axis direction and a size of $4d_V$ or less in the second axis direction. In FIG. 11A, Tx3 and Tx4 have the same size as those of the other antennas (Tx1, Tx2, Tx5, and Tx6), but this is given for mere illustrative purposes. Tx3 and Tx4 may have any size in the second axis direction (for example, equal to or larger than 5 dv).

In FIG. 11A, reception antennas 202 have the same size as that of Tx1, Tx2, Tx5, and Tx6 (for example, 4 dv), but this is given for mere illustrative purposes. Reception antennas 202 may be formed in a size so that they do not physically interfere with each other.

Figure 11B:
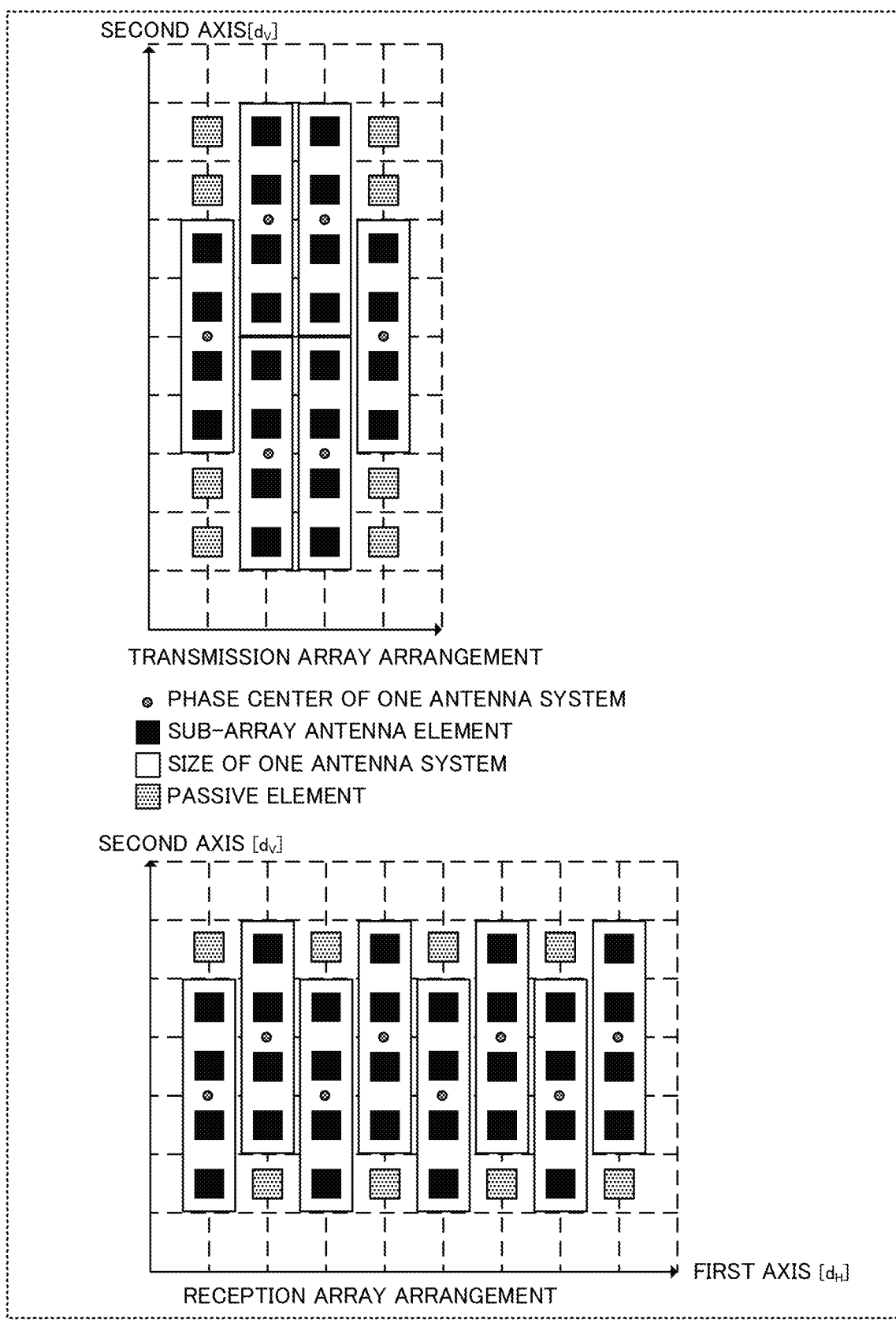
FIG. 11B is a diagram illustrating an arrangement example of sub-array antennas and passive elements according to Variation 1 of Embodiment 1.

In another example, the antenna arrangement of transmission antennas 108 and reception antennas 202 shown in FIG. 11A may further include passive elements, as shown in FIG. 11B. For example, the passive elements may be arranged at the positions shown in FIG. 11B, or alternatively, may be arranged at positions and in sizes so that they do not physically interfere with the antennas. The passive elements offer the effect of uniformizing the influence of electrical characteristics, for example, radiation of the antennas, impedance matching, and isolation.

Figure 12A:
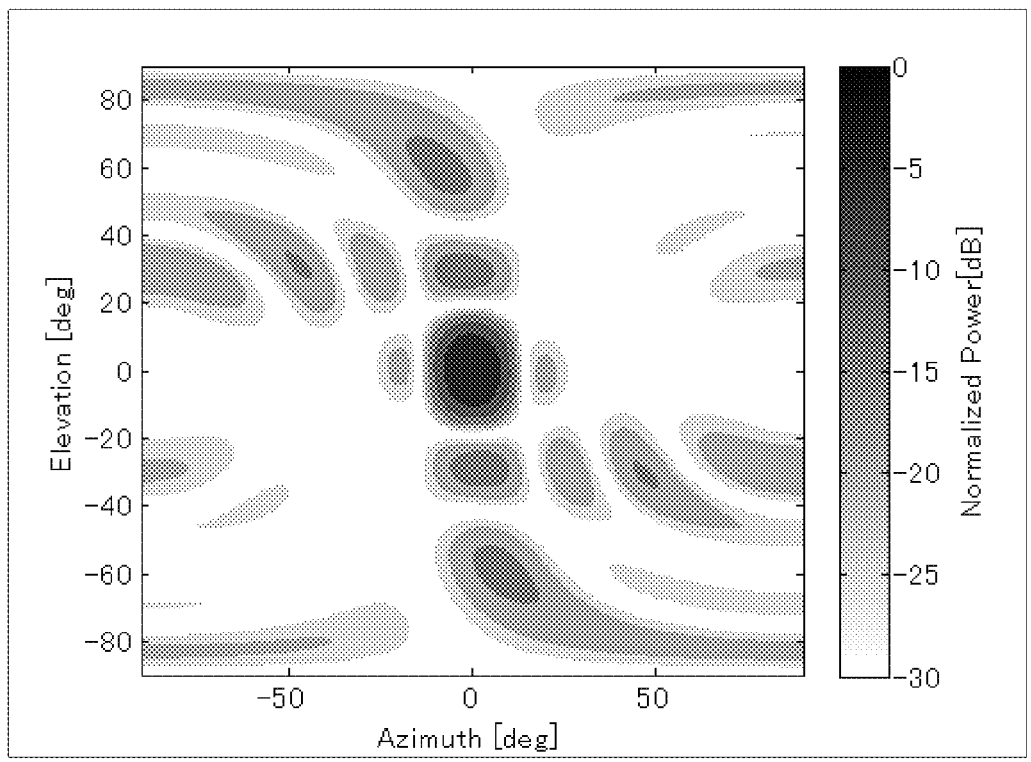
FIG. 12A is a diagram illustrating an example of a directionality pattern formed using a two-dimensional beam according to Variation 1 of Embodiment 1.
Figure 12B:
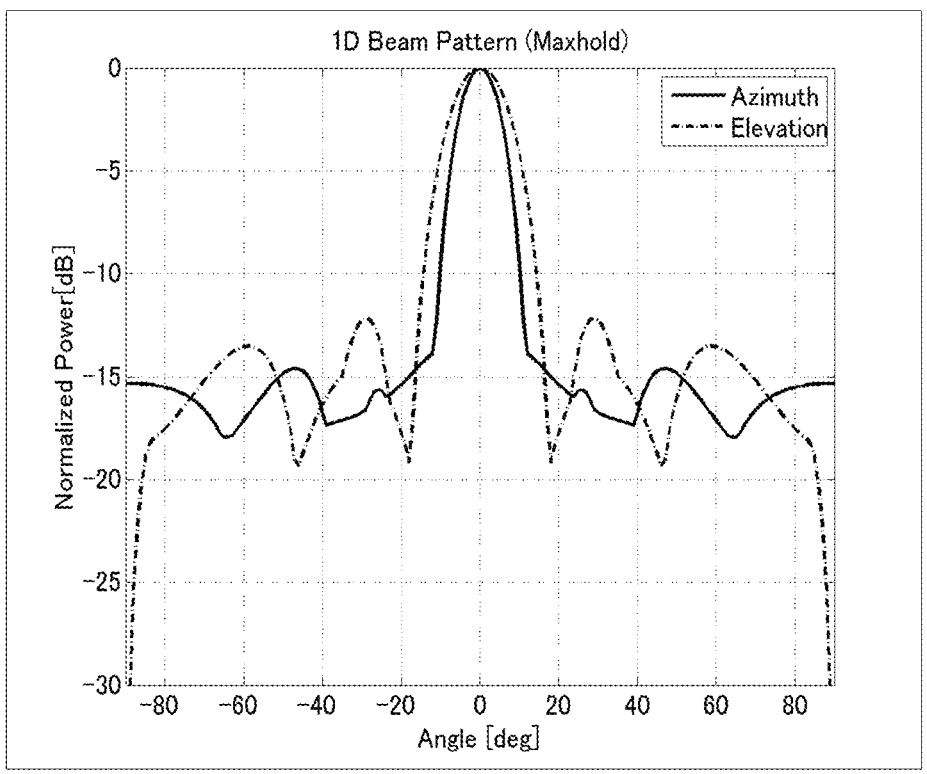
FIG. 12B is a diagram illustrating an example of a directionality pattern formed using a two-dimensional beam degenerated to one dimension according to Variation 1 of Embodiment 1.

Next, FIGS. 12A and 12B illustrate an example of a directionality pattern formed a beamformer method using the two-dimensional virtual reception array extending in the first axis direction and the second axis direction shown in FIG. 10B. FIGS. 12A and 12B show an example of a directionality pattern in the direction of zero degrees (zenith) in the first axis direction and the second axis direction, which is equal to that when incoming waves come from the zenith.

FIG. 12A illustrates a two-dimensional directionality pattern in the first axis (for example, azimuth) direction and the second axis (for example, elevation) direction. FIG. 12B illustrates a directionality pattern degenerated on the first axis and the second axis. This shows a case where basic interval $d_H=0.5\lambda$ and $d_V=0.5\lambda$, but the values of $d_H$ and $d_V$ are not limited to the above values.

Figure 13A:
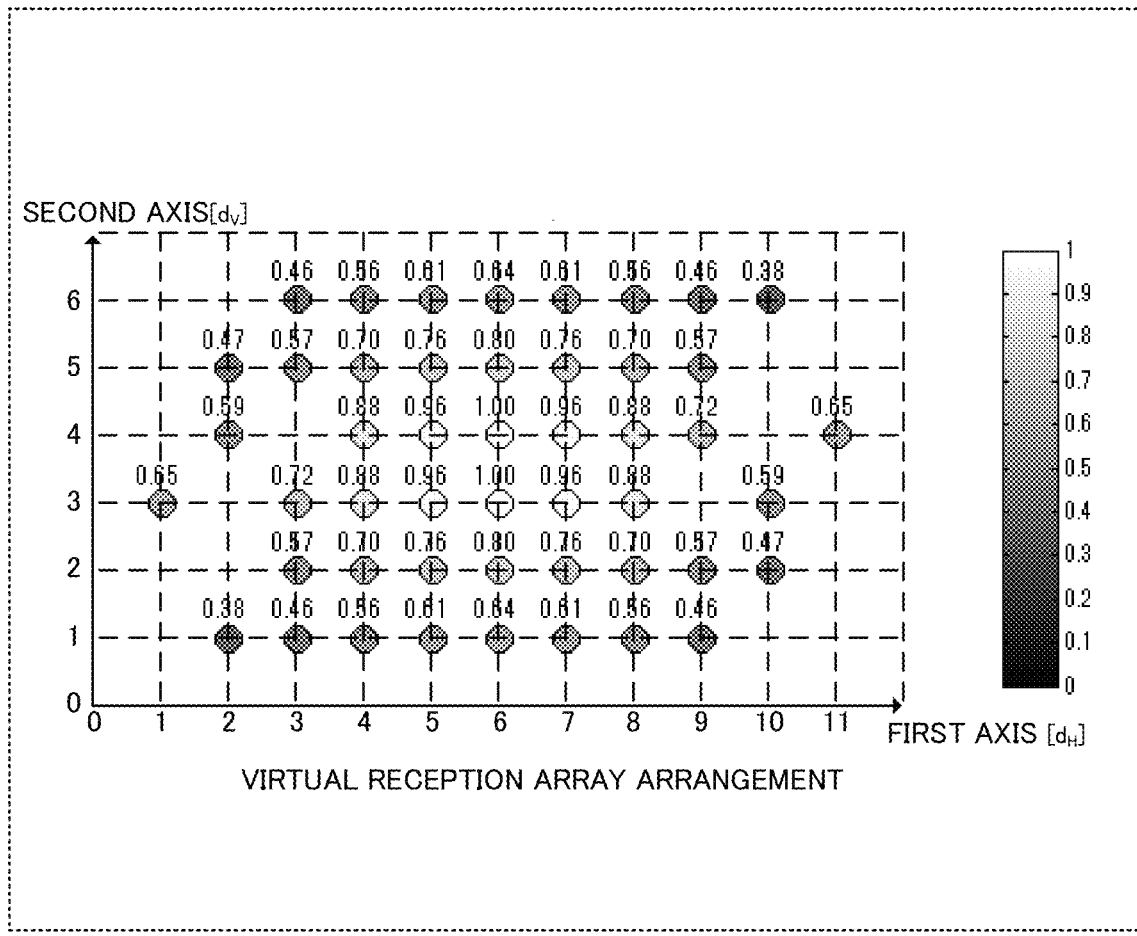
FIG. 13A is a diagram illustrating an example of power distribution when a virtual reception array according to Variation 1 of Embodiment 1 is weighted.
Figure 13B:
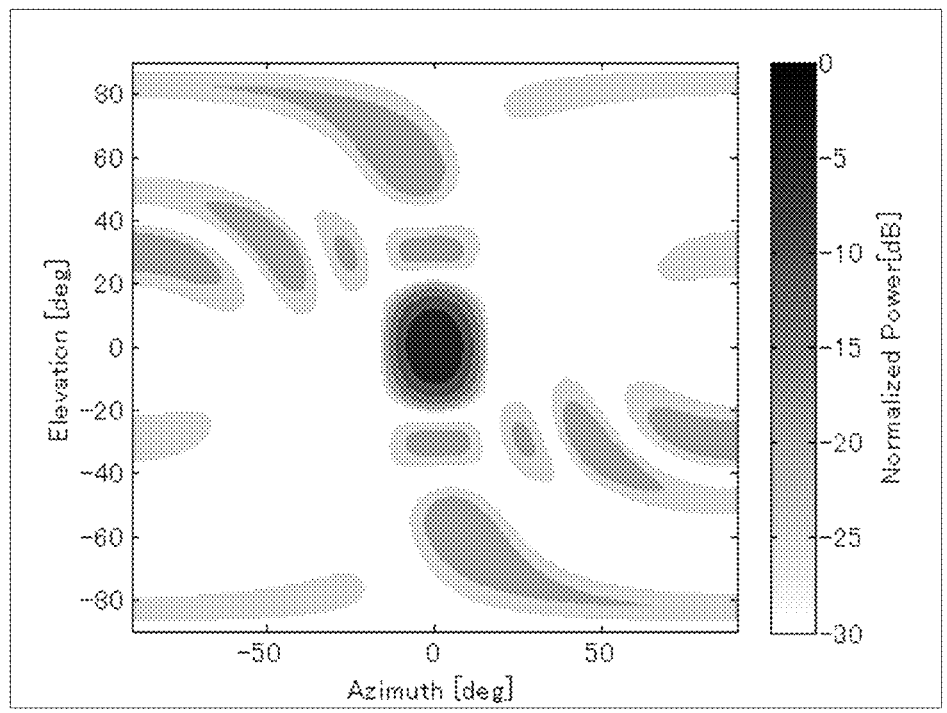
FIG. 13B is a diagram illustrating an example of a directionality pattern formed using a two-dimensional beam when a virtual reception array according to Variation 1 of Embodiment 1 is weighted.
Figure 13C:
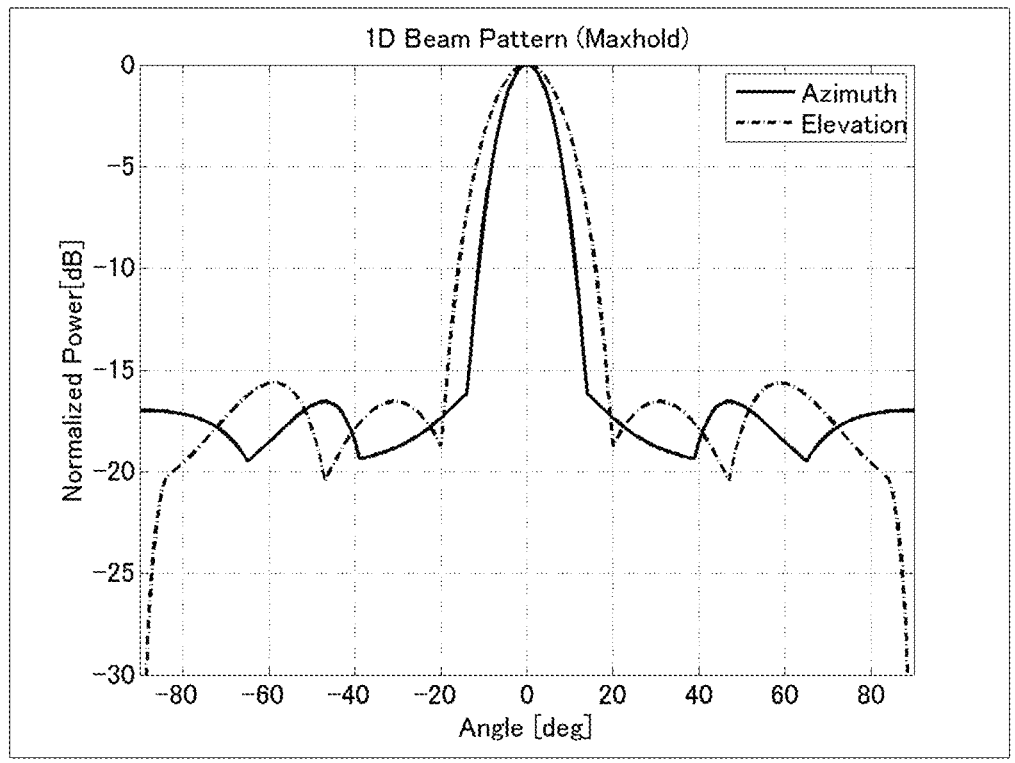
FIG. 13C is a diagram illustrating an example of a directionality pattern formed using a two-dimensional beam when a virtual reception array according to Variation 1 of Embodiment 1 is degenerated to one dimension.

Radar apparatus 10 may weight the signals received by the virtual reception array to form a beam. For example, FIG. 13A illustrates an example in which the receiver signals of a virtual reception array corresponding to the example of antenna arrangement of transmission antennas 108 and reception antennas 202 shown in FIG. 10B are weighted according to a Taylor window to form a directionality pattern using a beamformer method. FIG. 13B illustrates a two-dimensional directionality pattern in the first axis (for example, azimuth) and in the second axis (for example, elevation) in the case of the configuration shown in FIG. 13A. FIG. 13C illustrates a directionality pattern degenerated on each of the first axis and the second axis.

As shown in FIGS. 13B and 13C, by weighting the signals received by the virtual reception array, the sidelobe level can be decreased although the main lobe width is increased, as compared with FIGS. 12A and 12B.

Comparative Example

Figure 14:
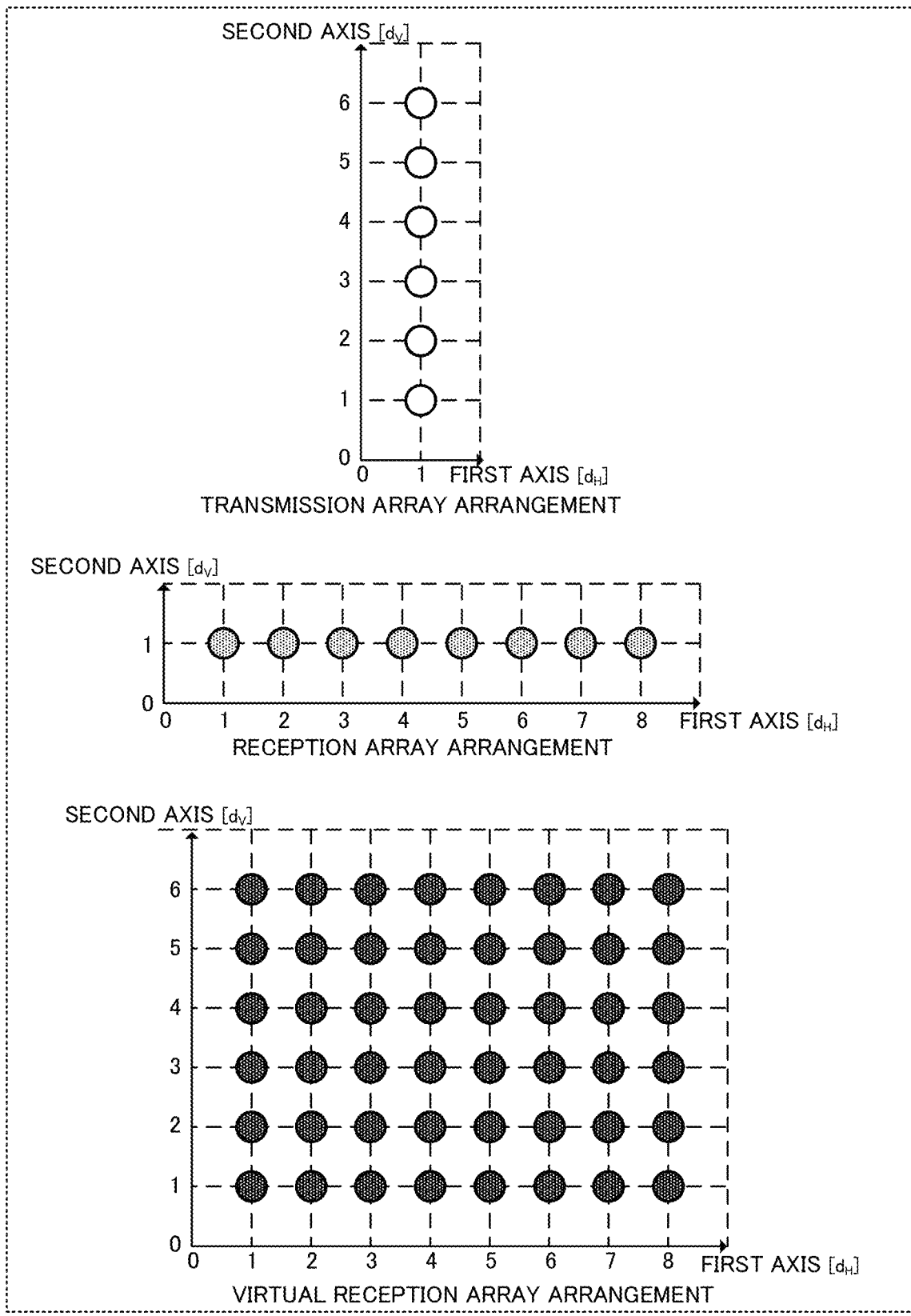
FIG. 14 is a diagram illustrating an example of an antenna arrangement according to Comparative Example of Embodiment 1.

FIG. 14 illustrates an example of antenna arrangements of transmission antennas, reception antennas, and a virtual reception array for comparison with Variation 1. For comparison with the antenna arrangement shown in FIG. 10B, the numbers of transmission antenna elements and reception antenna elements in FIG. 14 are set to the same numbers as the numbers (for example, Nt=6, Na=8) of the elements of transmission antennas 108 and reception antennas 202 shown in FIG. 10B. In FIG. 14, the transmission antennas are arranged at intervals of $d_V$ in the second axis direction, and the reception antennas are arranged at regular intervals of $d_H$ in the first axis direction. Thus, as shown in FIG. 14, the virtual reception array constituted by the transmission antennas and the reception antennas is arranged at regular intervals of $d_H$ and $d_V$.

In FIG. 14, the transmission antennas are arranged at intervals of $d_V$ in the second axis direction. It is therefore difficult to increase the size of each of the antenna elements of the transmission antennas to $d_V$ or more in the second axis direction. The reception antennas shown in FIG. 14 can be formed in any size in the second axis direction as in FIG. 10B.

Figure 15A:
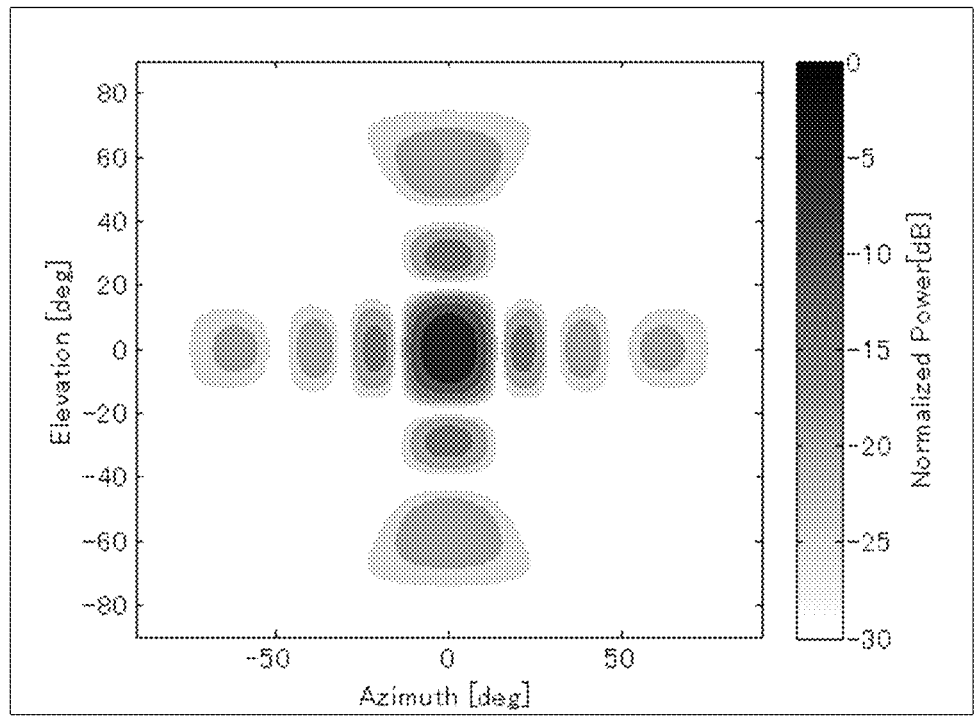
FIG. 15A is a diagram illustrating an example of a directionality pattern using a two-dimensional beam according to Comparative Example of Embodiment 1.
Figure 15B:
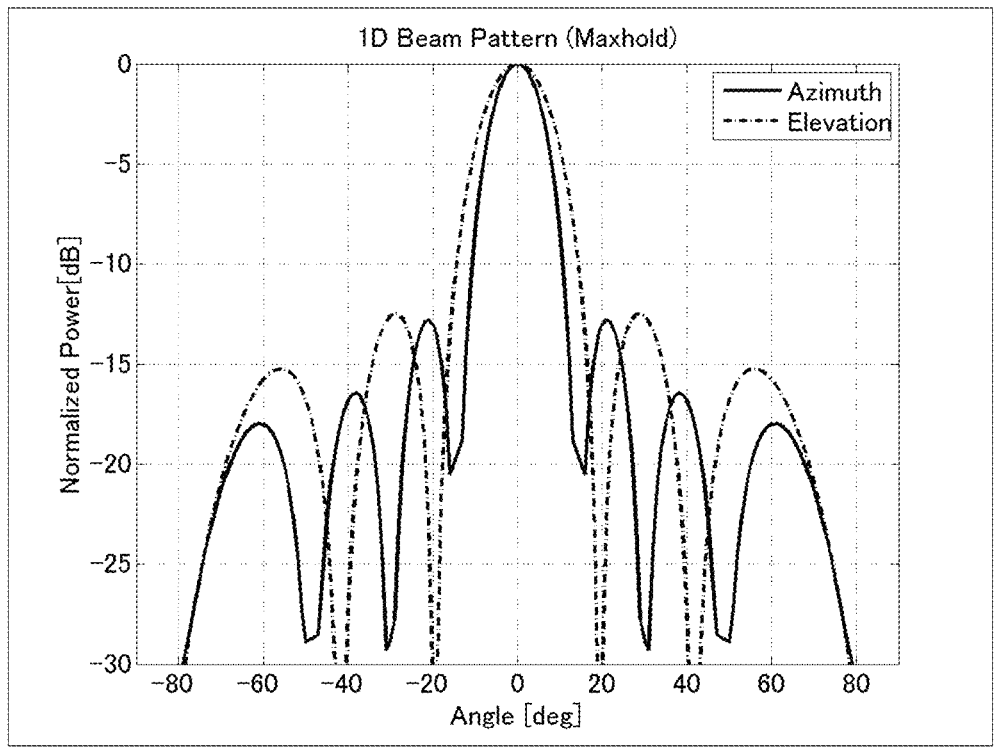
FIG. 15B is a diagram illustrating an example of a directionality pattern using a two-dimensional beam according to Comparative Example of Embodiment 1 degenerated in one dimension.

FIGS. 15A and 15B illustrate an example of a directionality pattern formed by a beamformer method using two-dimensional virtual reception array extending in the first axis direction and the second axis direction shown in FIG. 14. FIGS. 15A and 15B show an example of a directionality pattern in the direction of zero degrees (zenith) in the first axis direction and the second axis direction, which is equal to that when incoming waves come from the zenith.

FIG. 15A illustrates a two-dimensional directionality pattern in the first axis (for example, azimuth) direction and in the second axis (for example, elevation) direction. FIG. 15B illustrates a directionality pattern degenerated on the first axis and the second axis. This shows a case where basic interval $d_H$=0.5λ, $d_V$=0.5λ.

Figure 16A:
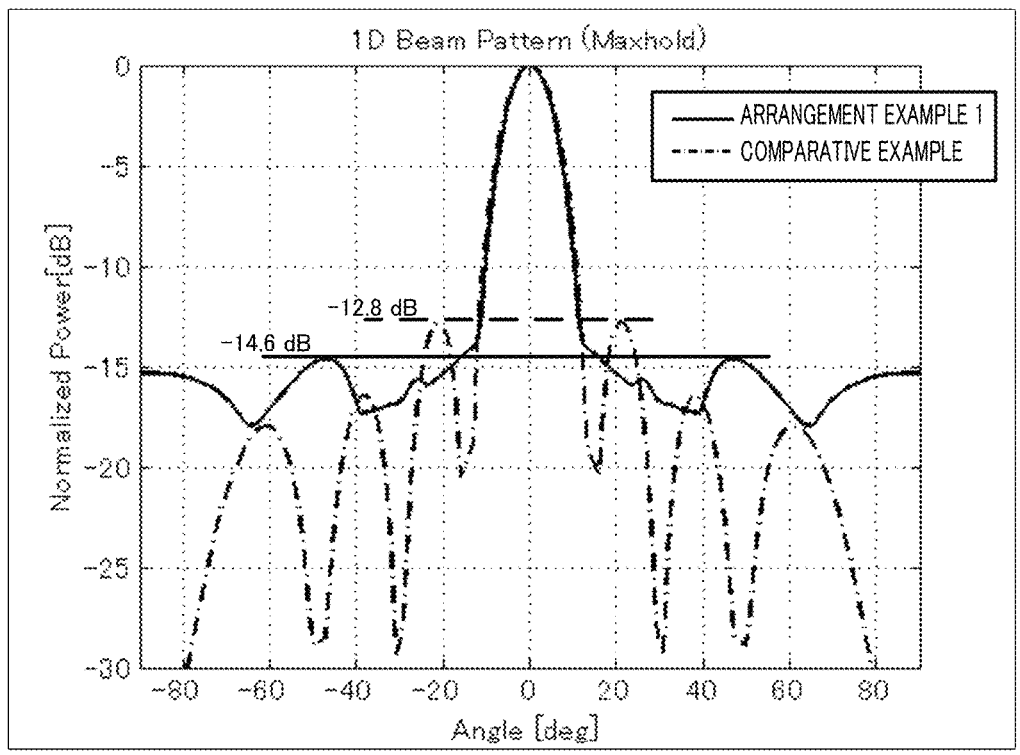
FIG. 16A is a diagram illustrating comparison of directionality patterns using a two-dimensional beam according to Variation 1 of Embodiment 1 and Comparative Example.
Figure 16B:
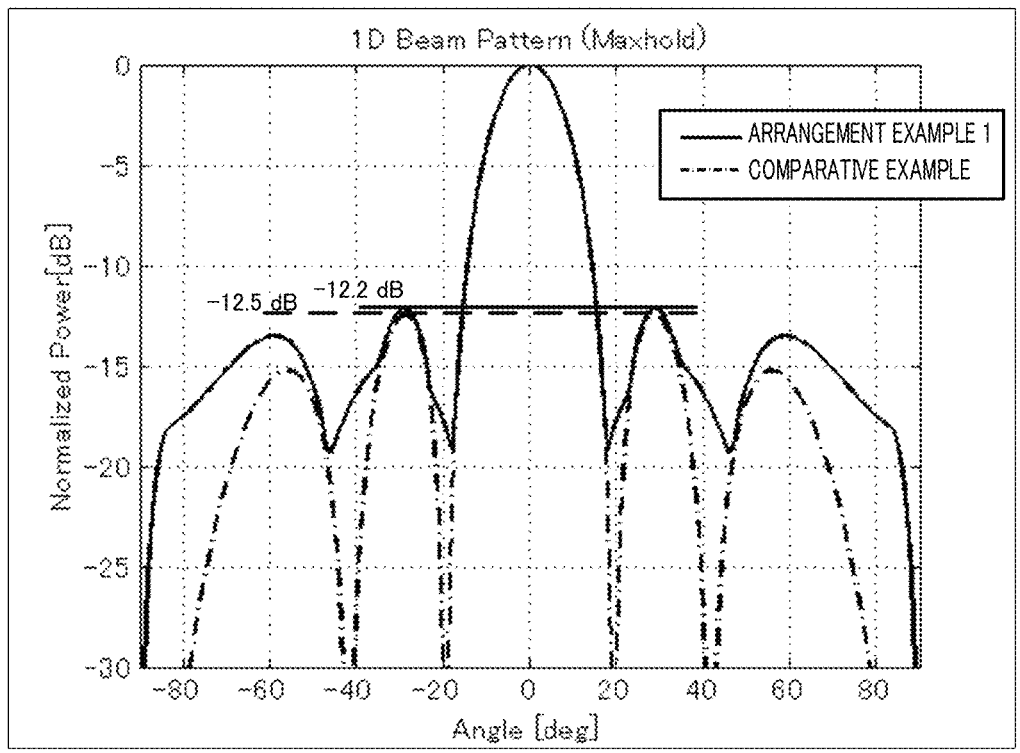
FIG. 16B is a diagram illustrating comparison of directionality patterns using a two-dimensional beam according to Variation 1 of Embodiment 1 and Comparative Example.

FIGS. 16A and 16B illustrate the directionality pattern (in the case of the antenna arrangement of FIG. 10B, arrangement example 1) shown in FIG. 12B and the directionality pattern (Comparative Example) shown in FIG. 15B in overlapped manner. FIG. 16A illustrates comparison of directionality patterns in the first axis (azimuth) direction. FIG. 16B illustrates comparison of directionality patterns in the second axis (elevation) direction.

As shown in FIG. 16A, the directionality patterns in the first axis direction in Variation 1 (arrangement example 1) and Comparative Example have the same beam width. As shown in FIG. 16A, the maximum sidelobe level in Variation 1 is lower than Comparative Example by about 1.8 dB. As shown in FIG. 16B, the directionality patterns in the second axis direction in Variation 1 and Comparative Example have the same beam width. As shown in FIG. 16B, the maximum sidelobe level is substantially the same in Variation 1 and Comparative Example.

According to Variation 1, the sizes of one antenna system of transmission antennas 108 or reception antennas 202 can be increased to improve the directional gain of the antennas without degrading the directionality pattern using the virtual reception array (in other words, beam performance).

(Variation 2)

Variation 2 is an arrangement example similar to Variation 1 and differs from Variation 1 in the configuration of the transmission antenna arrays of transmission antennas 108.

In Variation 2, for example the transmission antenna arrays of transmission antennas 108 each have $n_s$ antennas. In Variation 2, the antennas included in three transmission antenna arrays adjacent in the second axis direction are shifted in the first axis direction. In other words, the antennas included in the adjacent three transmission antenna arrays are arranged at different positions in the first axis direction.

Figure 17:
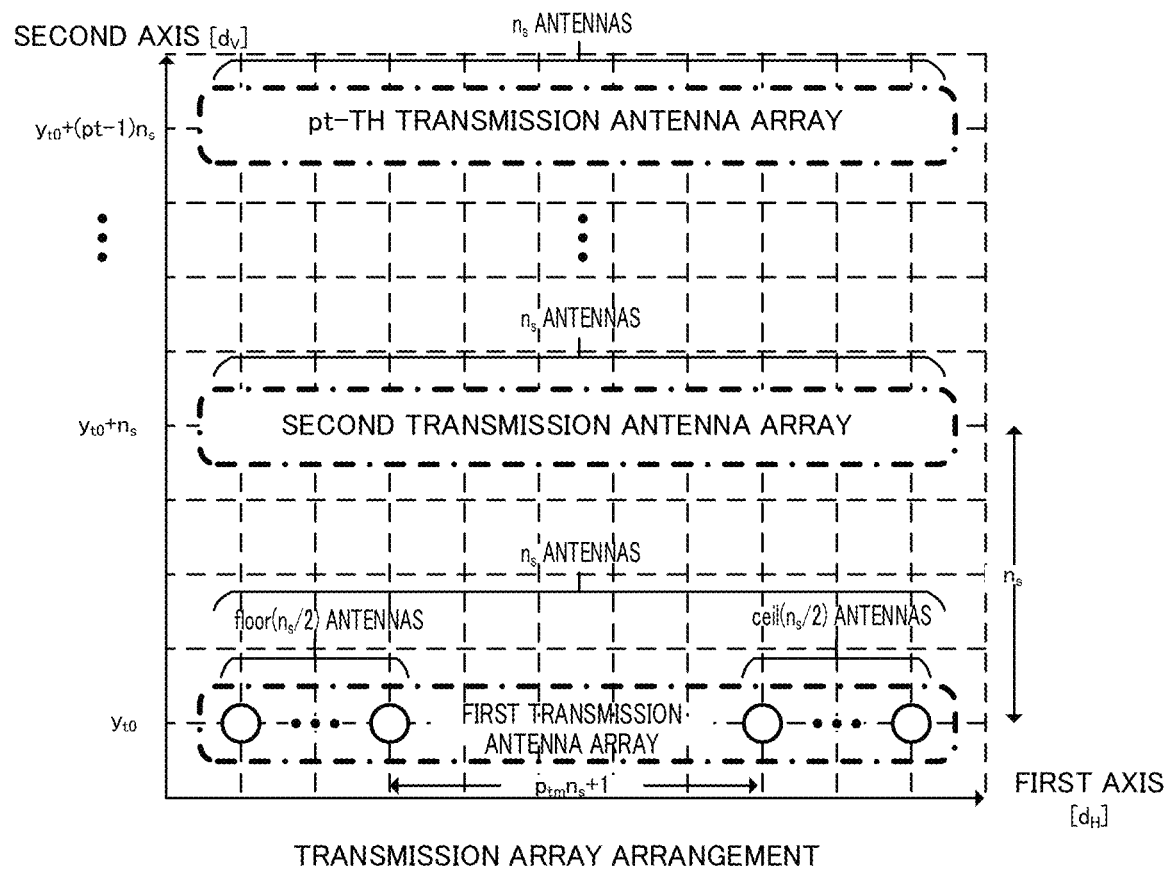
FIG. 17 is a diagram illustrating an antenna arrangement example according to Variation 2 of Embodiment 1.

FIG. 17 illustrates an arrangement example of transmission antennas 108 according to Variation 2. The arrangement of reception antennas 202 in Variation 2 is the same as that of Variation 1 (for example, see FIG. 9B).

Transmission antennas 108 have $p_t$ transmission antenna arrays arranged at intervals of $n_s \times d_V$ in the second axis direction. Each transmission antenna array includes $n_s$ antennas arranged in the first axis direction.

The antennas included in the three transmission antenna arrays adjacent in the second axis direction are arranged at different positions in the first axis direction. For example, each transmission antenna array is divided and arranged at an interval of $p_{tm}n_s+1$ in the first axis direction. For example, floor($n_s$/2) antennas are arranged at intervals of $d_H$ in one of the divided areas of each transmission antenna array, and ceil($n_s$/2) antennas are arranged at intervals of $d_H$ in the other area, where $p_{tm}$ is an integer=0 to $p_t-1$.

Figure 18A:
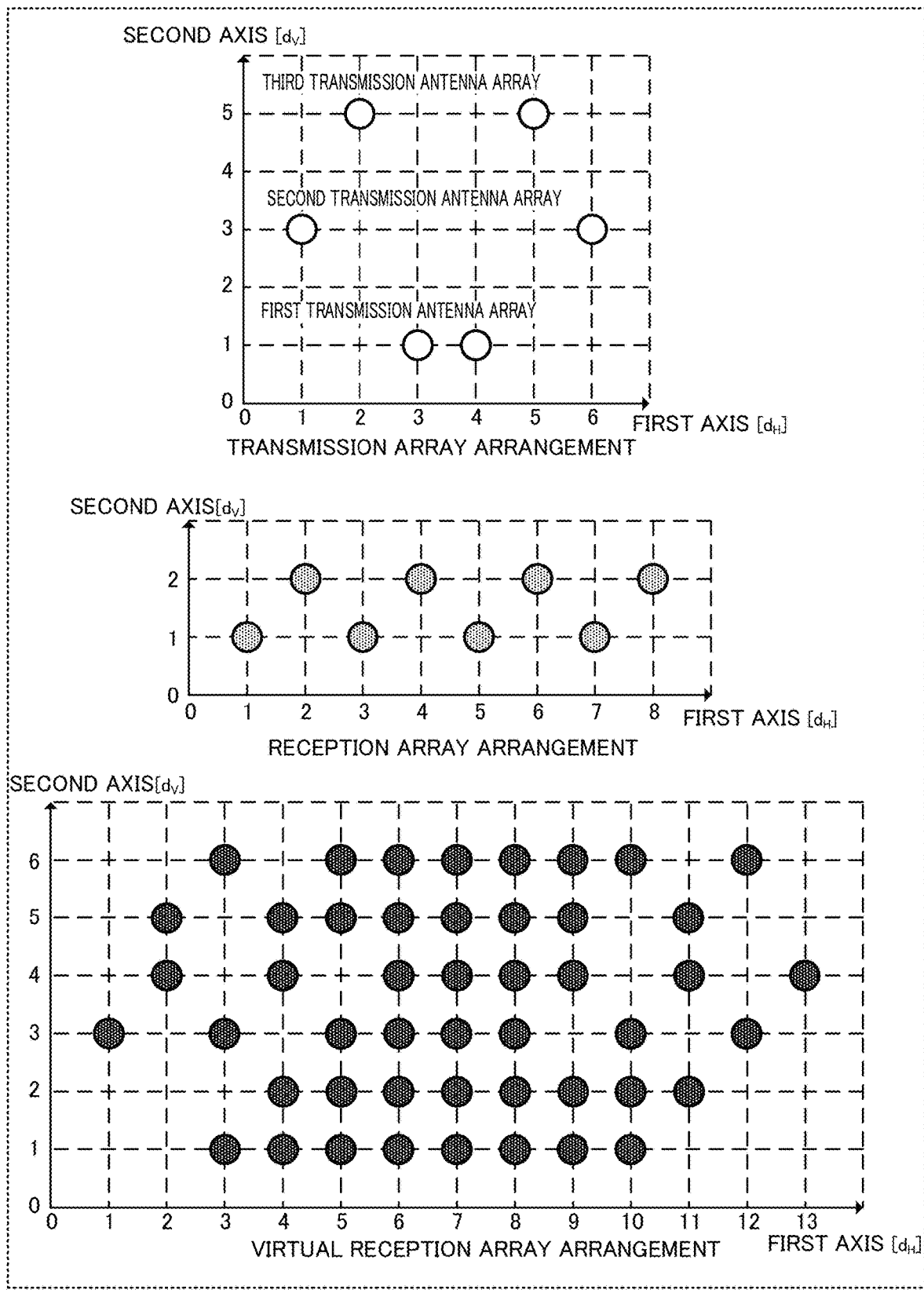
FIG. 18A is a diagram illustrating an antenna arrangement example according to Variation 2 of Embodiment 1.
Figure 18B:
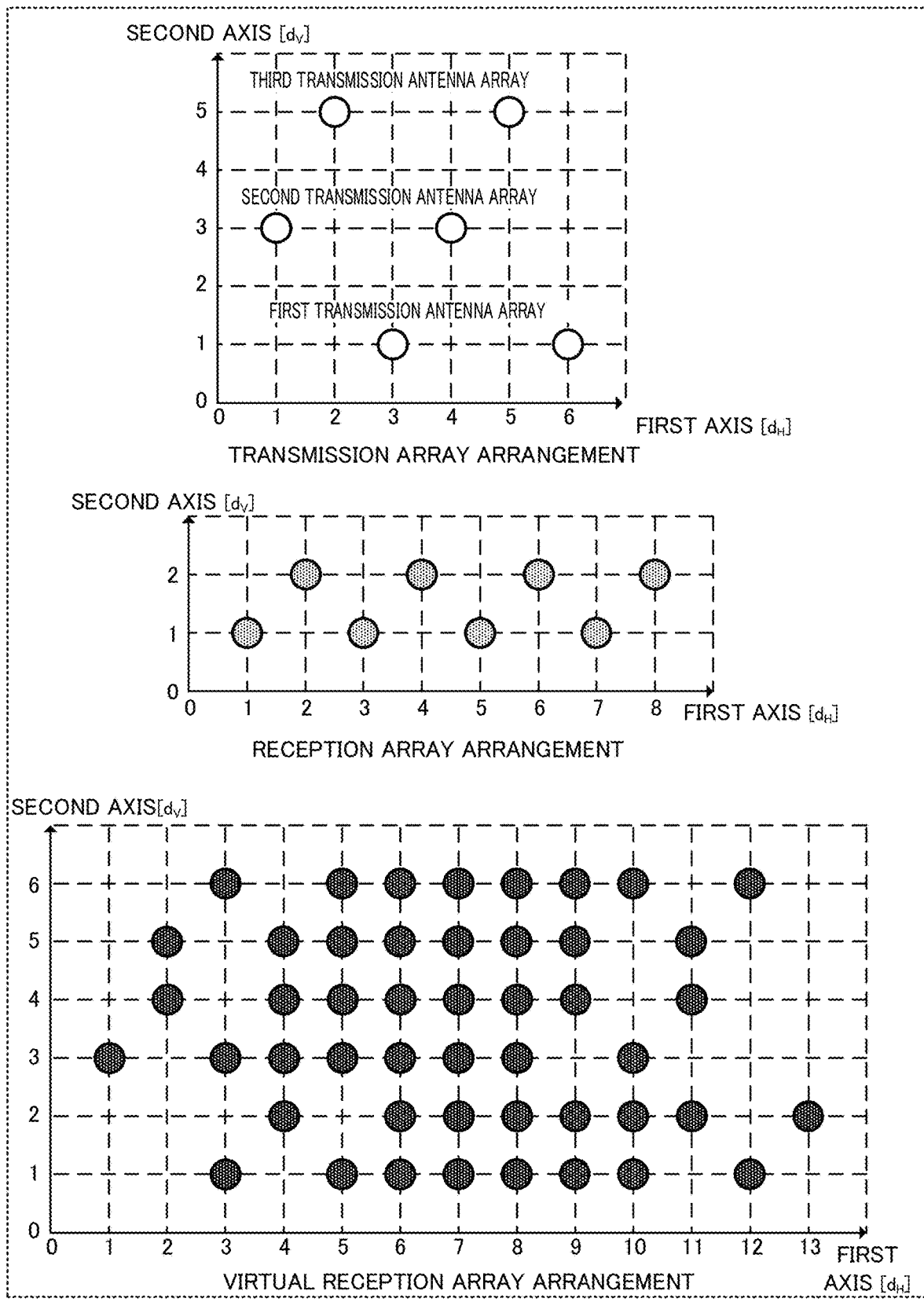
FIG. 18B is a diagram illustrating an antenna arrangement example according to Variation 2 of Embodiment 1.
Figure 18C:
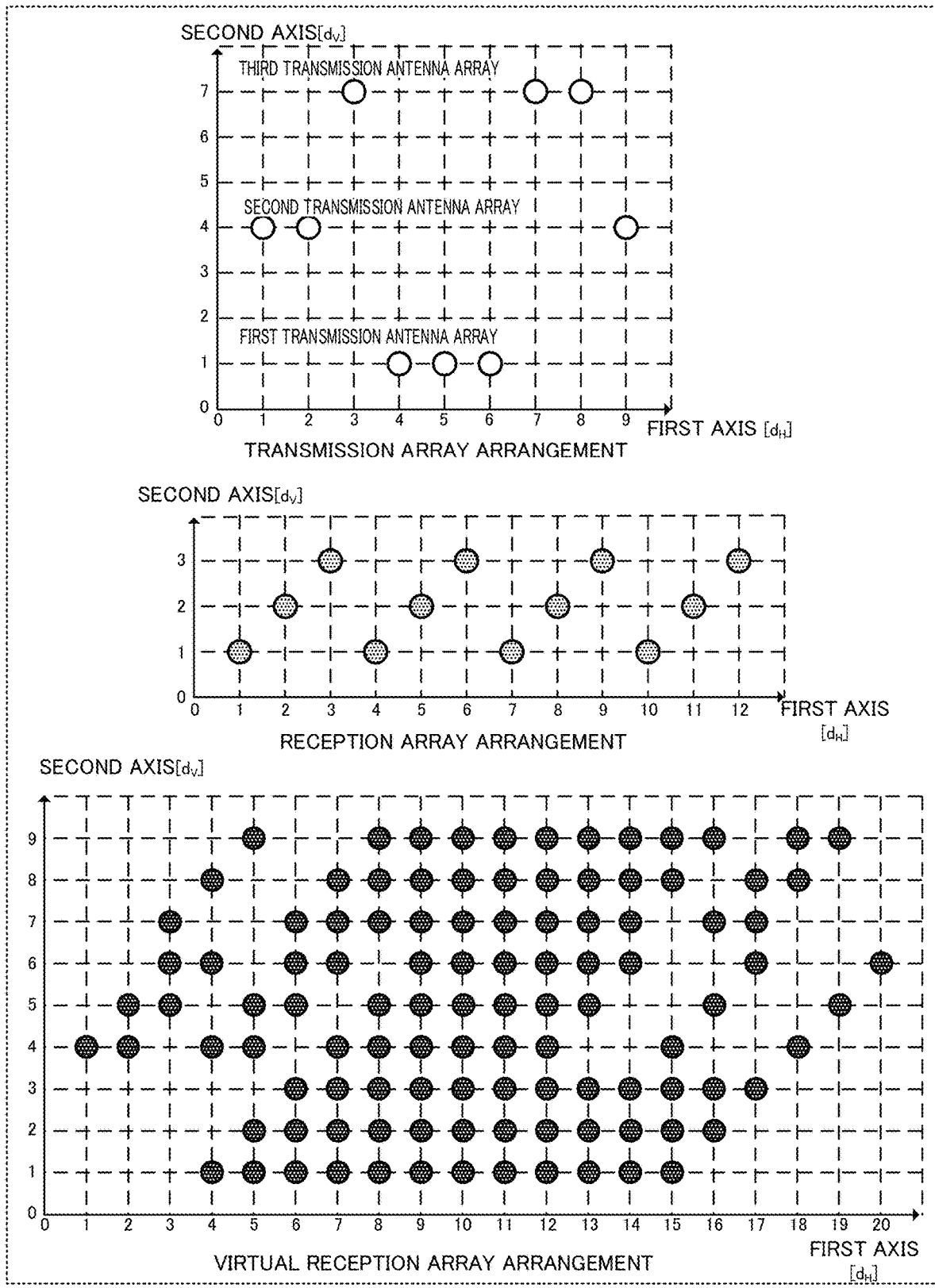
FIG. 18C is a diagram illustrating an antenna arrangement example according to Variation 2 of Embodiment 1.

FIGS. 18A, 18B, and 18C illustrate arrangement examples of transmission antennas 108, reception antennas 202, and a virtual reception array constituted by transmission antennas 108 and reception antennas 202 according to Variation 2.

FIG. 18A illustrates an example of antenna arrangement in the case where $n_s$=2, $p_r$=4, and $p_t$=3, and $p_{tm}$ of a first transmission antenna array is 0, $p_{tm}$ of the second transmission antenna array is 2, and $p_{tm}$ of a third transmission antenna array is 1. As shown in FIG. 18A, in first transmission antenna array ($p_{tm}$=0), $n_s$ antennas are arranged at intervals of $d_H$ in the first axis direction. As shown in FIG. 18A, the third transmission antenna array ($p_{tm}$=1) is arranged 3$d_H$ apart in the first axis direction (in other words, outside the first transmission antenna array). A second transmission antenna array ($p_{tm}$=2) is arranged 5$d_H$ apart in the first axis direction (in other words, outside the first transmission antenna array and the third transmission antenna array). In other words, the three transmission antenna arrays adjacent in the second axis direction in FIG. 18A (for example, the three transmission antenna arrays arranged continuously) include antennas arranged at different positions in the first axis direction.

FIG. 18B illustrates an example of antenna arrangement in the case where $n_s$=2, $p_r$=4, and $p_t$=3 and $p_{tm}$ of each transmission antenna array is 1. As shown in FIG. 18B, first to third transmission antenna arrays are arranged at different positions in the first axis direction.

FIG. 18C illustrate a case where $n_s=3$, $p_r=4$, and $p_t=3$, and $p_{tm}$ of a first transmission antenna array is 0, $p_{tm}$ of the second transmission antenna array is 2, and $p_{tm}$ of a third transmission antenna array is 1. As shown in FIG. 18C, in the first transmission antenna array ($p_{tm}=0$), $n_s$ antennas are arranged at intervals of $d_H$ in the first axis direction. As shown in FIG. 18C, the third transmission antenna array ($p_{tm}=1$) is arranged $4d_H$ apart in the first axis direction (in other words, outside the first transmission antenna array). A second transmission antenna array ($p_{tm}32\ 2$) is arranged $6d_H$ apart in the first axis direction (in other words, outside the first transmission antenna array and the third transmission antenna array). In FIGS. 18A, 18B, and 18C, all of the antennas are arranged at different positions in the first axis direction. At least one antenna need only be arranged at a different position in the first axis direction. In FIGS. 18A, 18B, and 18C, antennas arranged at the same position in the first axis direction may be included (not shown).

In any of the antenna arrangements in FIGS. 18A, 18B, and 18C, virtual antenna elements can be closely arranged at intervals of $d_H$ and $d_V$ in the vicinity of the center of the virtual reception array arrangement.

In FIGS. 18A, 18B, and 18C, transmission antennas 108 may be formed in a size so that they do not physically interfere with each other. For example, in FIGS. 18A, 18B, and 18C, the antennas included in each transmission antenna array are arranged at different positions in the first axis direction. This allows the antennas to be formed in a size of $d_H$ or less in the first axis direction and in any size in the second axis direction.

Variation 2 illustrates a case where antennas included in three transmission antenna arrays adjacent in the second axis direction are arranged at different positions in the first axis direction. In the second axis direction, the number of adjacent transmission antenna arrays in which the antennas are arranged at different positions in the first axis direction need not be three but may be four or more.

(Variation 3)

Variation 3 is an arrangement example similar to Variation 2 and differs from Variation 2 in the configuration of the antenna arrays of transmission antennas 108.

In Variation 3, for example, of the transmission antenna arrays of transmission antennas 108, antennas included in transmission antenna arrays adjacent in the second axis direction are arranged at different positions on the first axis.

FIGS. 19A, 19B, 19C and 19D illustrate arrangement examples of transmission antennas 108, reception antennas 202, and a virtual reception array constituted by transmission antennas 108 and reception antennas 202 according to Variation 3. The arrangement of reception antennas 202 in Variation 3 is the same as that of Variation 1 (for example, see FIG. 9B).

Figure 19A:
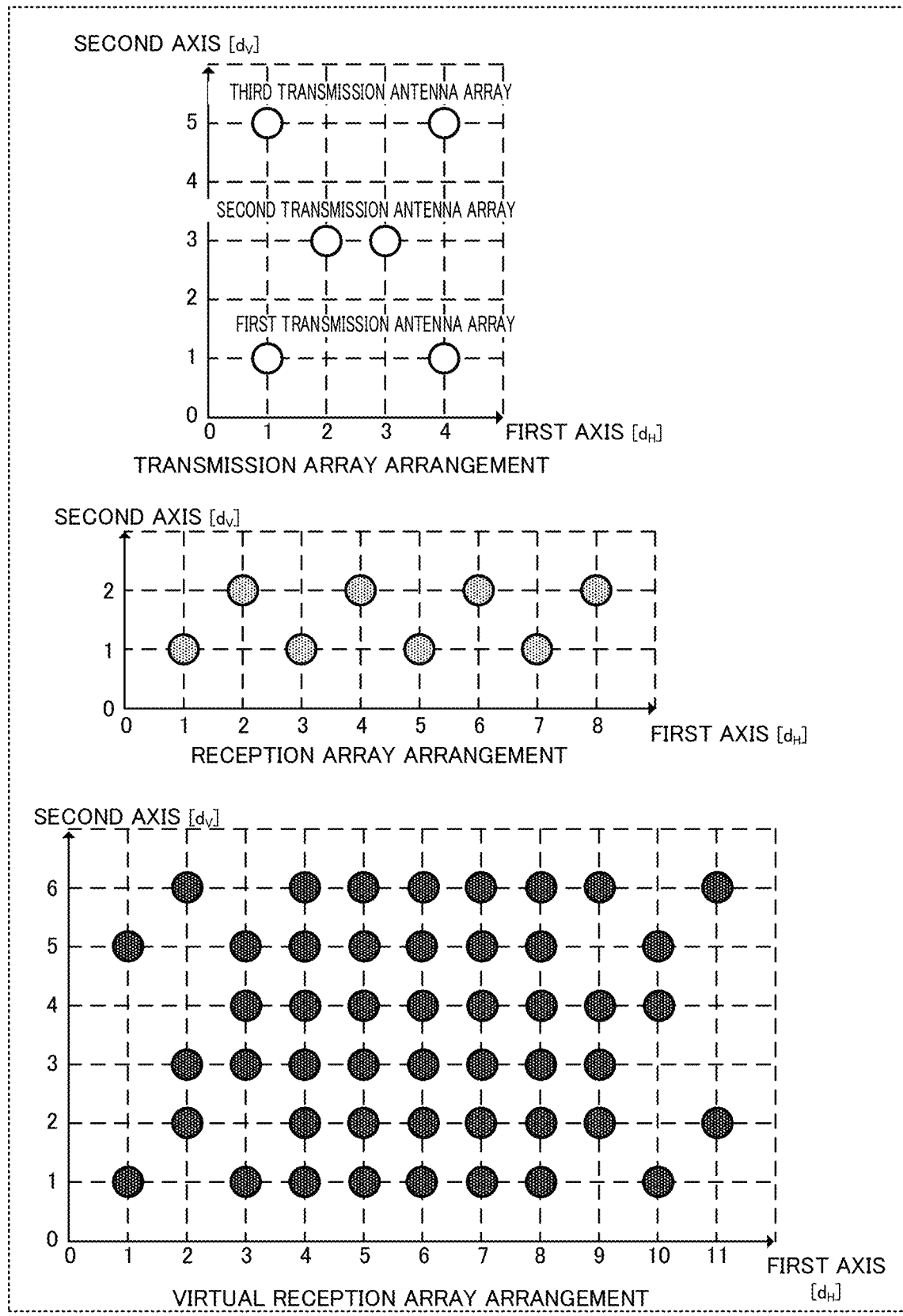
FIG. 19A is a diagram illustrating an antenna arrangement example according to Variation 3 of Embodiment 1.

FIG. 19A illustrates an example of antenna arrangement in the case where $n_s=2$, $p_r=4$, and $p_t=3$, and $p_{tm}$ of the first and third transmission antenna arrays is 1, $p_{tm}$ of the second transmission antenna array is 0, and the antennas included in the first and third transmission antenna arrays are arranged on the first axis (in other words, at the same position). As shown in FIG. 19A, the first and third transmission antenna arrays and the second transmission antenna array are arranged at different positions in the first axis direction.

Figure 19B:
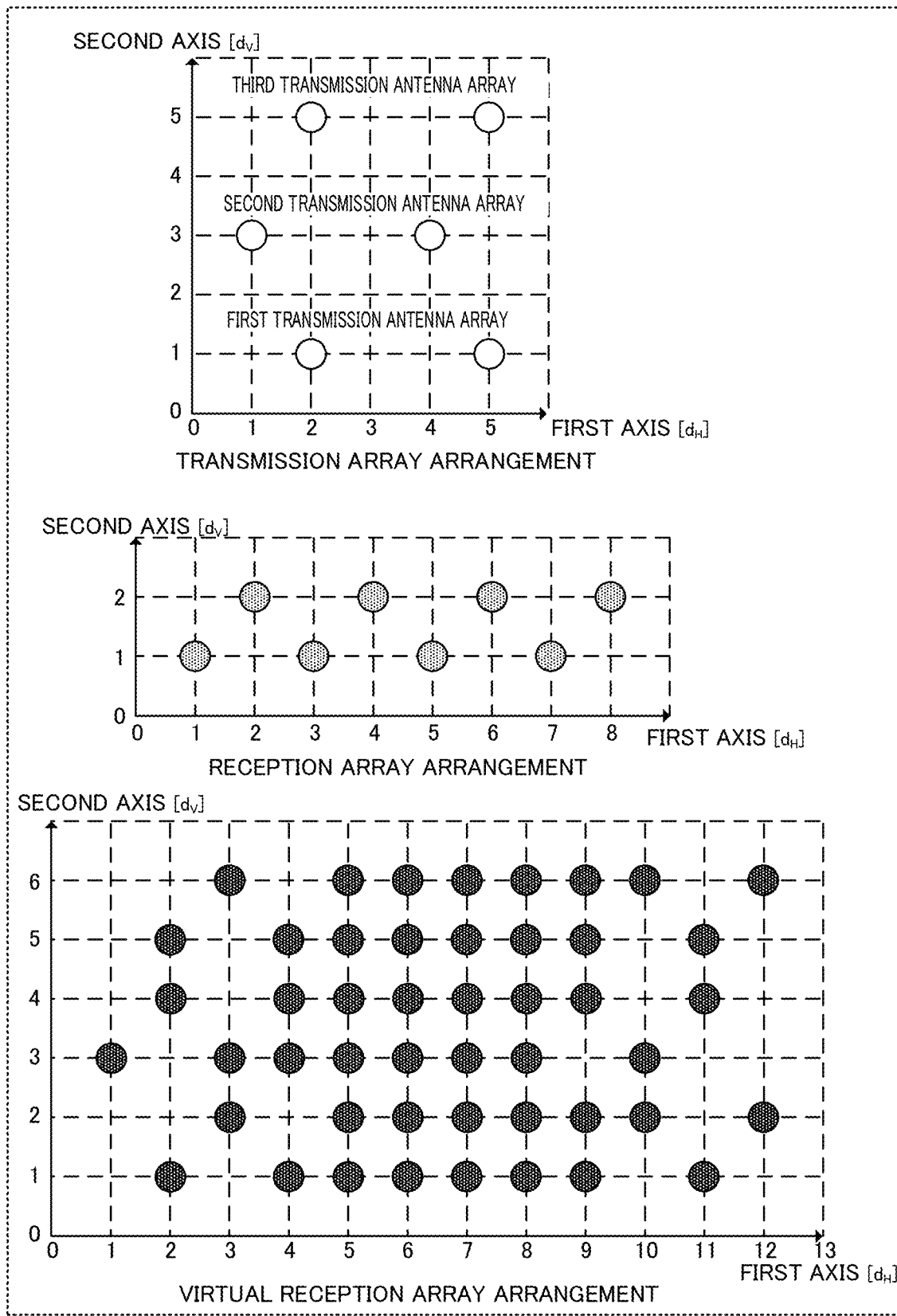
FIG. 19B is a diagram illustrating an antenna arrangement example according to Variation 3 of Embodiment 1.

FIG. 19B illustrates an example of antenna arrangement in the case where $n_s=2$, $p_r=4$, and $p_t=3$, and $p_{tm}$ of each transmission antenna array is 1, and the antennas included in the first and third transmission antenna arrays are arranged on the first axis (in other words, at the same position). As shown in FIG. 19B, the first and third transmission antenna arrays and the second transmission antenna array are arranged at different positions in the first axis direction.

Figure 19C:
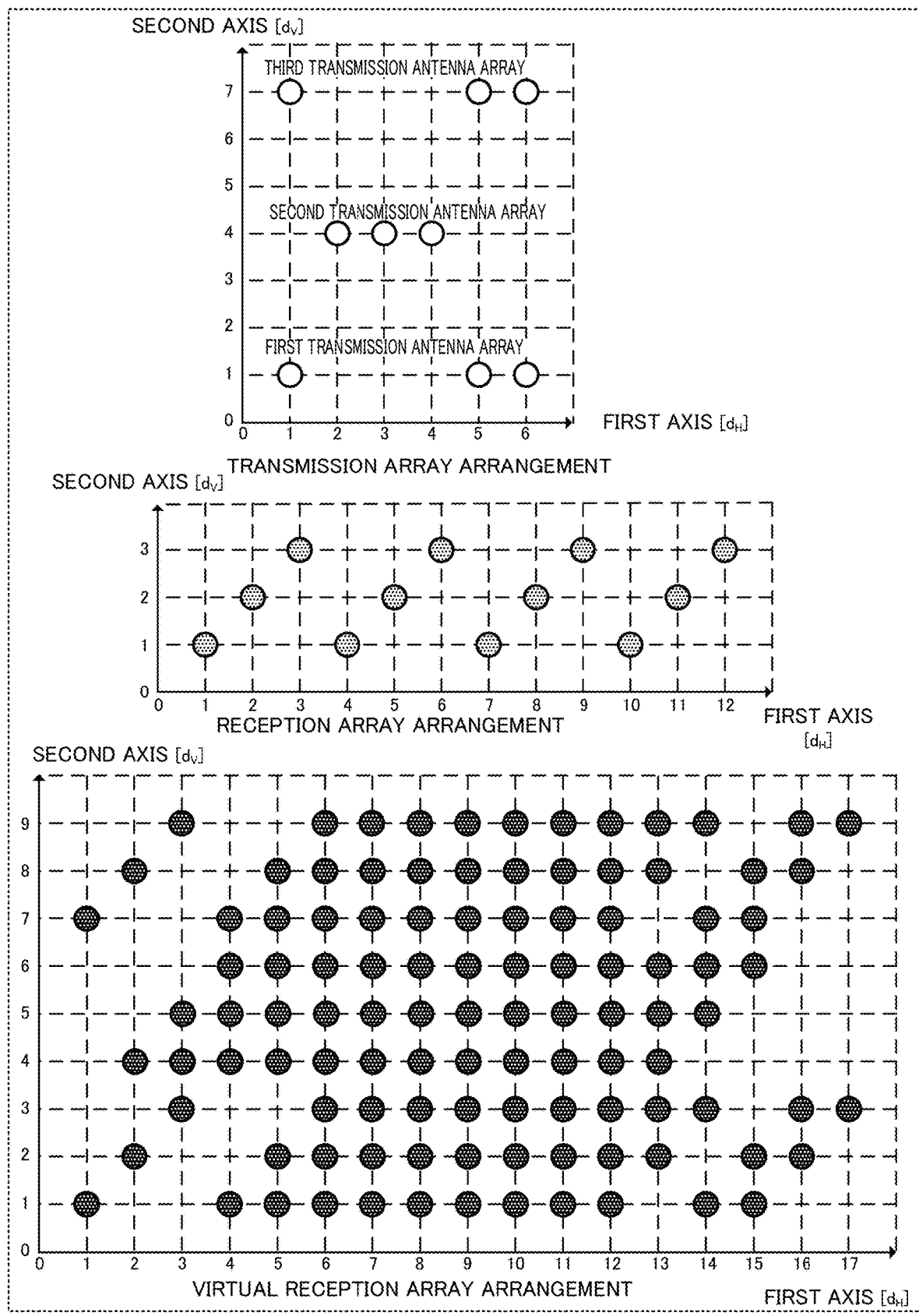
FIG. 19C is a diagram illustrating an antenna arrangement example according to Variation 3 of Embodiment 1.

FIG. 19C illustrates an example of antenna arrangement in the case where $n_s=3$, $p_r=4$, and $p_t=3$, and $p_{tm}$ of the first and third transmission antenna arrays is 1, $p_{tm}$ of the second transmission antenna array is 0, and the antennas included in the first and third transmission antenna arrays are arranged on the first axis (in other words, at the same position). As shown in FIG. 19C, the first and third transmission antenna arrays and the second transmission antenna array are arranged at different positions in the first axis direction.

Figure 19D:
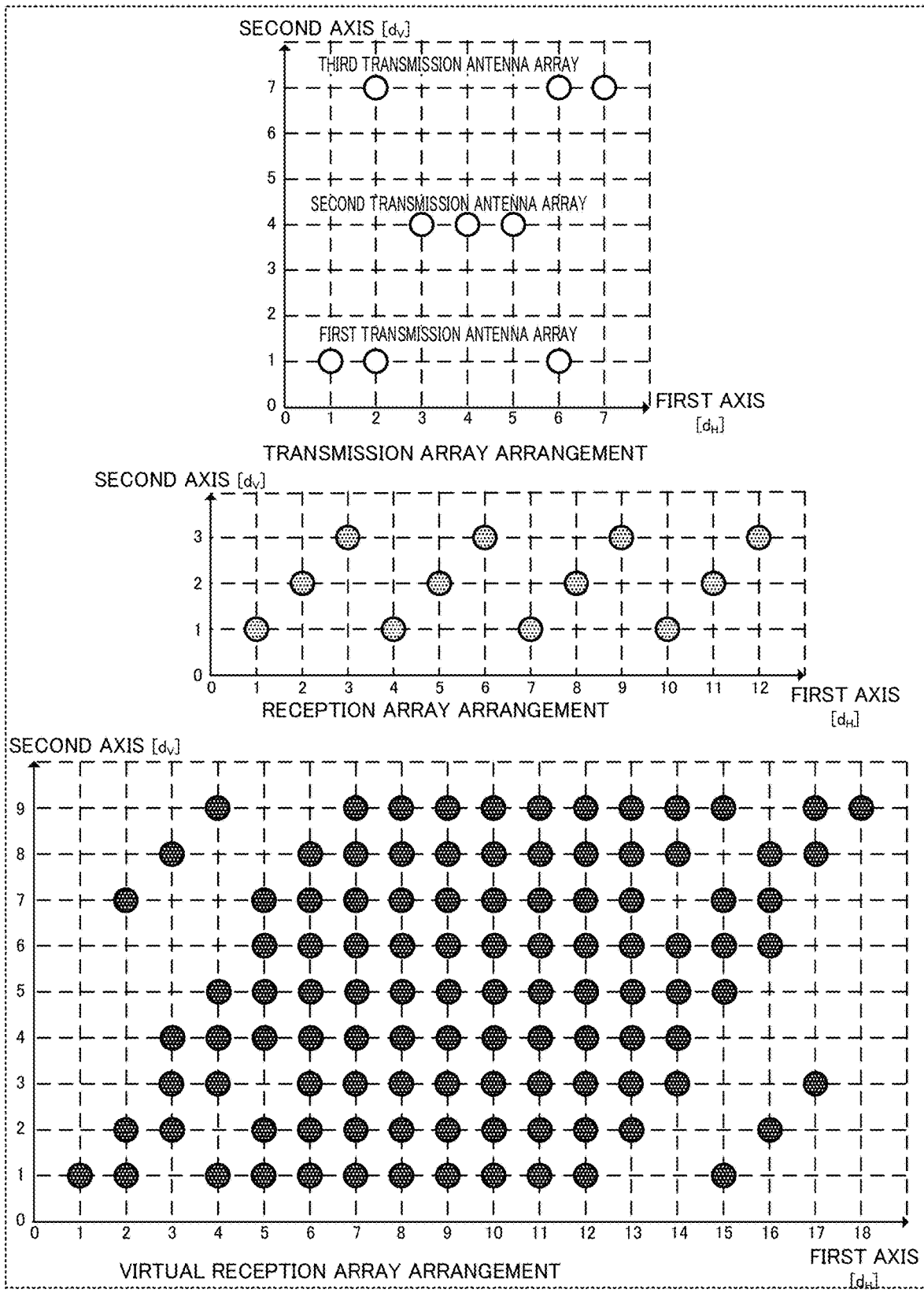
FIG. 19D is a diagram illustrating an antenna arrangement example according to Variation 3 of Embodiment 1.

FIG. 19D illustrates an example of antenna arrangement in the case where $n_s=3$, $p_r=4$, and $p_t=3$, and $p_{tm}$ of first and third transmission antenna arrays is 1, and $p_{tm}$ of a second transmission antenna array is 0. As shown in FIG. 19D, the antennas of the first transmission antenna array and the third transmission antenna array have reversed arrangements in the first axis, in which some of the antennas are aligned (in other words, on the same position) on the first axis. As shown in FIG. 19D, the first and third transmission antenna arrays and the second transmission antenna array are arranged at different positions in the first axis direction. The first and third transmission antenna arrays include antennas arranged at the same position and antennas arranged at different positions in the first axis direction.

In any of the antenna arrangements in FIGS. 19A to 19D, virtual antenna elements can be closely arranged at intervals of $d_H$ and $d_V$ in the vicinity of the center of the virtual reception array arrangement.

In FIGS. 19A, 19B, 19C, and 19D, transmission antennas 108 may be formed in a size so that they do not physically interfere with each other. For example, in FIGS. 19A, 19B, 19C, and 19D, the antennas included in the first and third transmission antenna arrays are arranged at the same position in the first axis direction can be formed in a size of $d_H$ or less in the first axis direction and in a size of $2n_s d_V$ or less in the second axis direction. For example, in FIGS. 19A, 19B, 19C, and 19D, the antennas included in the second transmission antenna array can be formed in a size of $d_H$ or less in the first axis direction and in any size in the second axis direction. For example, in FIG. 19D, the antennas included in the first transmission antenna array and the third transmission antenna array and arranged at different positions from the positions of the other antennas in the first axis direction can be formed in a size of $d_H$ or less in the first axis direction and in any size in the second axis direction.

(Variation 4)

Variation 4 is an arrangement example similar to Variation 3 and differs from Variation 3 in the configuration of the antenna arrays of transmission antennas 108.

In Variation 4, for example, each transmission antenna array does not include antennas arranged at intervals of $d_H$ on the first axis (in other words, closely arranged antennas). In other words, in Variation 4, each transmission antenna array includes antennas $2d_H$ or more spaced apart on the first axis.

In Variation 4, antennas included in transmission antenna arrays adjacent in the second axis direction are arranged at different positions in the first axis direction, as in Variation 3.

Figure 20A:
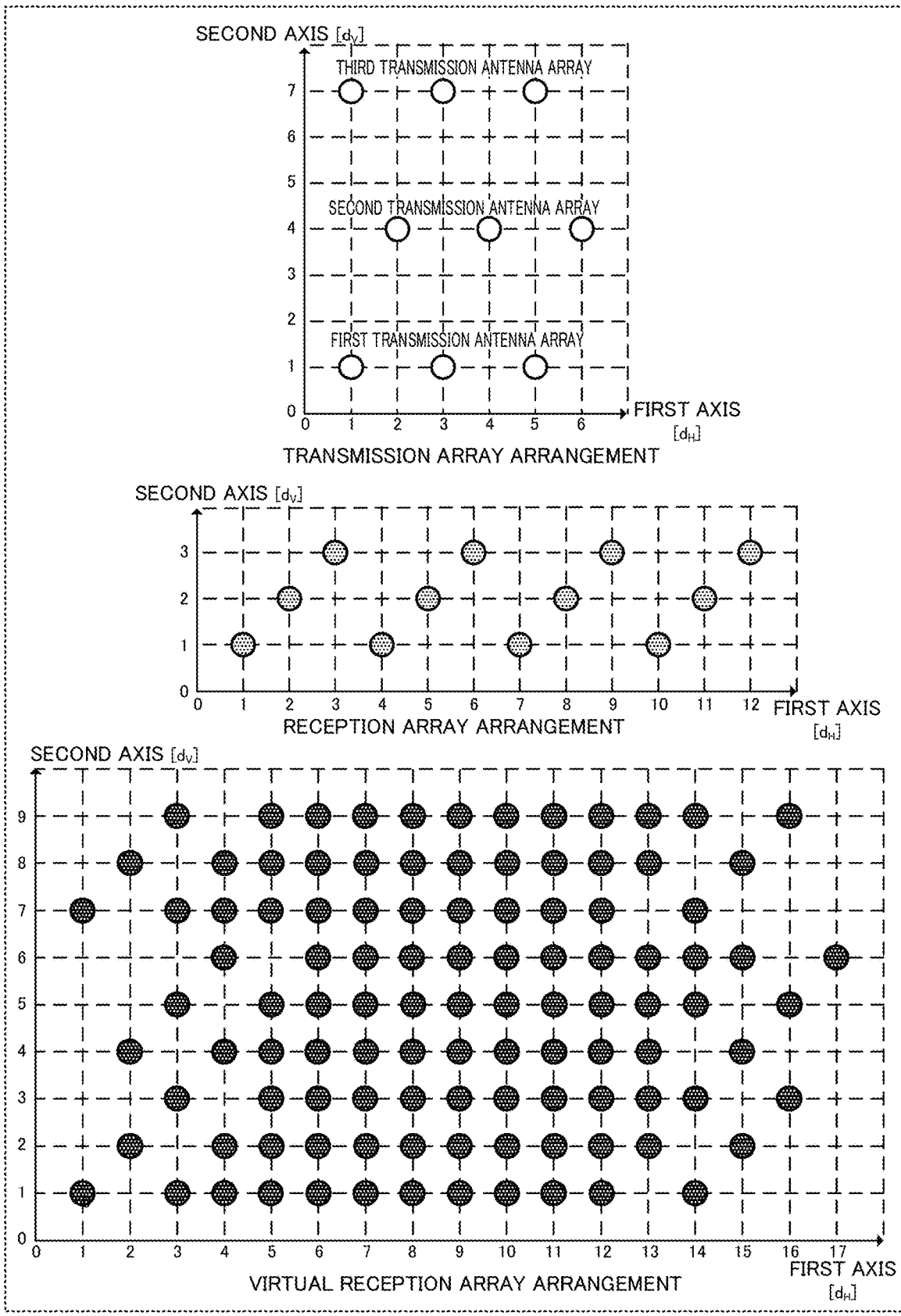
FIG. 20A is a diagram illustrating an antenna arrangement example according to Variation 4 of Embodiment 1.
Figure 20B:
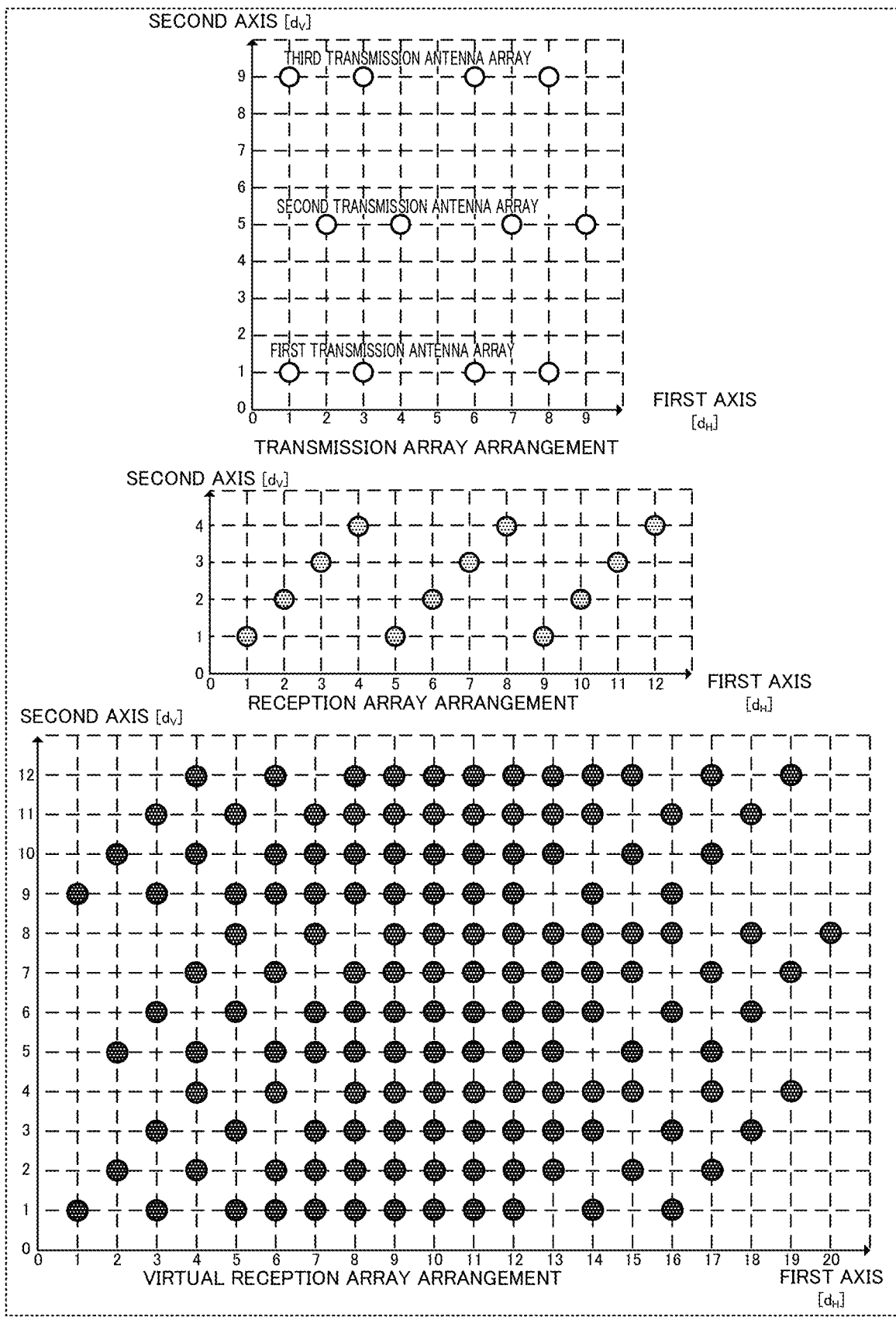
FIG. 20B is a diagram illustrating an antenna arrangement example according to Variation 4 of Embodiment 1.

FIGS. 20A and 20B illustrate arrangement examples of transmission antennas 108, reception antennas 202, and a virtual reception array constituted by transmission antennas 108 and reception antennas 202 according to Variation 4.

The arrangement of reception antennas 202 in Variation 4 is the same as that of Variation 1 (for example, see FIG. 9B).

FIG. 20A illustrates an example of antenna arrangement in the case where $n_s=3$, $p_r=32$ 4, and $p_t=3$, and the antennas included in each transmission antenna array are arranged at intervals of $2d_H$, and the antennas included in first and third antenna arrays are aligned on the first axis. As shown in FIG. 20A, the first and third transmission antenna arrays and a second transmission antenna array are arranged at different positions in the first axis direction.

FIG. 20B illustrates an example of antenna arrangement in the case where $n_s=4$, $p_r=3$, and $p_t=3$, and the antennas included in each transmission antenna array are arranged at an interval of $2d_H$, an interval of $3d_H$, and an interval of $2d_H$ from the left, and the antennas of first and third antenna arrays are aligned on the first axis. As shown in FIG. 20B, the first and third transmission antenna arrays and a second transmission antenna array are arranged at different positions in the first axis direction.

In any of the antenna arrangements in FIGS. 20A and 20B, virtual antenna elements can be closely arranged at intervals of $d_H$ and $d_V$ in the vicinity of the center of the virtual reception array arrangement.

In FIGS. 20A and 20B, transmission antennas 108 may be formed in a size so that they do not physically interfere with each other. For example, in FIGS. 20A and 20B, the antennas included in the first and third transmission antenna arrays can be formed in a size of $d_H$ or less in the first axis direction and in a size of $2n_s d_V$ or less in the second axis direction. For example, in FIGS. 20A and 20B, the antennas included in the second transmission antenna array can be formed in a size of $d_H$ or less in the first axis direction and in any size in the second axis direction.

(Variation 5)

Variation 5 is an arrangement example similar to Variation 2 and Variation 3 and differs from Variation 2 and Variation 3 in the configuration of the antenna arrays of transmission antennas 108.

In Variation 5, the number of transmission antennas 108 constituting each transmission antenna array is not limited to $n_s$. In Variation 5, the configuration of each transmission antenna array is the same as that of any of, for example, Variations 1 to 4.

Figure 21:
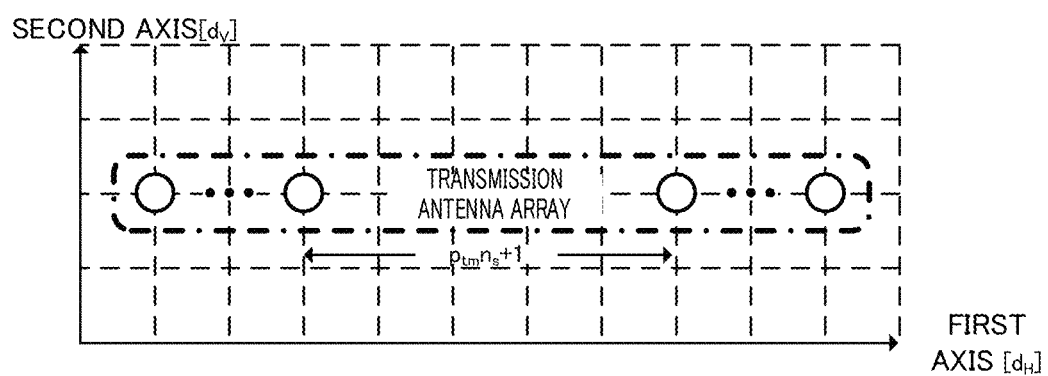
FIG. 21 is a diagram illustrating an arrangement example of transmission antennas according to Variation 5 of Embodiment 1.

For example, in Variation 5, the number of antennas of each transmission antenna array is not limited to the number of antennas ($n_s$), shown in Variation 2 of FIG. 17. For example, as shown in FIG. 21, the antennas included in the transmission antenna array may be arranged in areas $p_{tm}n_s+1$ apart in the first axis direction, where $p_{tm}$ is an integer of 0 to $p_r-1$.

FIGS. 22A to 22D illustrate arrangement examples of transmission antennas 108, reception antennas 202, and a virtual reception array constituted by transmission antennas 108 and reception antennas 202 according to Variation 5. The arrangement of reception antennas 202 in Variation 5 is the same as that of Variation 1 (for example, see FIG. 9B).

Figure 22A:
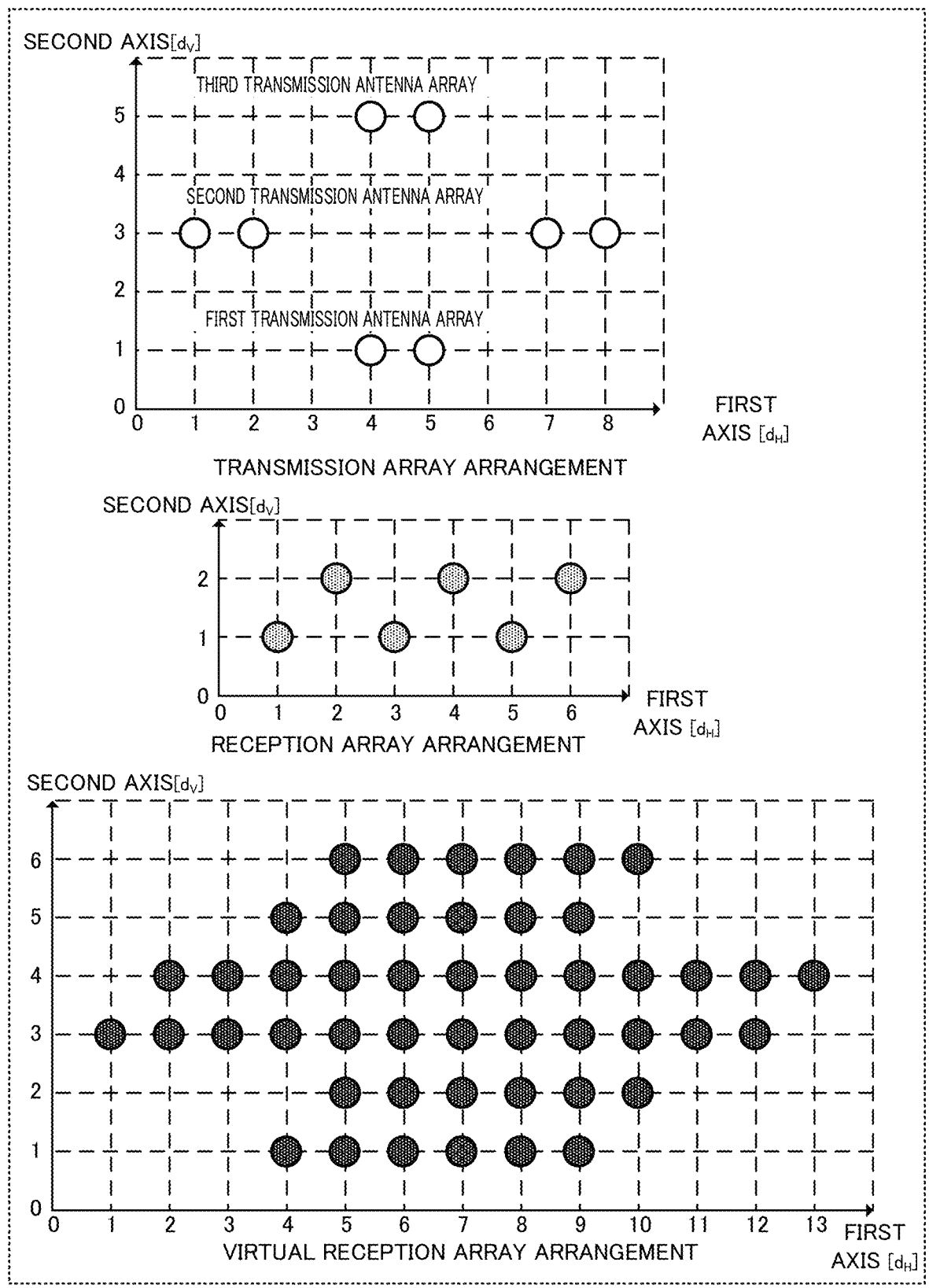
FIG. 22A is a diagram illustrating an antenna arrangement example according to Variation 5 of Embodiment 1.

FIG. 22A illustrates a case where $n_s=2$, $p_r=3$, and $p_t=3$, and in first and third transmission antenna arrays, two antennas are arranged at an interval of $d_H$ on the first axis, and in a second transmission antenna arrays, four antennas are divided and arranged at an interval of $p_{tm}n_s+1$ in the first axis direction, where $p_{tm}$ is 2. In FIG. 22A, the first transmission antenna array and the third transmission antenna array are arranged at the same coordinate on the first axis.

Figure 22B:
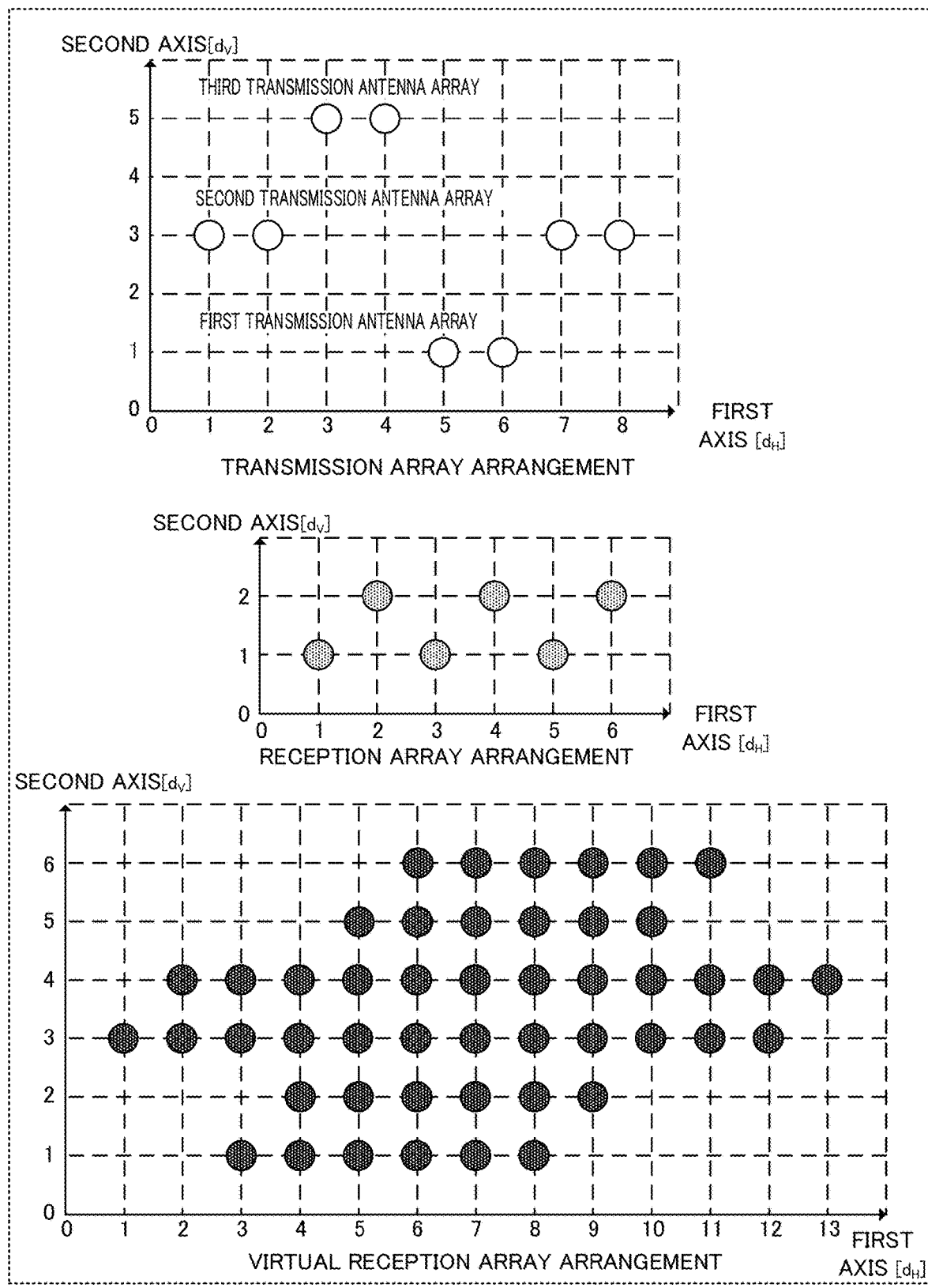
FIG. 22B is a diagram illustrating an antenna arrangement example according to Variation 5 of Embodiment 1.

In FIG. 22B, the number of antennas of each transmission antenna array is the same as that of FIG. 22A. The antennas are arranged at different positions on the first axis as in Variation 2.

Figure 22C:
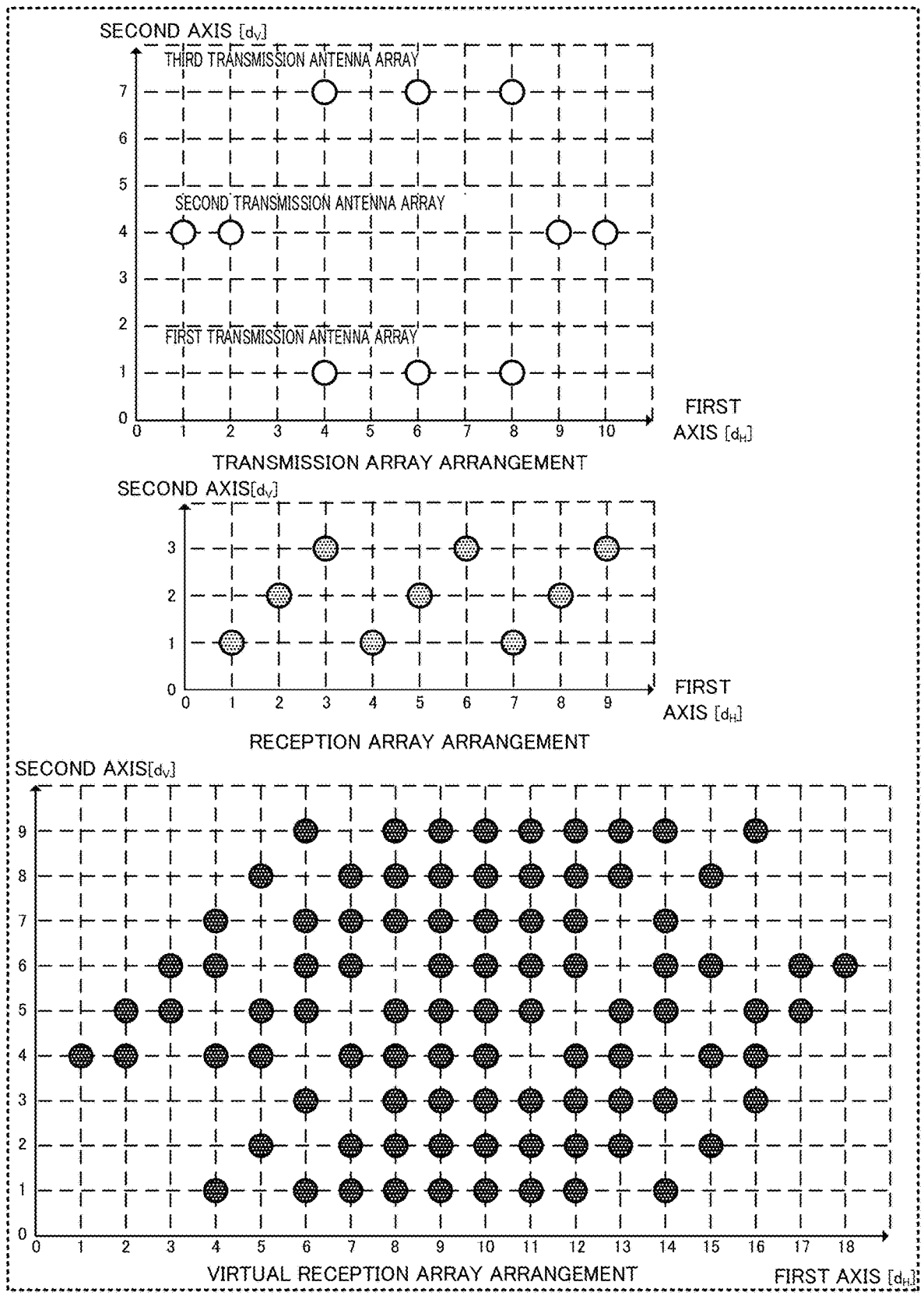
FIG. 22C is a diagram illustrating an antenna arrangement example according to Variation 5 of Embodiment 1.

FIG. 22C illustrate a case where $n_s=3$, $p_r=3$, and $p_t=3$, and in first and third transmission antenna arrays, three antennas are arranged at intervals of $2d_H$ on the first axis, and in a second transmission antenna arrays, four antennas are divided into two, which are arranged at an interval of $p_{tm}n_s+1$ in the first axis direction, where $p_{tm}$ is 2. In FIG. 22C, the first transmission antenna array and the third transmission antenna array are arranged at the same coordinate on the first axis.

Figure 22D:
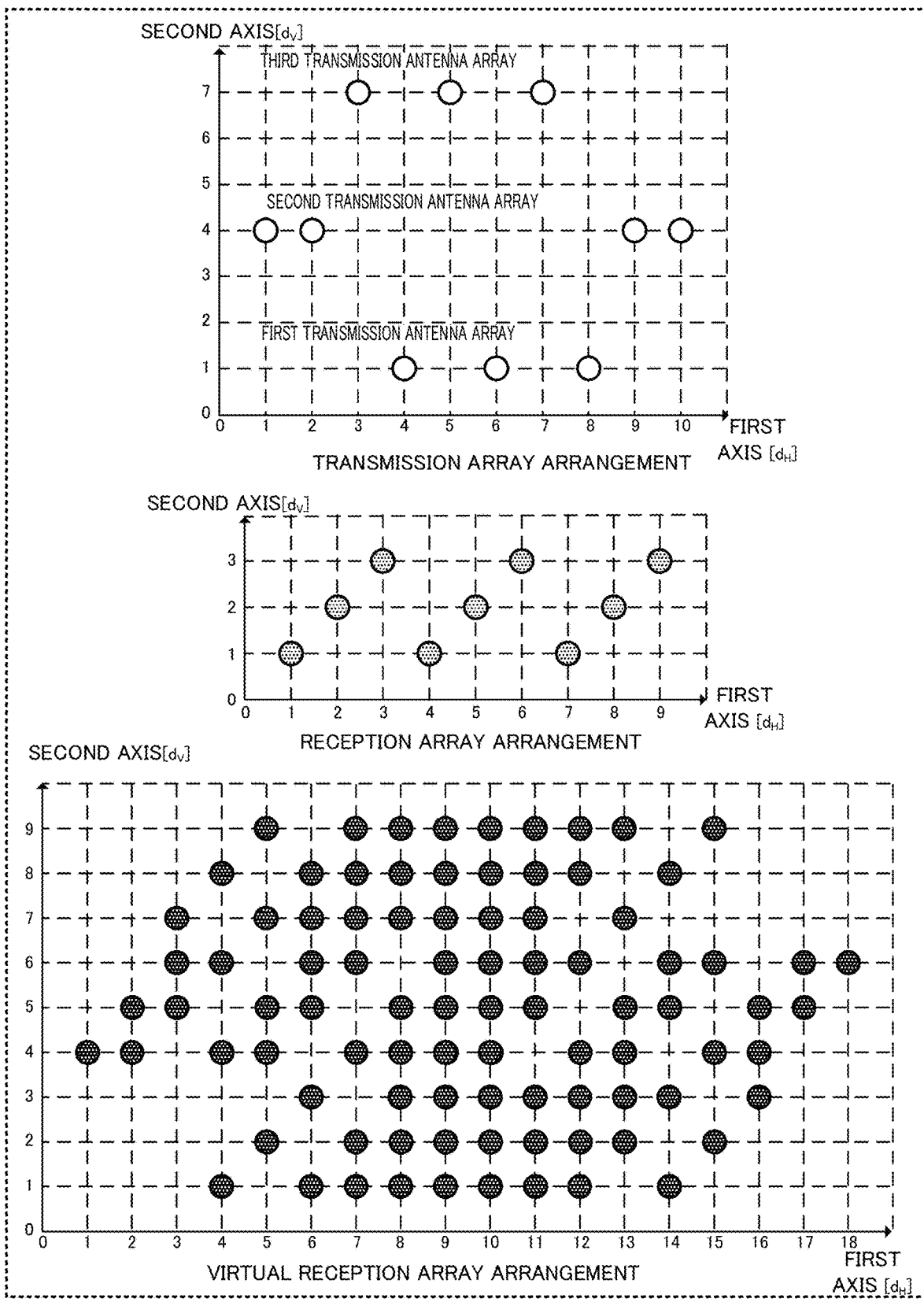
FIG. 22D is a diagram illustrating an antenna arrangement example according to Variation 5 of Embodiment 1.

In FIG. 22D, the number of antennas of each transmission antenna array is the same as that of FIG. 22C. The antennas are arranged at different positions on the first axis as in Variation 2.

In any of the antenna arrangements in FIGS. 22A to 22D, virtual antenna elements can be closely arranged at intervals of $d_H$ and $d_V$ in the vicinity of the center of the virtual reception array arrangement.

In FIGS. 22A to 22D, transmission antennas 108 may be formed in a size so that they do not physically interfere with each other. For example, the antennas included in the first and third transmission antenna arrays in FIGS. 22A and 22C can be formed in a size of $d_H$ or less in the first axis direction and in a size of $2n_s d_V$ or less in the second axis direction. The antennas included in the first and third transmission antenna arrays in FIGS. 22B and 22D and the antennas included in the second transmission antenna array in FIGS. 22A to 22D can be formed in a size of $d_H$ or less in the first axis direction and in any size in the second axis direction. In FIG. 22D, all of the antennas are arranged at different positions in the first axis direction. At least one antenna need only be arranged at a different position in the first axis direction. In FIG. 22D, antennas arranged at the same position in the first axis direction may be included (not shown).

(Variation 6)

Variation 6 describes an arrangement example similar to those of Variations 1-5 and different in the number of transmission antenna arrays of transmission antennas 108.

Variation 6 describes a case where the number of transmission antenna arrays of transmission antenna 108 is $p_r>3$. The configuration of each transmission antenna array is the same as any of the configurations of Variations 1 to 5.

Figure 23A:
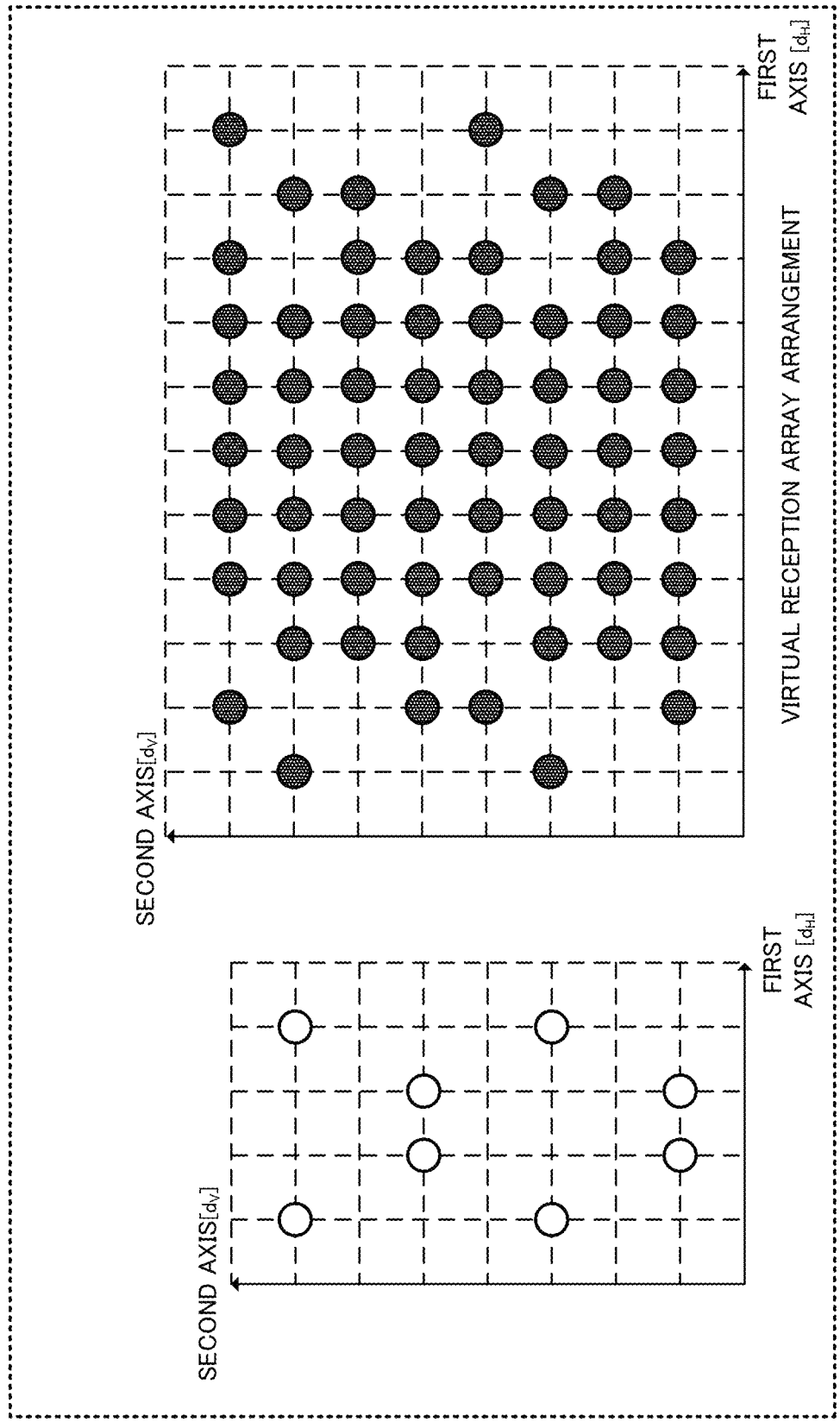
FIG. 23A is a diagram illustrating an antenna arrangement example according to Variation 6 of Embodiment 1.
Figure 23B:
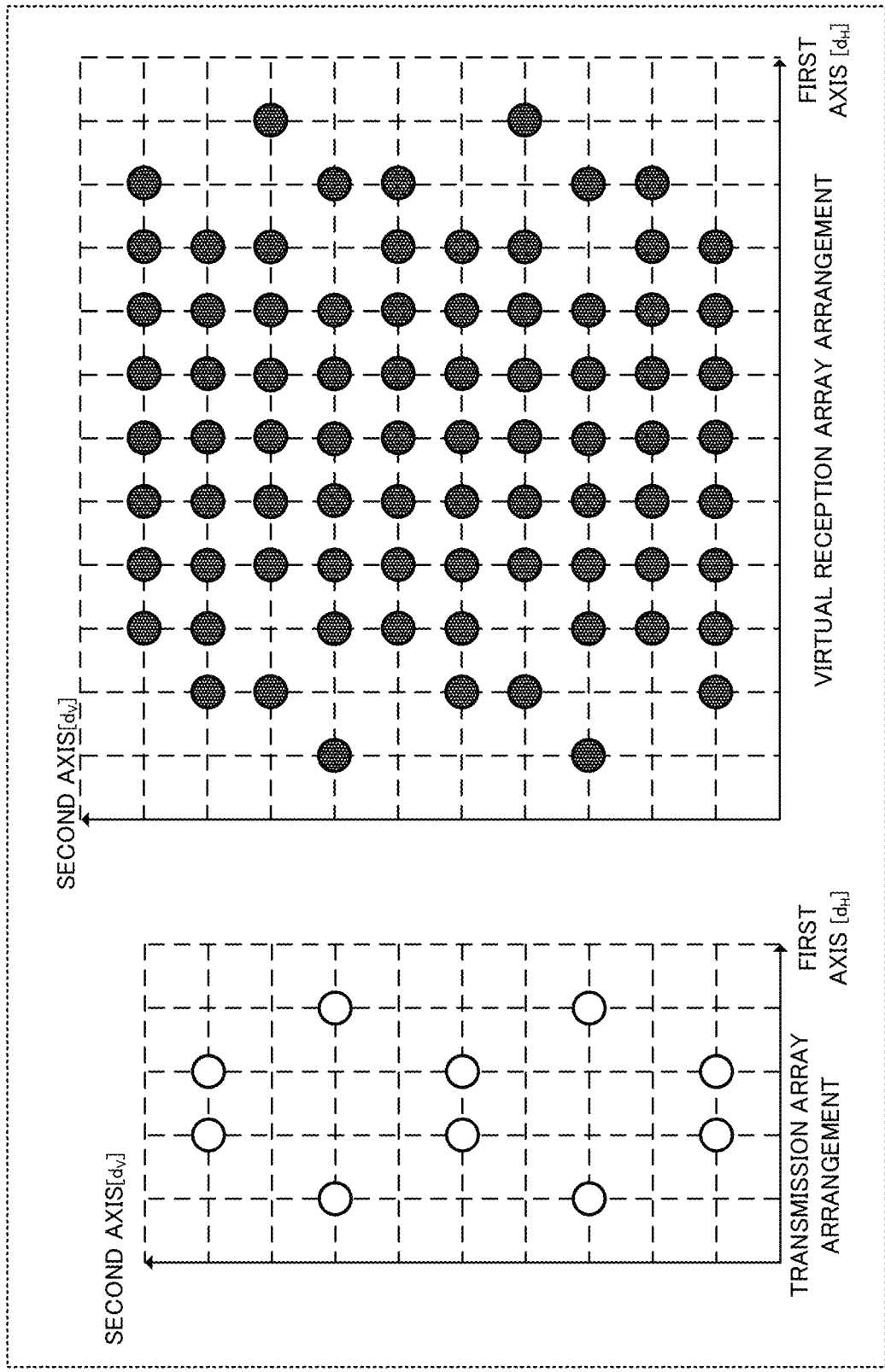
FIG. 23B is a diagram illustrating an antenna arrangement example according to Variation 6 of Embodiment 1.
Figure 23C:
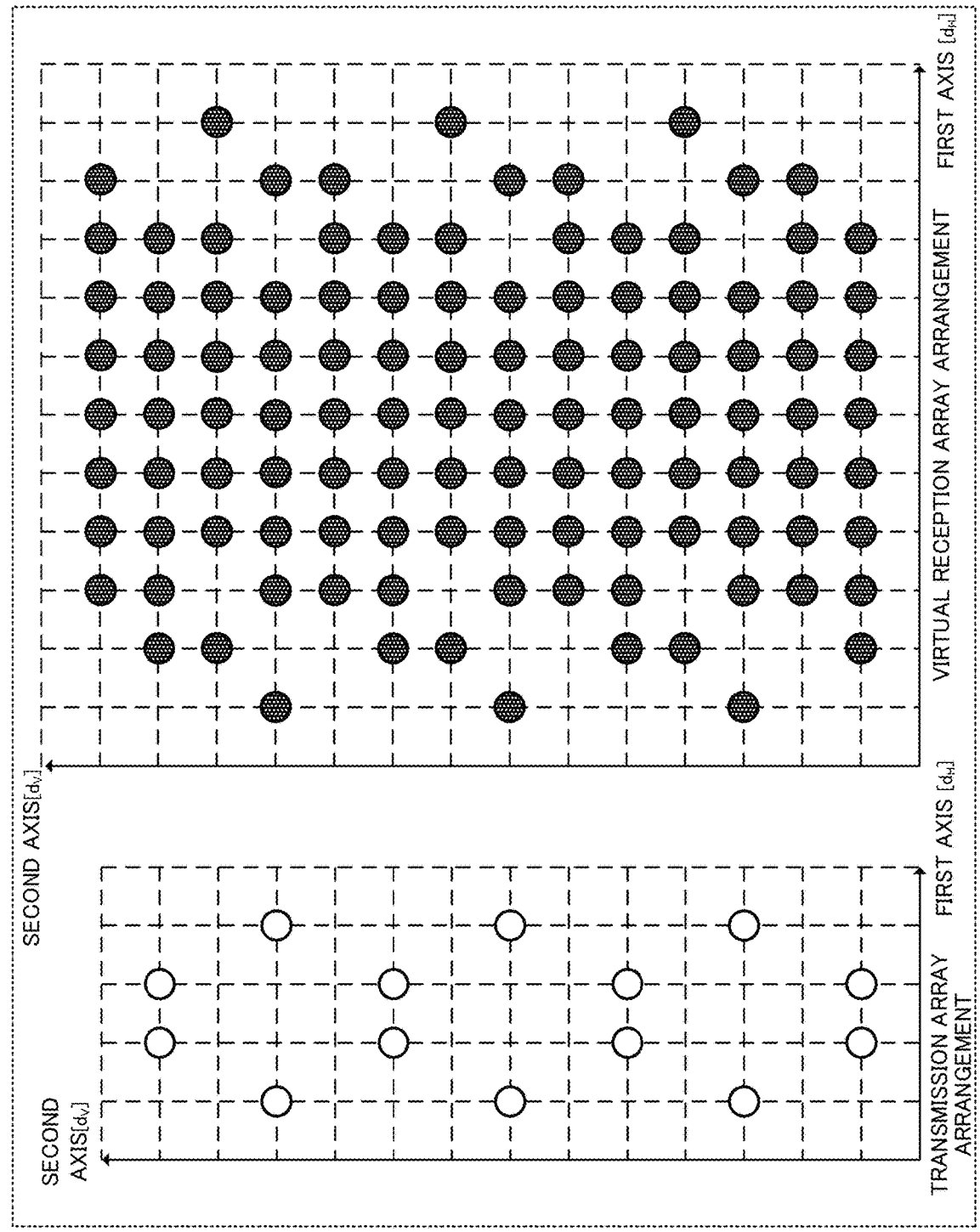
FIG. 23C is a diagram illustrating an antenna arrangement example according to Variation 6 of Embodiment 1.

FIGS. 23A to 23C illustrate arrangement examples of transmission antennas 108 and arrangement examples of a virtual reception array in the case where the number of transmission antenna arrays, $p_r$, differs on the basis of the configuration of Variation 1 shown in FIG. 10B. The arrangement of reception antennas 202 in Variation 6 is the same as that of Variation 1 (for example, see FIG. 9B).

FIG. 23A illustrates a case where $p_r=4$, FIG. 23B illustrates a case where $p_r=5$, and FIG. 23C illustrates a case where $p_r=7$. FIGS. 23A to 23C illustrate a case where the transmission antenna array of transmission antennas 108 shown in FIG. 10B is repeated.

In any of the antenna arrangements in FIGS. 23A to 23C, virtual antenna elements can be closely arranged at intervals of $d_H$ and $d_V$ in the vicinity of the center of the virtual reception array arrangement.

In FIGS. 23A to FIG. 23C, the antennas included in adjacent transmission antenna arrays on the second axis are arranged at different positions on the first axes. This allows transmission antennas 108 to be formed in a size of $d_H$ or less in the first axis direction and in a size of $2n_s d_V$ or less in the second axis direction.

In Variation 6, the arrangement of a virtual reception array arranged at intervals of $d_H$ and $d_V$ in the vicinity of the center can be increased in the second axis direction while the antenna gain is improved, thereby improving the resolution in the second axis direction.

FIGS. 23A to FIG. 23C show examples in which $p_t>3$ in Variation 1. This is given for mere illustrative purposes. An arrangement in which $p_t>3$ in another Variation (for example, any of Variations 2 to 5) offers the same effects.
(Variation 7)

In Variation 7, transmission antennas 108 with antenna arrangement according to Variations 1 to 6 are referred to as one "transmission antenna group", and reception antennas 202 with antenna arrangement according to Variations 1 to 6 are referred to as one "reception antenna group".

Variation 7 describes a case where the number of one or both of transmission antenna groups and reception antenna groups is more than one.

Variation 7 can improve the antenna gain by increasing the size of the antennas to a size so that they do not physically interfere with each other and can improve the resolution by increasing the opening length of each virtual reception array using many transmission antenna groups and reception antenna groups, as in another Variation (for example, any of Variations 1 to 6).

Figure 24A:
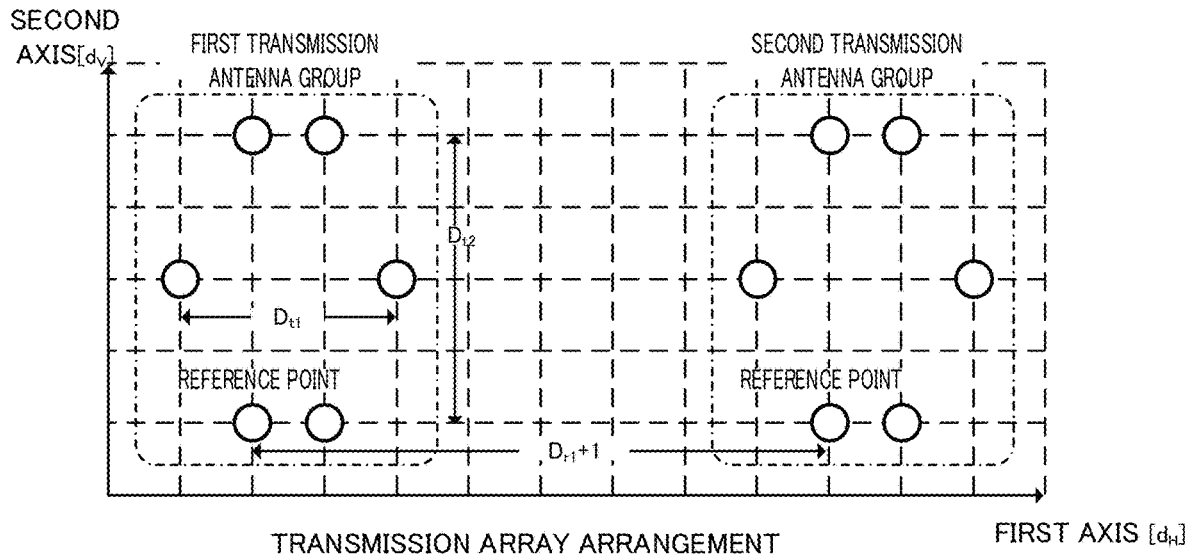
FIG. 24A is a diagram illustrating an arrangement example of transmission antennas according to Variation 7 of Embodiment 1.
Figure 24B:
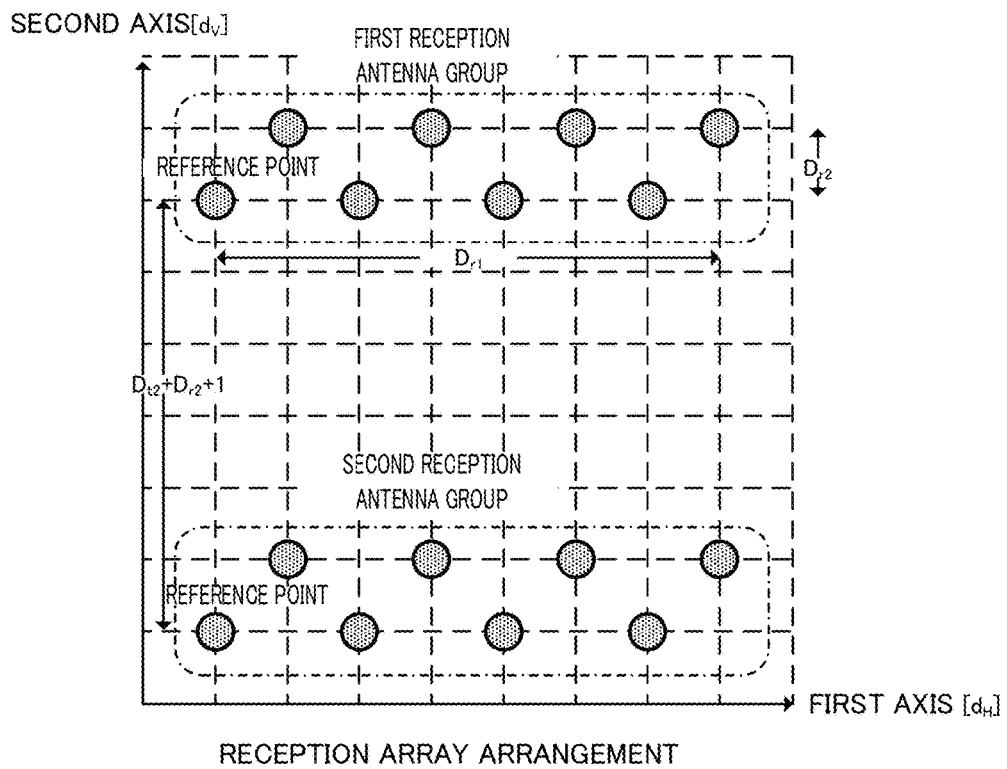
FIG. 24B is a diagram illustrating an arrangement example of reception antennas according to Variation 7 of Embodiment 1.
Figure 24C:
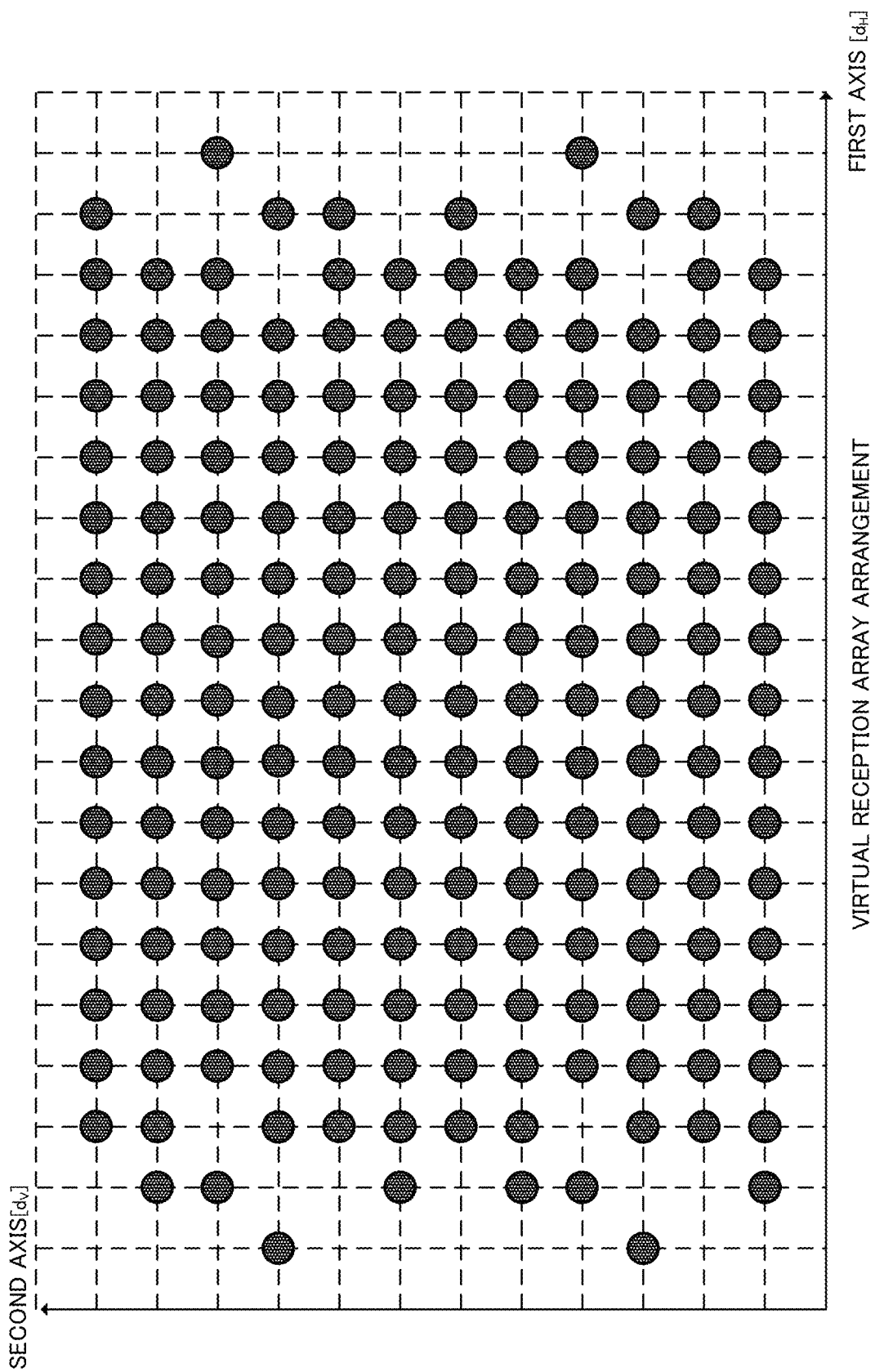
FIG. 24C is a diagram illustrating an arrangement example of a virtual reception array according to Variation 7 of Embodiment 1.

In one example, FIG. 24A illustrates an example in which a plurality of transmission antenna groups are arranged on the basis of the configuration of the antenna arrangement of Variation 1 shown in FIG. 10B. FIG. 24B illustrates an example in which a plurality of reception antenna groups are arranged on the basis of the configuration of the antenna arrangement of Variation 1 shown in FIG. 10B. FIG. 24C illustrates an arrangement example of a virtual reception array constituted by transmission antennas 108 shown in FIG. 24A and reception antennas 202 shown in FIG. 24B.

Here, let $D_{t1}$ be the opening length of each transmission antenna group in the first axis direction shown in FIG. 24A, let $D_{t2}$ be the opening length in the second axis direction, let $D_{r1}$ be the opening length of each reception antenna group in the first axis direction shown in FIG. 24B, and $D_{r2}$ be the opening length in the second axis direction.

In FIG. 24A, reference points of a first transmission antenna group and a second transmission antenna group (for example, the positions of corresponding antennas in the transmission antenna groups) are arranged at an interval of $D_{r1}+1$ in the first axis direction. In FIG. 24B, reference points of the first reception antenna group and the second reception antenna group (for example, the positions of corresponding antennas in the reception antenna groups) are arranged at an interval of $D_{t2}+D_{r2}+1$ in the second axis direction.

This allows the virtual antenna elements to be closely arranged at intervals of $d_H$ and $d_V$ in the vicinity of the center of the virtual reception array arrangement shown in FIG. 24C.

Figure 25A:
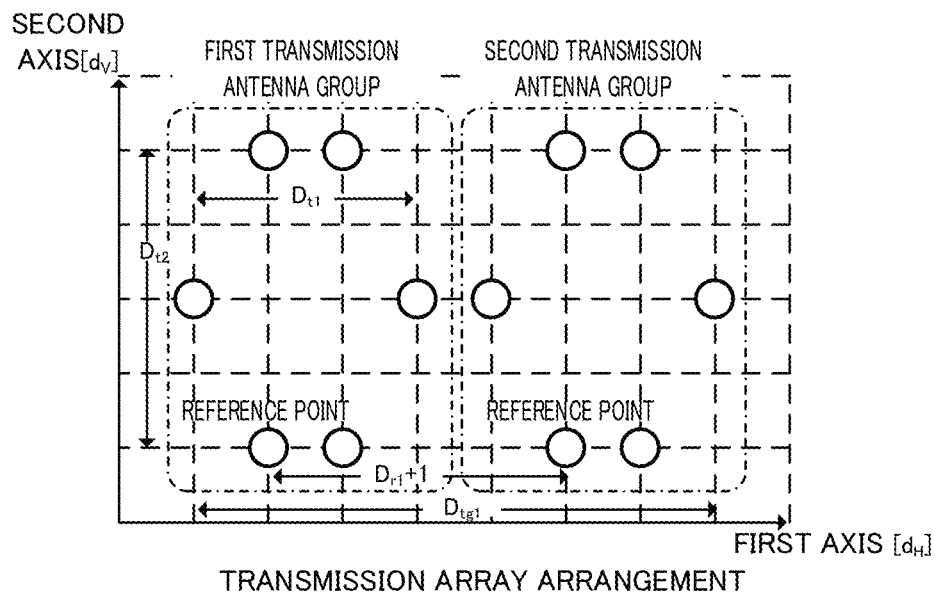
FIG. 25A is a diagram illustrating an arrangement example of transmission antennas according to Variation 7 of Embodiment 1.
Figure 25B:
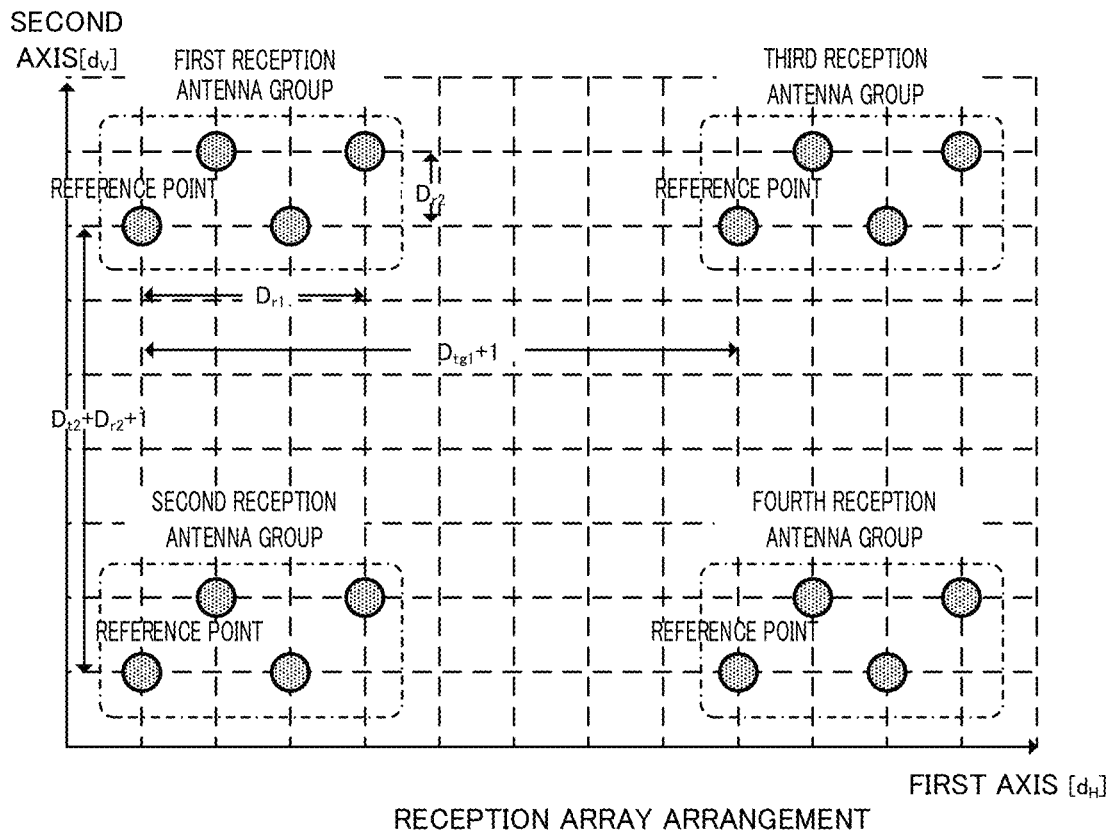
FIG. 25B is a diagram illustrating an arrangement example of reception antennas according to Variation 7 of Embodiment 1.
Figure 25C:
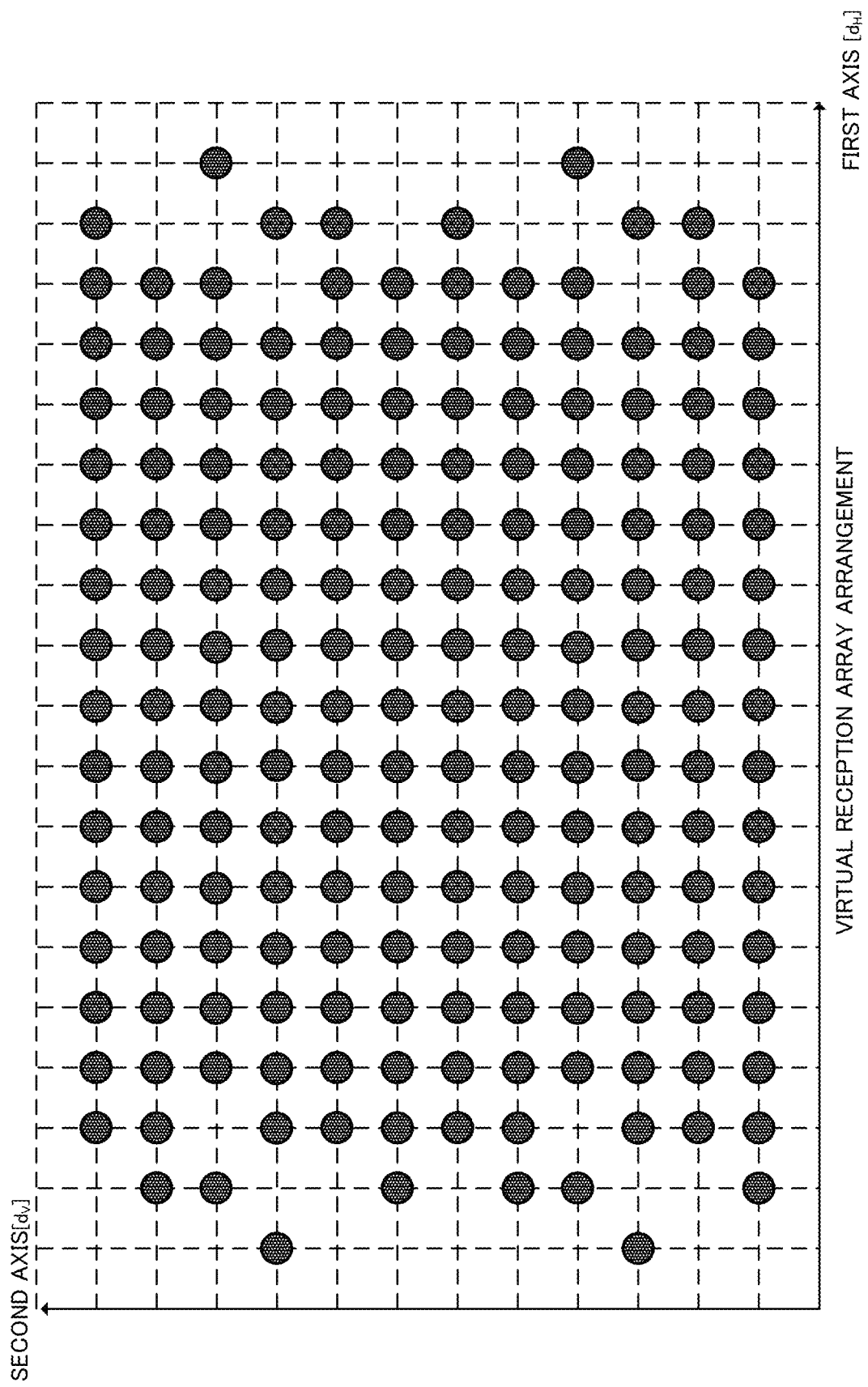
FIG. 25C is a diagram illustrating an arrangement example of a virtual reception array according to Variation 7 of Embodiment 1.

In another example, FIG. 25A illustrates an example in which a plurality of transmission antenna groups are arranged on the basis of the configuration of the antenna arrangement of Variation 1 shown in FIG. 10A. FIG. 25B illustrates an example in which a plurality of reception antenna groups are arranged on the basis of the configuration of the antenna arrangement of Variation 1 shown in FIG. 10A. In FIG. 25B, four antenna groups are arranged. FIG. 25C illustrates an arrangement example of a virtual reception array constituted by transmission antennas 108 shown in FIG. 25A and reception antennas 202 shown in FIG. 25B.

Here, let $D_{t1}$ be the opening length of each transmission antenna group in the first axis direction shown in FIG. 25A, let $D_{t2}$ be the opening length in the second axis direction, let $D_{r1}$ be the opening length of each reception antenna group in the first axis direction shown in FIG. 25B, and $D_{r2}$ be the opening length in the second axis direction.

In FIG. 25A, reference points of a first transmission antenna group and a second transmission antenna group are arranged at an interval of $D_{r1}+1$ in the first axis direction.

In FIG. 25A, $D_{tg1}$ is the entire opening length of the first transmission antenna group and the second transmission antenna group.

In FIG. 25B, reference points of first and third reception antenna groups, and reference points of second and fourth reception antenna groups are arranged at an interval of $D_{t2}+D_{r2}+1$ in the second axis direction. In FIG. 25B, reference points of the first and second reception antenna groups, and reference points of the third and fourth reception antenna groups are arranged at an interval of $D_{tg1}+1$ in the first axis direction.

This allows the virtual antenna elements to be closely arranged at intervals of $d_H$ and $d_V$ in the vicinity of the center of the virtual reception array arrangement shown in FIG. 25C.

The foregoing description has been made for a case where a plurality of transmission antenna groups or reception antenna groups are provided on the basis of the antenna arrangement of Variation 1. This is given for mere illustrative purposes. The same effects are obtained also when a plurality of transmission antenna groups or reception antenna groups are provided on the basis of the antenna arrangement of another Variation (for example, any of Variations 2 to 6). The intervals of the transmission antenna groups and the reception antenna groups are also not limited to the above examples.

The foregoing are descriptions of Variations 1 to 7.

Thus, in this embodiment, the antenna arrangement of transmission antennas 108 and reception antennas 202 allows the virtual antenna elements to be closely arranged in the virtual reception array constituted by transmission antennas 108 and reception antenna 202.

Thus, this embodiment prevents generation of unwanted grating lobes while increasing the opening length of the virtual reception array. This allows radar apparatus 10 to reduce the probability of false detection to form a desired directionality pattern.

In this embodiment, the antenna arrangement of transmission antennas 108 and reception antennas 202 allows at least one of the transmission antenna elements and the reception antenna elements to be constituted by sub-array elements. This improves the directional gain of transmission antennas 108 or reception antennas 202.

In other words, this embodiment prevents generation of grating lobes in the virtual reception array and allows sub-array configuration of transmission antennas 108 and reception antennas 202. Thus, this embodiment enhances the detection performance of radar apparatus 10.

In the case where the first transmission antenna array and the third transmission antenna array have the same arrangement pattern, as shown in FIGS. 22A and 22C, the first transmission antenna array (third transmission antenna array) and the second transmission antenna array can be repeatedly arranged as one set.

In the case where all of the first transmission antenna array, the second transmission antenna array, and the third transmission antenna array have different arrangement patterns, as shown in FIGS. 22B and 22D, four arrays, the first transmission antenna array, the second transmission antenna array, the third transmission antenna array, and the second transmission antenna array, may be repeatedly arranged as one set, for example, the first transmission antenna array, the second transmission antenna array, the third transmission antenna array, the second transmission antenna array, the first transmission antenna array, the second transmission antenna array, . . . The drawings may include other antennas (not shown).

Embodiment 2

A radar apparatus according to this embodiment has a common basic configuration as that of the radar apparatus 10 according to Embodiment 1, and will be described with reference to FIG. 1B.

Embodiment 1 illustrates the configuration of antenna arrangement in which degradation of performance of direction-of-arrival estimation is reduced to allow improvement of the gains of transmission antennas 108 and reception antennas 202. This embodiment describes a case where radar apparatus 10 (for example radar transmitter 100) controls the transmission beam (for example, the directional characteristics of the transmission beam) using a plurality of antennas included in transmission antennas 108 (for example, a transmission antenna array or a transmission antenna group).

In the case of forming a beam with a plurality of transmission antennas 108, radar apparatus 10 controls the phase and power to feed power to the plurality of transmission antennas 108 for use them as one transmission antenna. This allows radar apparatus 10 to control the directional characteristics of the transmission beam to use the plurality of transmission antennas 108 as high-gain antennas.

This embodiment therefore has a configuration suitable for long-distance (in other words, far-distance) detection as compared with a case where signals from the plurality of transmission antennas 108 are divided (separated) and individually transmitted. The division (separation) is intended for a MIMO radar to divide a plurality of transmitter signals by time division, code division, or frequency division to use the signals as a plurality of signals.

An example of the arrangement of Nt transmission antennas 108 and Na reception antennas 202 in radar apparatus 10, and a method of control will be described hereinbelow.

For example, a case where transmission antennas 108 including sub-array antenna elements are arranged as in FIG. 11A in the antenna arrangement according to Variation 1 of Embodiment 1 shown in FIG. 10B will be described.

Figure 26A:
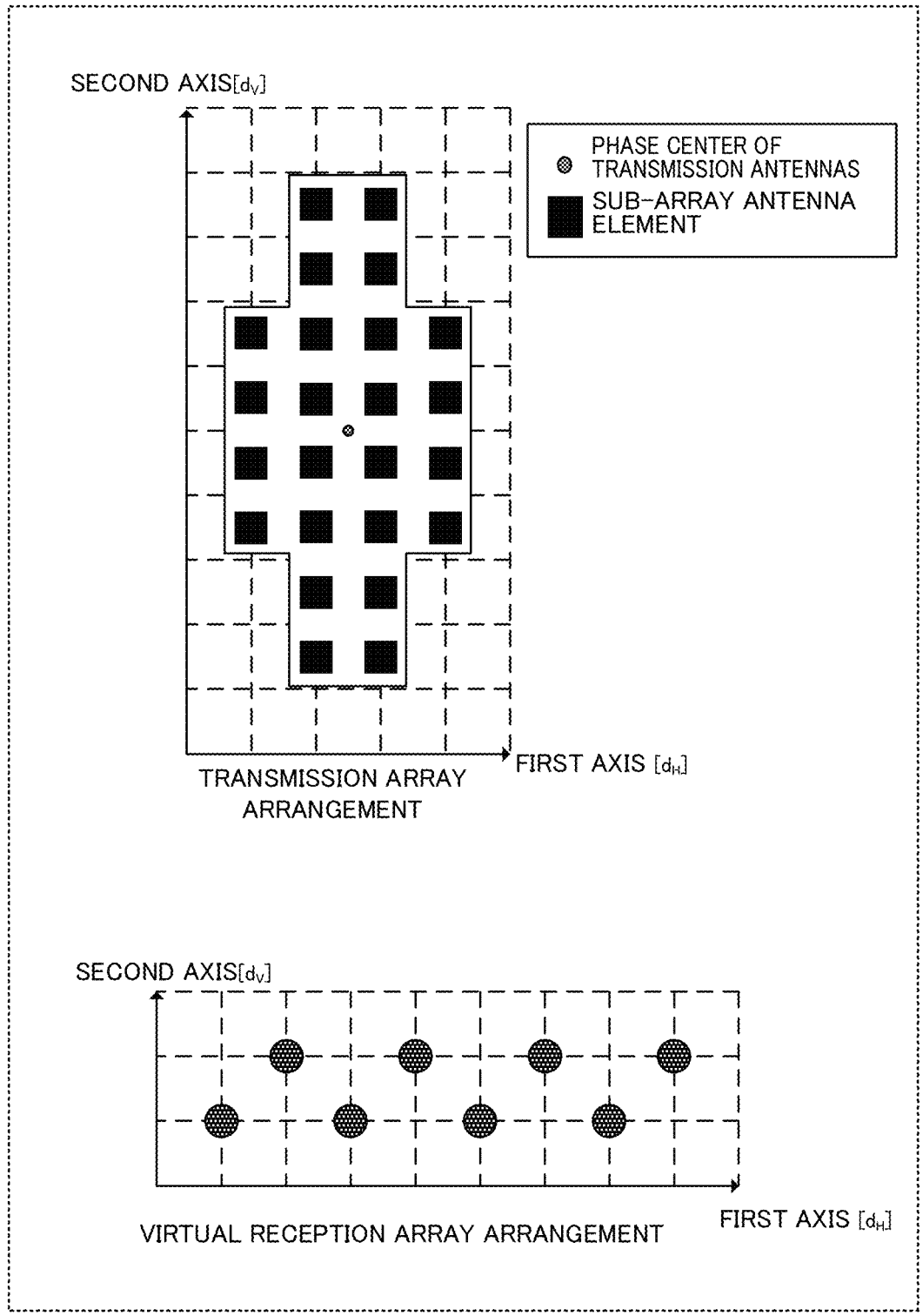
FIG. 26A is a diagram illustrating an arrangement example of transmission antennas and a virtual reception array according to Embodiment 2.

For example, radar apparatus 10 can control the phase and power of transmission antennas 108, Tx1 to Tx6, shown in FIG. 11A to feed the power at the same time to operate transmission antennas 108 as a single transmission antenna, as shown in FIG. 26A.

For example, if reception antennas 202 have the same antenna arrangement as that of FIG. 10B, the virtual reception array configuration is the same as the configuration shown in FIG. 26A, not the virtual reception array arrangement shown in FIG. 10B. The reception virtual array arrangement shown in FIG. 26A illustrates the phase center of the antennas.

Transmission antenna 108 is composed of a plurality of sub-arrays, with the phase center (one point) placed in the transmission antenna arrangement shown at the upper part in FIG. 26A. Formation of the virtual reception array shown in FIG. 26A depends not on the size of the sub-array of the transmission antenna but on the arrangement of the phase center. This allows the virtual reception array shown at the lower part of FIG. 26A to be formed of one transmission antenna×eight reception antennas without expanding the reception antenna arrangement in FIG. 10B.

This allows radar apparatus 10 to control the directional characteristics of the transmission beam to reduce the beam width in the first axis direction and the second axis direction, thereby improving the directional gain. In the example of FIG. 26A, since unwanted radiation in the wide-angle direction can be reduced, as compared with a case where signals are divided (separated) and independently transmitted from each transmission antenna 108, the configuration is suitable for long-distance detection. Furthermore, the opening length of the virtual reception array shown in FIG. 26A is large in the first axis direction and small in the second axis direction, which provides an antenna with resolution in the first axis direction. Beam formation (composition) is intended to combine the beams of a plurality of Tx elements and transmit the combined beam.

Next, a case where a plurality of transmission antenna groups is used, as in Variation 7 of Embodiment 1, will be described.

Figure 26B:
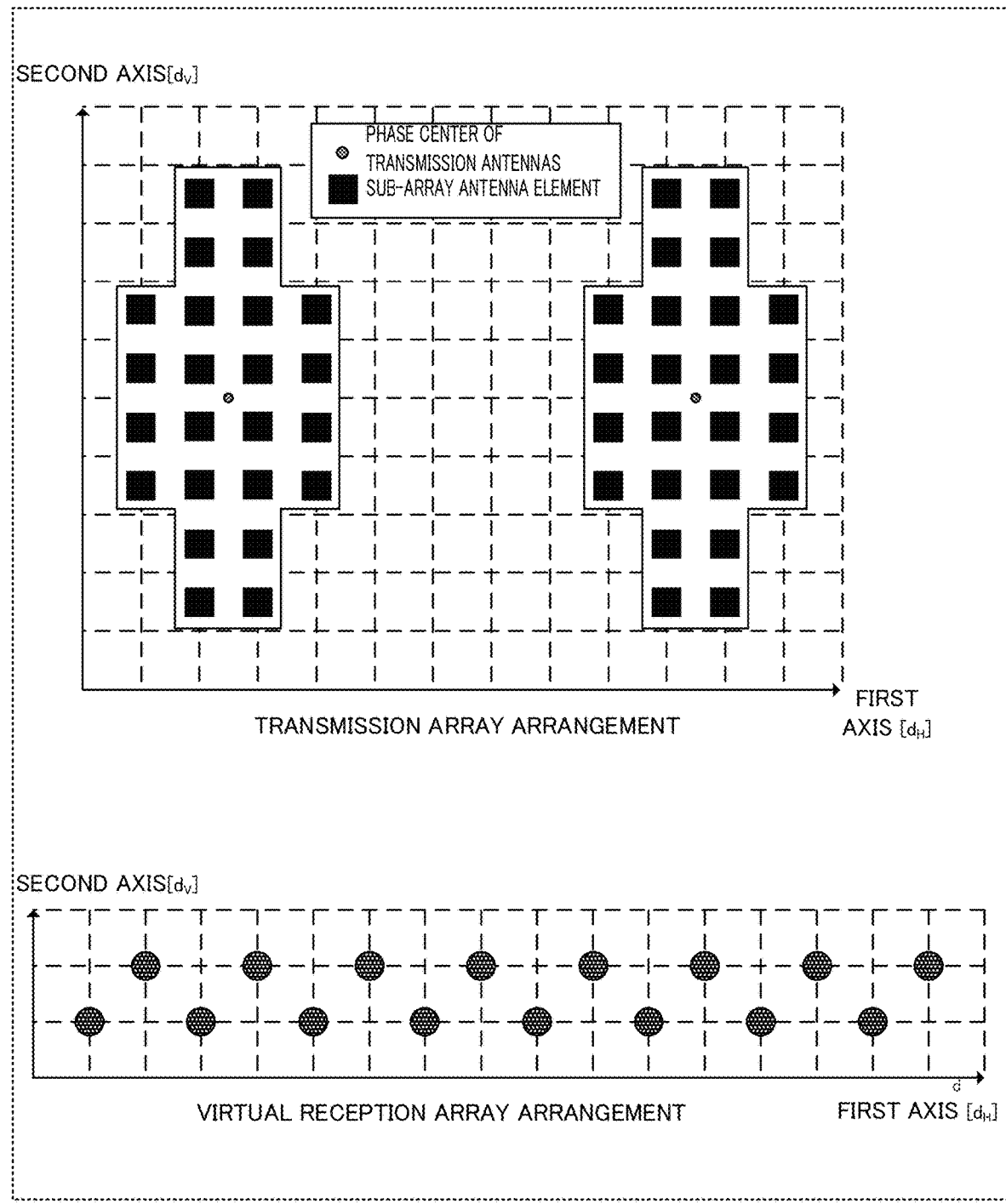
FIG. 26B is a diagram illustrating an arrangement example of transmission antennas and a virtual reception array according to Embodiment 2.

FIG. 26B illustrates an example of two transmission antenna groups each of which includes the transmission antennas shown in FIG. 26A as one transmission antenna group are provided. In FIG. 26B, the transmission antenna groups are arranged at intervals of $D_{r1}+1$ in the first axis direction from their respective reference points.

For example, radar apparatus 10 controls the directional characteristics of the transmission beam of each transmission antenna group using a plurality of antennas included in each transmission antenna group and works with the signals independently (in other words, separately) with the two transmission antennas, a first transmission antenna group and a second transmission antenna group. This can improve the directional gain.

For example, if reception antennas 202 have the same antenna arrangement as in FIG. 10B, the virtual reception array has the configuration shown in FIG. 26B.

Radar apparatus 10 may scan the directional characteristics of the transmission beam. For example, radar apparatus 10 feeds power to transmission antennas 108 while controlling the phase and power to scan transmission beams on the first axis, thereby transmitting a signal to each transmission area. In this case, radar apparatus 10 may split transmission beams for the different transmission areas by time or code and independently estimate the directions of arrival using array directional vectors of the different transmission areas.

The foregoing is a description of the case where the directional characteristics of the transmission beam are controlled for each transmission antenna group. However, the antenna arrangement is not limited to the above. Any of the antenna arrangements according to Variations 1 to 7 of Embodiment 1 may be applied.

Radar apparatus 10 may switch the operation between a beam forming operation (or mode) for controlling the directional characteristics of transmission antennas 108 and an operation (or mode) for transmitting a signal independently from each transmission antenna 108. For example, transmission of a signal independently from each of the plurality of transmission antennas 108 with the antenna arrangement shown in FIG. 26A or 26B is suitable for shorter-distance (or nearer-distance) and wider-angle detection. In contrast, the beam forming operation is suitable for longer-range (or farther-distance) and narrower-angle detection. For that reason, radar apparatus 10 may switch the operation mode according the scene where the radar is used. A plurality of operation modes may be included in one frame of the radar operation. Other antennas may be included (not shown in the drawings).

Embodiment 3

Figure 27:
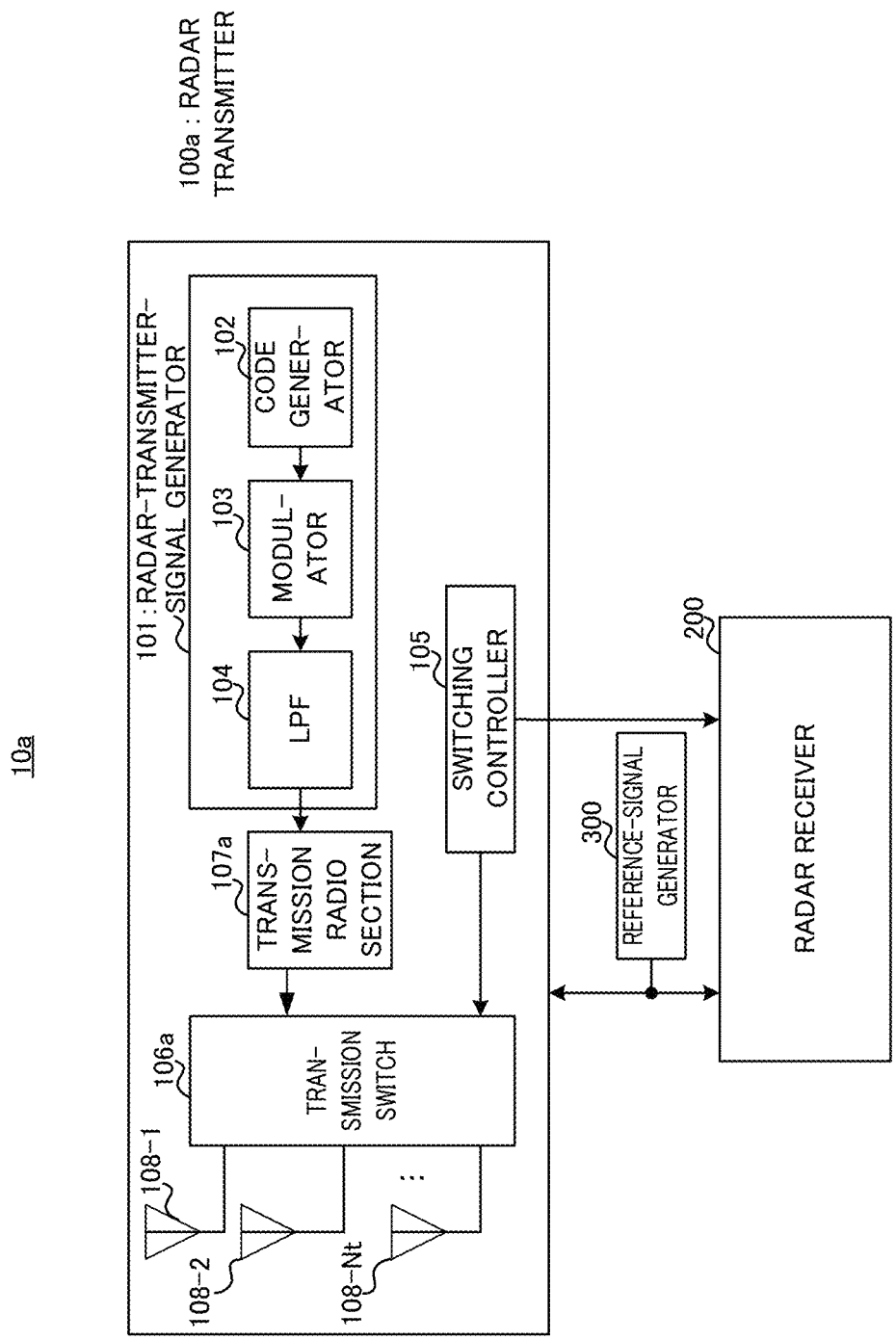
FIG. 27 is a block diagram illustrating an example configuration of a radar apparatus according to Embodiment 3.

The configuration of a radar apparatus according to an aspect of the present disclosure is not limited to the configuration shown in FIG. 1B. For example, the configuration of radar apparatus 10a shown in FIG. 27 may be used. In FIG. 27, the configuration of radar receiver 200 is similar to that in FIG. 1B, and a detailed configuration thereof will be omitted.

With radar apparatus 10 shown in FIG. 1, the output from radar-transmitter-signal generator 101 is selectively switched to one of a plurality of transmission radio sections 107 using transmission switch 106 in radar transmitter 100. In contrast, with radar apparatus 10a shown in FIG. 27, in radar transmitter 100a, the output from radar-transmitter-signal generator 101 (radar transmitter signal) is subjected to a transmission radio process by transmission radio section 107a, and the output of transmission radio section 107a is selectively switched to one of a plurality of transmission antennas 108 by transmission switch 106a.

The configuration of radar apparatus 10a shown in FIG. 27 also offers the same effects as those of Embodiments 1 and 2.

Embodiment 4

Embodiments 1 to 3 illustrate a case where radar transmitter 100 (or radar transmitter 100a) uses a pulse-compression radar that transmits a phase-modulated or amplitude-modulated pulse train, but the method of modulation is not limited to the above. For example, the present disclosure is also applicable to a radar system using frequency-modulated pulse waves, such as chirp pulses.

Figure 28:
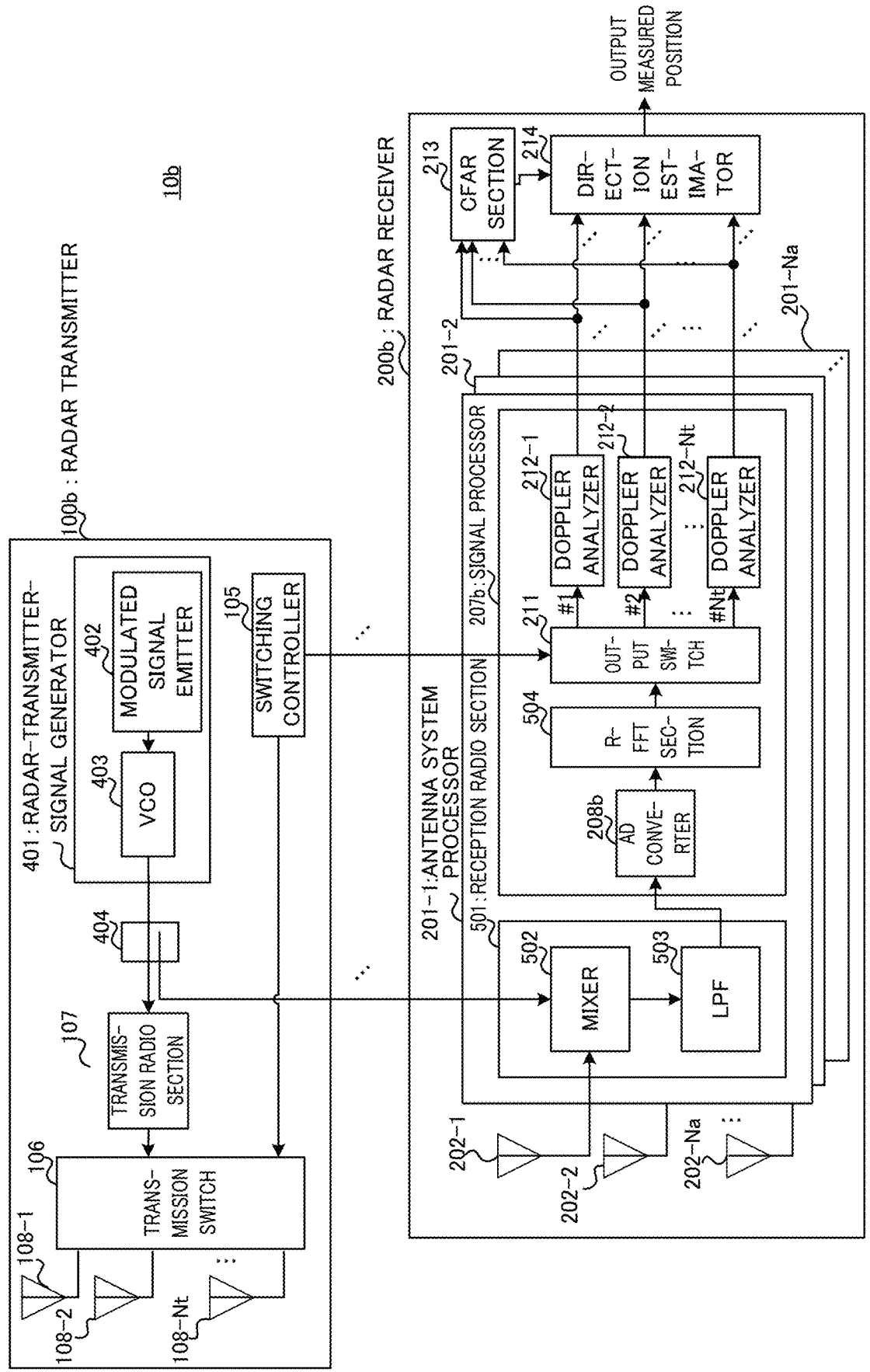
FIG. 28 is a block diagram illustrating an example configuration of a radar apparatus according to Embodiment 4.

FIG. 28 illustrates an example of the block diagram of radar apparatus 10b in the case where a radar system using chirp pulses (for example, fast chirp modulation) is applied. In FIG. 28, the same components as those in FIG. 1B are given the same reference signs, and descriptions thereof will be omitted.

First, a transmission process in radar transmitter 100b will be described.

In radar transmitter 100b, radar-transmitter-signal generator 401 includes modulated signal emitter 402 and voltage-controlled oscillator (VCO) 403.

Figure 29:
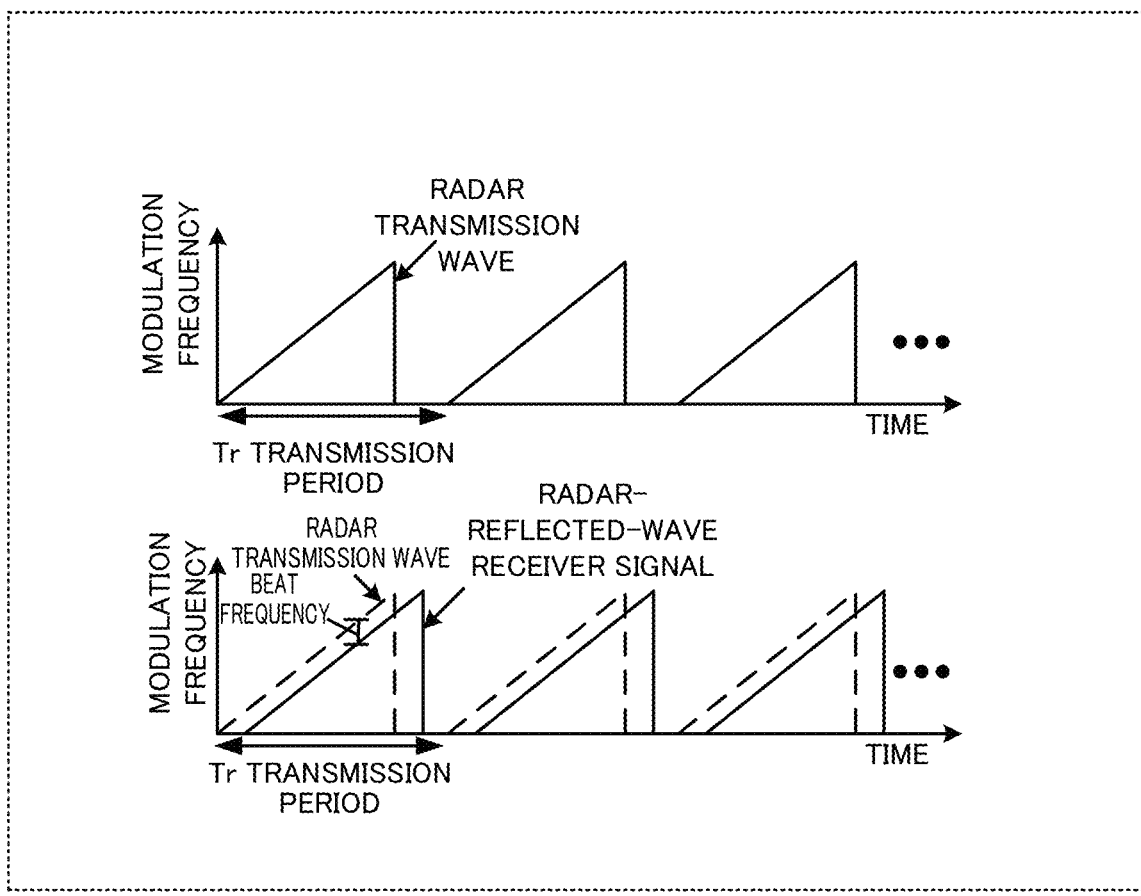
FIG. 29 is a diagram illustrating an example of a transmitter signal and a reflected wave signal when chirp pulses are used.

Modulated signal emitter 402 emits sawtooth modulated signals periodically as shown in FIG. 29, where Tr is the radar transmission period.

VCO 403 outputs a frequency-modulated signal (in other words, a frequency-chirp signal) to transmission radio section 107 on the basis of the radar transmitter signal output from modulated signal emitter 402. The frequency-modulated signal is amplified by transmission radio section 107 and radiated into space from transmission antenna 108 switched by transmission switch 106. For example, the radar transmitter signal is transmitted at transmission intervals of Np (=Nt×Tr) in each of first to Nt-th transmission antennas 108.

Directional coupler 404 extracts some of the frequency-modulated signals and outputs the signals to reception radio sections 501 (mixers 502) of radar receiver 200b.

Next, reception processing performed by radar receiver 200b will be described.

Reception radio section 501 of radar receiver 200b mixes the frequency-modulated signal (the signal input from directional coupler 404), which is the transmitter signal, to a received reflected wave signal with mixer 502 and passes the signal through LPF 503. Thus, a beat signal with a frequency corresponding to the delay time of the reflected wave signals is extracted. For example, as shown in FIG. 29, the differential frequency between the frequency of the transmitter signal (transmitter frequency-modulated wave) and the frequency of the receiver signal (receiver frequency-modulated wave) is obtained as a beat frequency.

The signal output from LPF 503 is converted to discrete sample data by AD converter 208b in signal processor 207b.

R-FFT section 504 performs FFT processing on $N_{data}$ pieces of discrete sample data obtained at intervals of transmission period Tr in a predetermined time range (range gate). This allows signal processor 207b to output a frequency spectrum in which peaks appear in the beat frequency according to the delay time of the reflected wave signal (radar reflected wave). In FFT processing, R-FFT section 504 may multiply the data by a window function coefficient, such as Han window or Hamming window. The use of the window function coefficient reduces sidelobes generated around the beat frequency peaks.

A beat frequency spectrum response output from R-FFT section 504 of z-th signal processor 207b, obtained by M-th chirp pulse transmission, is expressed as $AC\_RFT_z(fb, M)$, where fb is the index number (pin number) of FFT, and fb=0, ..., $N_{data}/2$. The smaller the frequency index fb, the smaller the delay time of the reflected wave signal (in other words, the shorter the distance from the target object) of the beat frequency is.

Output switch 211 in z-th signal processor 207b selects one of Nt doppler analyzers 212 on the basis of a switching control signal input from switching controller 105 and outputs the output of R-FFT section 504 produced at intervals of radar transmission period Tr to the selected doppler analyzer 212, as in Embodiment 1.

In one example, a switching control signal in M-th radar transmission period Tr[M] is expressed as Nt-bit information [$bit_1(M)$, $bit_2(M)$, ..., $bit_{Nt}(M)$]. For example, if ND-th $bit_{ND}(M)$ (where ND=one of 1 to Nt) in the switching control signal in M-th radar transmission period Tr[M] is '1', output switch 211 selects (in other words, turns ON) ND-th doppler analyzer 212. In contrast, if the ND-th $bit_{ND}(M)$ in the switching control signal in M-th radar transmission period Tr[M] is '0', output switch 211 does not select (in other words, turns OFF) ND-th doppler analyzer 212. Output switch 211 outputs the signal input from R-FFT section 504 to selected doppler analyzer 212.

Thus, doppler analyzers 212 are turned ON in sequence at intervals of Np(=Nt×Tr). The switching control signal repeats the above Nc times.

The transmission start time of the transmitter signal from each transmission radio section 107 need not be synchronized with period Tr. For example, each transmission radio section 107 may start transmission of radar transmitter signals at transmission start time with different transmission delays $\Delta_1, \Delta_2, ..., \Delta Nt$.

The z-th (z=1, ..., Na) signal processor 207b includes Nt doppler analyzers 212.

Doppler analyzers 212 perform doppler analysis on the output from output switch 211 for each beat frequency index fb.

If Nc is power of 2, Fast Fourier transform (FFT) processing can be applied to Doppler analysis.

The w-th output of ND-th doppler analyzer 212 of z-th signal processor 207b shows Doppler frequency response $FT\_CI_z^{(ND)}(f_b, f_u, w)$ of Doppler frequency index $f_u$ in beat frequency index fb, as expressed in the following equation.

(Equation 20)

$$FT\_CI_z^{(ND)}(f_b, f_u, w) = \sum_{q=0}^{N_t N_c - 1} bit_{N_D}(q+1) \qquad [20]$$

$$AC\_RFT_z(f_b, N_t N_c(w-1) + q + 1) \exp\left[-j\frac{2\pi \left\lfloor \frac{q}{N_t} \right\rfloor f_u}{N_c}\right]$$

where ND=1 to Nt, ND=1 to Nt, w is an integer equal to or greater than 1, j is an imaginary unit, and z=1 to Na.

Processes performed by signal correcting section 213, CFAR section 213, and direction estimator 214 downstream from signal processor 207b are operations in which discrete time k described in Embodiment 1 is replaced with beat frequency index fb, and detailed descriptions will be omitted.

With the foregoing configuration and operation, this embodiment can obtain the same effects as those of Embodiments 1 to 3.

The beat frequency index fb described above may be converted into distance information and output. Beat frequency index fb may be converted to distance information R(fb) using the following equation.

(Equation 21)

$$R(fb) = \frac{C_0}{2B_w} f_b \qquad [21]$$

where $B_w$ is the frequency modulation bandwidth of a frequency-chirp signal generated through frequency modulation, and $C_0$ is the light speed.

Embodiments according to an exemplary embodiment of the present disclosure have been described above.

The embodiments and operations according to the variations may be combined as appropriate and performed.

The above embodiments illustrate a case where basic interval $d_H$=0.5λ and $d_V$=0.5λ, but this is given for mere illustrative purposes. For example, basic interval $d_H$ and $d_V$ may be values of 0.5 wavelength or greater and one wavelength or less.

In radar apparatuses 10, 10a, and 10b (for example, see FIGS. 1B, 27, and 28), radar transmitter 100 and radar receiver 200 may be separated by physical distance. In radar receiver 200 (for example, see FIGS. 1B, 27, and 28), direction estimator 214 and other components may be separately arranged physically apart from each other.

Radar apparatus 10 according to an exemplary embodiment of the present disclosure includes, for example, a central processing unit (CPU), a storage medium such as a read only memory (ROM) that stores a control program, and a work memory such as a random access memory (RAM), which are not illustrated. In this case, the functions of the sections described above are implemented by the CPU executing the control program. However, the hardware configuration of the radar apparatus is not limited to that in this example. For example, the functional sections of the radar apparatus may be implemented as an integrated circuit (IC).

Each functional section may be formed as an individual chip, or some or all of them may be formed into a single chip.

Various embodiments have been described with reference to the drawings hereinabove. Obviously, the present disclosure is not limited to these examples. Obviously, a person skilled in the art would arrive variations and modification examples within a scope described in claims, and it is understood that these variations and modifications are within the technical scope of the present disclosure. Each constituent element of the above-mentioned embodiments may be combined optionally without departing from the spirit of the disclosure.

Although the present disclosure has been described with an example using hardware in the above embodiments, the present disclosure can be realized by software, hardware, or software in cooperation with hardware.

Each functional block used in the description of each embodiment described above is typically realized by an LSI, which is an integrated circuit. The integrated circuit controls each functional block used in the description of the above embodiments and may include an input terminal and an output terminal. The LSI may be individually formed as chips, or one chip may be formed so as to include a part or all of the functional blocks. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

The expression "section" used in the above-described embodiments may be replaced with another expression such as "circuit (circuitry)," "device," "unit," or "module."

<Summary of the Present Disclosure>

A radar apparatus according to one embodiment of the present disclosure includes: a radar transmission circuit that transmits a radar signal using a transmission array antenna; and a radar reception circuit that receives a reflected wave signal using a reception array antenna, the reflected wave signal being the radar signal reflected by a target, in which: the transmission array antenna and the reception array antenna are arranged on a two-dimensional plane formed by a first axis and a second axis, the reception array antenna includes a plurality of reception antenna arrays, each of the plurality of reception antenna arrays includes a first number of antennas, wherein adjacent antennas of the first number of antennas are spaced apart at a first interval in the first axis direction and at a second interval in the second axis direction, the transmission array antenna includes a plurality of transmission antenna arrays, the plurality of transmission antenna arrays are arranged at intervals of the first number multiple of the second interval in the second axis direction, each of the plurality of transmission antenna arrays includes a plurality of antennas, the plurality of antennas are individually arranged at a same position in the second axis direction and at different positions in the first axis direction, and of the plurality of transmission antenna arrays, two transmission antenna arrays arranged continuously in the second axis direction include at least one of the antennas arranged at different positions in the first axis direction.

In one embodiment of the present disclosure, of the plurality of transmission antenna arrays, three transmission antenna arrays arranged continuously in the second axis direction include at least one of the antennas arranged at different positions in the first axis direction.

In one embodiment of the present disclosure, each of the plurality of transmission antenna arrays includes at least two or more antennas arranged at the first interval in the first axis direction.

In one embodiment of the present disclosure, the transmission array antenna includes three or more transmission antenna arrays, of the three or more transmission antenna arrays, antennas included in two transmission antenna arrays that are not next to each other in the second axis direction are arranged at the first interval in the first axis direction, of the three or more transmission antenna arrays, antennas included in remaining one transmission antenna array are arranged at the first interval in at least one of two areas divided at an interval obtained by multiplying the first interval by the first number plus one multiple.

In one embodiment of the present disclosure, antennas arranged in one of the two areas and antennas arranged in another of the two areas are equal in number or differ by 1.

In one embodiment of the present disclosure, the plurality of transmission antenna arrays arranged in the second axis direction constitute one transmission antenna group, and the transmission array antenna includes a plurality of the transmission antenna groups arranged in the first axis direction.

In one embodiment of the present disclosure, the plurality of reception antenna arrays arranged in the first axis direction constitute one reception antenna group, and the reception array antenna includes a plurality of the reception antenna groups.

In one embodiment of the present disclosure, the radar transmission circuit controls a transmission beam using the transmission array antenna.

In one embodiment of the present disclosure, the first interval and the second interval are values of 0.5 wavelength or more and one wavelength or less.

In one embodiment of the present disclosure, at least one of the transmission antenna and the reception antenna includes a plurality of sub-array elements.

In one embodiment of the present disclosure, a transmission and reception array antenna according to one embodiment of the present disclosure includes: a transmission array antenna; and a reception array antenna, in which: the transmission array antenna and the reception array antenna are arranged on a two-dimensional plane formed by a first axis and a second axis, the reception array antenna includes a plurality of reception antenna arrays, each of the plurality of reception antenna arrays includes a first number of antennas, wherein adjacent antennas of the first number of antennas are spaced apart at a first interval in the first axis direction and at a second interval in the second axis direction, the transmission array antenna includes a plurality of transmission antenna arrays, the plurality of transmission antenna arrays are arranged at intervals of the first number multiple of the second interval in the second axis direction, each of the plurality of transmission antenna arrays includes a plurality of antennas, the plurality of antennas are individually arranged at a same position in the second axis direction and at different positions in the first axis direction, and of the plurality of transmission antenna arrays, two transmission antenna arrays arranged continuously in the second axis direction include at least one of the antennas arranged at different positions in the first axis direction.

The disclosure of Japanese Patent Application No. 2019-053737, filed on Mar. 20, 2019, including the specification, drawings and abstract, is incorporated herein by reference in its entirety.

INDUSTRIAL APPLICABILITY

The present disclosure is suitable as a radar apparatus for detecting a wide-angle range.

REFERENCE SIGNS LIST 10, 10b Radar apparatus
100, 100a, 100b Radar transmitter
200, 200b Radar receiver
300 Reference-signal generator
101, 101a, 401 Radar-transmitter-signal generator
102 Code generator
103 Modulator
104, 503 LPF
105 Switching controller
106, 106a Transmission switch
107, 107a Transmission radio section
108 Transmission antenna
111 Code storage
112 DA converter
201 Antenna system processor
202 Reception antenna
203, 501 Reception radio section
204 Amplifier
205 Frequency converter
206 Orthogonal wave detector
207, 207b Signal processor
208, 208b, 209 AD converter
210 Correlation processor
211 Output switch
212 Doppler analyzer
213 CFAR section
214 Direction estimator
402 Modulated signal emitter
403 VCO
404 Directional coupler
502 Mixer

The invention claimed is:

1. A radar apparatus comprising:
a first radar circuit to which a first array antenna is connected; and
a second radar circuit to which a second array antenna is connected, wherein
the first array antenna and the second array antenna are arranged on a two-dimensional plane formed by a first axis and a second axis,
the second array antenna includes a plurality of second antenna lines,
each of the plurality of second antenna lines includes a plurality of second antennas, wherein adjacent second antennas of the plurality of second antennas are spaced apart at a first interval in the first axis direction and at a second interval in the second axis direction,
the first array antenna includes three or more first antenna lines,
each of the three or more first antenna lines includes a plurality of first antennas, the plurality of first antennas are individually arranged at a same position in the second axis direction and at different positions in the first axis direction, and of the three or more first antenna lines, two first antenna lines arranged continuously in the second axis direction include at least one all of the first antennas arranged at different positions in the first axis direction.

2. The radar apparatus according to claim 1, wherein
the plurality of second antennas are is a first number of second antennas, and
the three or more first antenna lines are arranged at intervals of the first number multiple of the second interval in the second axis direction.

3. The radar apparatus according to claim 1, wherein, among the three first antenna lines continuously arranged in the second axial direction included in the three or more first antenna lines, two first antenna lines not continuously arranged in the second axial direction includes at least one of the first antennas arranged at different positions in the first axis direction each other, and remaining first antennas arranged at same position in the first axial direction each other.

4. The radar apparatus according to claim 1, wherein each of the three or more first antenna lines includes at least two or more first antennas arranged at the first interval in the first axis direction.

5. The radar apparatus according to claim 1, wherein
of the three or more first antenna lines, first antennas included in two first antenna lines that are not next to each other in the second axis direction are arranged at the first interval in the first axis direction,
of the three or more first antenna lines, first antennas included in remaining one first antenna array line are arranged at the first interval in at least one of two areas divided at an interval obtained by multiplying the first interval by a first number plus one.

6. The radar apparatus according to claim 5, wherein first antennas arranged in one of the two areas and first antennas arranged in another of the two areas are equal in number or differ by 1.

7. The radar apparatus according to claim 1, wherein
the three or more first antenna lines arranged in the second axis direction constitute one first antenna group, and
the first array antenna includes a plurality of the first antenna groups arranged in the first axis direction.

8. The radar apparatus according to claim 1, wherein
the plurality of second antenna lines arranged in the first axis direction constitute one second antenna group, and
the second array antenna includes a plurality of the second antenna groups.

9. The radar apparatus according to claim 1, wherein
the first array antenna is a transmission array antenna,
the three or more first antenna lines are three or more transmission antenna array lines,
the plurality of first antennas is a plurality of transmission antennas,
the first radar circuit transmits a radar signal using the transmission array antenna,
the second array antenna is a reception array antenna,
the plurality of second antenna lines is a plurality of reception antenna lines,
the plurality of second antennas is a plurality of reception antennas, and
the second radar circuit receives a reflected-wave signal using the reception array antenna, the reflected-wave signal being the radar signal reflected by a target.

10. The radar apparatus according to claim 9, wherein the first radar circuit performs beamforming using the transmission array antenna.

11. The radar apparatus according to claim 1, wherein the first interval and the second interval are values of 0.5 wavelength or more and one wavelength or less.

12. The radar apparatus according to claim 1, wherein at least one of the first antenna and the second antenna includes a plurality of sub-array elements.

13. A transmission and reception array antenna comprising:
a first array antenna; and
a second array antenna, wherein
the first array antenna and the second array antenna are arranged on a two-dimensional plane formed by a first axis and a second axis,
the second array antenna includes a plurality of second antenna lines,
each of the plurality of second antenna lines includes a plurality of second antennas, wherein adjacent second antennas of the plurality of second antennas are spaced apart at a first interval in the first axis direction and at a second interval in the second axis direction,
the first array antenna includes three or more first antenna lines,
each of the three or more first antenna lines includes a plurality of first antennas,
the plurality of first antennas are individually arranged at a same position in the second axis direction and at different positions in the first axis direction, and
of the three or more first antenna lines, two first antenna lines arranged continuously in the second axis direction include all of the first antennas arranged at different positions in the first axis direction.

14. The transmission and reception antenna according to claim 13, wherein
the plurality of second antennas is a first number of second antennas, and
the three or more first antenna lines are arranged at intervals of the first number multiple of the second interval in the second axis direction.

15. The transmission and reception array antenna according to claim 13, wherein
the first array antenna is a transmission array antenna,
the three or more first antenna lines are three or more transmission antenna lines,
the plurality of first antennas is a plurality of transmission antennas,
the second array antenna is a reception array antenna,
the plurality of second antenna lines is a plurality of reception antenna lines, and
the plurality of second antennas is a plurality of reception antennas.

* * * * *